(12) United States Patent
Miyasita et al.

(10) Patent No.: US 6,891,900 B2
(45) Date of Patent: May 10, 2005

(54) DEMODULATING CIRCUIT AND OPTICAL RECEIVING CIRCUIT

(75) Inventors: Tokio Miyasita, Tokyo (JP); Sunao Mizunaga, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/721,550

(22) Filed: Nov. 26, 2003

(65) Prior Publication Data

US 2004/0233090 A1 Nov. 25, 2004

(30) Foreign Application Priority Data

May 22, 2003 (JP) .................................... 2003-144735

(51) Int. Cl.$^7$ .............................................. H04L 27/04
(52) U.S. Cl. ............................... 375/295; 375/316
(58) Field of Search ..................... 341/155, 161, 341/143, 136, 158, 118; 375/295, 316, 303, 318, 330, 353, 317, 325, 237

(56) References Cited

U.S. PATENT DOCUMENTS 5,412,692 A    5/1995   Uchida
5,612,810 A    3/1997   Inami et al.
6,104,238 A    8/2000   Mattisson et al.
6,151,150 A   11/2000   Kikuchi
6,496,549 B1 * 12/2002  Crawford .................... 375/320
2003/0123567 A1 * 7/2003 Shigemasa et al. ......... 375/295

FOREIGN PATENT DOCUMENTS

JP       08-84160      3/1996
JP      10-163828      6/1998

* cited by examiner

*Primary Examiner*—Michael Tokar
*Assistant Examiner*—John B Nguyen
(74) *Attorney, Agent, or Firm*—Nixon Peabody LLP

(57) ABSTRACT

A demodulating circuit includes a differentiating circuit that outputs a differentiated signal indicating voltage changes at rising and falling edges of a received pulse signal, and a hysteresis comparator that compares the differentiated signal with upper and lower threshold voltages, thereby generating a demodulated logic-level signal. The differentiating circuit can rapidly track variations in the direct-current offset of the received pulse signal. Positive feedback can enable the hysteresis comparator to maintain the correct output logic level during runs of 0's or 1's of arbitrary length in the received pulse signal. The demodulating circuit consumes comparatively little power, and is particularly useful for receiving signals transmitted in bursts.

15 Claims, 44 Drawing Sheets

N-MOS

P-MOS

DEMODULATING CIRCUIT AND OPTICAL RECEIVING CIRCUIT

BACKGROUND OF THE INVENTION

1. Field of the Invention

The present invention relates to a demodulating circuit for use in a receiving circuit that receives burst signals such as the signals employed in mobile wireless communication systems and fiber-optic communication systems.

2. Description of the Related Art

The burst signals employed in communication systems are coded according to coding systems that allow runs of consecutive high ('1') or low ('0') bits up to a specified maximum run length. The demodulating circuit in the receiver must be capable of receiving such runs without error.

Some communication systems that employ burst signals employ different time intervals for transmitting and receiving bursts. Some of these communication systems also separate the transmitting and receiving intervals by quiescent states, in which power is supplied but neither transmission nor reception is performed. During a quiescent state, the receiver receives a long run of identical '1' or '0' symbols. The run ends abruptly when a signal burst begins, because the burst includes both '1' and '0' symbols. At the end of the burst, the quiescent state resumes, and another long run of identical '1' or '0' symbols begins. The circuit for demodulating the received signal demodulates both the burst of signal pulses and the long runs of identical '1' or '0' symbols, and supplies a positive-phase or a negative-phase demodulated output signal at prescribed high and low logic levels.

When the amplitude of the received pulses is small, which is the case in an optical receiving circuit, it is necessary to amplify the received signal preparatory to demodulation. If the received pulse signal is amplified by, for example, a capacitively coupled multi-stage amplifier, which is often the case, the peak value of the output signal envelope, or its amplitude, varies depending on three factors listed below. The demodulating circuit must be able to generate logic outputs corresponding to the '0' and '1' values of the original pulse signal even when the amplified pulse signal varies according to these factors, which are:

(1) whether the received pulse signal is amplified in a linear or non-linear (limited) amplification range;

(2) the ratio of 1's to 0's in the received pulse signal; and (3) the lengths of runs of 1's or 0's in the received pulse signal.

In an optical receiving circuit disclosed on p. 3 and in FIG. 1 of Japanese Unexamined Patent Application Publication No. 8-84160 (hereinafter, Reference 1), for example, the received optical signal is converted to a current signal by a photodiode, then to a voltage signal by a preamplifier. The preamplified but still weak voltage signal is amplified by a main amplifier that also performs offset compensation, and is then converted to a logic signal by a comparator element. This configuration is known to enable the optical receiving circuit to generate a logic output signal with low duty distortion, even during short bursts.

In another optical receiving circuit, disclosed on pp. 3–4 and in FIG. 1 of Japanese Unexamined Patent Application Publication No. 10-163828 (hereinafter, Reference 2), for example, in addition to the configuration described in Reference 1, a fixed offset voltage source is added to the offset compensator in the final amplifier stage preceding the comparator element. The fixed offset voltage source holds the output of the comparator element at the low logic level during reception of runs of '0' symbols over which the peak hold circuit in the offset compensating main amplifier cannot maintain a constant peak value. In particular, the logic output of the comparator element is held at the low level during quiescent states in which long runs of '0' symbols are received.

In wireless and other communication systems that use frequency-shift keying (FSK), variations in the direct-current (dc) offset of the demodulated or detected signal occur due to the influence of the difference between the frequency of the FSK signal and the predefined carrier frequency. These variations are dealt with in U.S. Pat. No. 6,104,238 (hereinafter, Reference 3) by smoothing the detected signal and varying its center frequency so as to track the dc offset variations.

U.S. Pat. No. 5,412,692 (hereinafter, Reference 4) discloses another method of tracking dc offset variations, namely by detecting the maximum and minimum levels of the detected output signal and using a potential midway between them as a reference potential for the comparator circuit.

In a communication system in which transmission and reception periods alternate, or are separated by quiescent states, when communication switches over to the receiving state, the received signal arrives in a burst that dynamically alters the dc potential of the detected signal. To enable the receiver to adjust to the new dc potential, a preamble pattern is generally added at the beginning of each burst. The preamble pattern differs, however, depending on the communication system employed, and is only four bits long in some systems. To demodulate a received signal with such a short preamble pattern, the receiving circuit needs to be able to track dynamically changing dc potentials rapidly.

In general, however, the ability to track dc potential variations rapidly must be traded off against the ability to receive long runs of identical symbols without error: if the dc potential tracking capability is improved, the run-length tolerance is reduced.

In the circuit configuration disclosed in Reference 1, during a quiescent state in which a long run of '0' symbols is received, the differential input to the comparator element becomes zero due to the offset compensating operation. The capability to track dc potential variations rapidly is thus improved at the cost of having the logic output of the comparator element sometimes become unstable.

The circuit configuration disclosed in Reference 2 improves the capability to receive runs of identical symbols without error, but the effectiveness of the offset compensating operation in maintaining the correct duty cycle in the waveform input to the comparator element is reduced.

The circuit configuration disclosed in Reference 3 also improves the capability to receive runs of identical symbols without error, but the time required for compensating for dc potential variations becomes the sum of the time required for smoothing the detected output and the absolute delay times of the channel selection filter and the detector circuit. In a demodulating circuit that employs high-order filters, rapid dc potential compensation becomes difficult.

The circuit configuration disclosed in Reference 4 likewise improves the capability to receive runs of identical symbols without error, but if rapid dc potential compensation is also performed, the time constants of the integrating circuits that detect the maximum and minimum levels of the detected output must be reduced, so there is still a trade-off between rapid dc potential compensation and the tolerance for long runs of identical symbols.

SUMMARY OF THE INVENTION

An object of the present invention is to provide a demodulating circuit that can mitigate the effects of variations in dc offset of a burst input signal while maintaining the capability to receive runs of identical symbols without error.

Another object of the invention is to improve the capability of the demodulating circuit to track variations in dc potential rapidly.

Still another object is to reduce the power consumption of the demodulator.

The invented demodulating circuit demodulates a pulse signal including runs of identical '1' or '0' symbols. The demodulating circuit includes a differentiating circuit and a hysteresis comparator.

The differentiating circuit detects voltage changes at rising and falling transitions of the pulse signal, and outputs a differentiated signal responsive to these voltage changes.

The hysteresis comparator compares the differentiated signal with a first reference voltage according to a predetermined upper threshold voltage higher than the first reference voltage and a predetermined lower threshold voltage lower than the first reference voltage, thereby generating a demodulated signal. The demodulated signal is maintained at a first logic level when the differentiated signal is above the upper threshold voltage, at a second logic level when the differentiated signal is below the lower logic level, and at its existing (first or second) logic level when the differentiated voltage is between the upper threshold voltage and the lower threshold voltage.

DETAILED DESCRIPTION OF THE INVENTION

Figure 1:
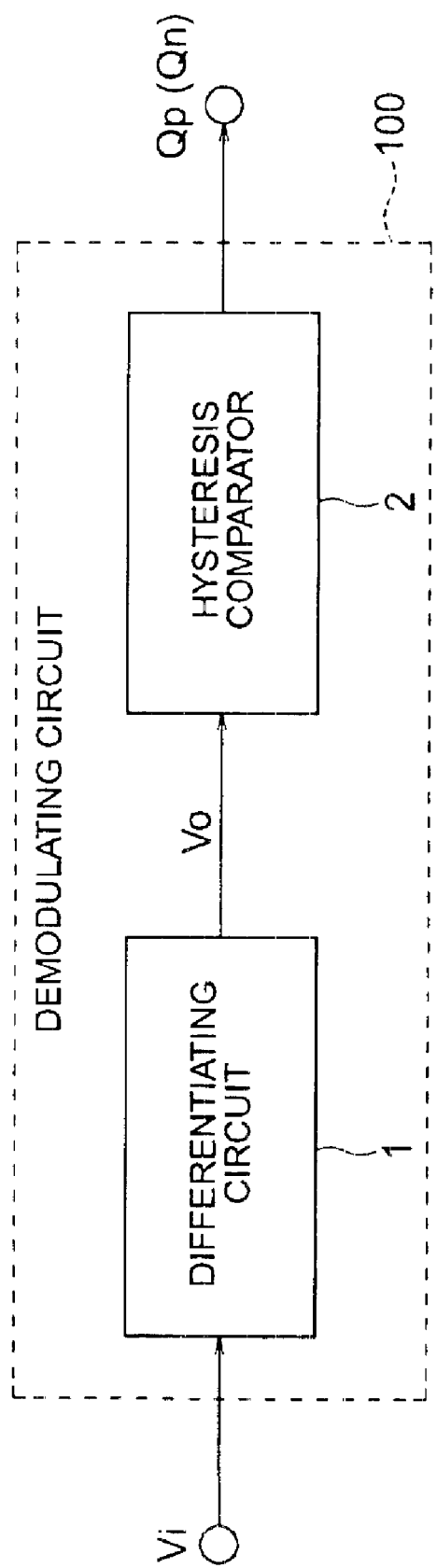
FIG. 1 is a block diagram showing a demodulating circuit according to the present invention.

Embodiments of the invention will now be described with reference to the attached drawings. Circuit elements such as resistors and transistors will be numbered consecutively from one in each drawing. Reference characters such as T1, for example, may therefore indicate different elements in different drawings.

First Embodiment

Referring to the block diagram in FIG. 1, the demodulating circuit 100 in the following embodiments receives a pulse signal Vi that may include runs of consecutive 1's or 0's of up to a specified length, demodulates the pulse signal Vi, and outputs a positive-phase demodulated signal Qp (and/or a negative-phase demodulated signal Qn) at prescribed high and low logic levels. The demodulating circuit 100 comprises a differentiating circuit 1 and a hysteresis comparator 2. The differentiating circuit 1 detects the change in voltage at the rise or fall of the input pulse signal Vi and generates a differentiated signal Vo corresponding approximately to the change. The hysteresis comparator 2 compares the differentiated signal Vo with a reference voltage Vr1 according to a pair of threshold voltages VothH and VothL, where VothH is higher than Vr1 and VothL is lower than Vr1. The hysteresis comparator 2 switches output states when Vo crosses these threshold voltage levels VothH and VothL, rather than when Vo crosses the reference voltage level Vr1. As long as Vo remains between VothH and VothL, the demodulated signal or signals output from the hysteresis comparator 2 maintain their existing logic levels. A positive-phase demodulated signal Qp, for example, goes high when Vo goes above VothH, then remains high until Vo goes below VothL.

Figure 2:
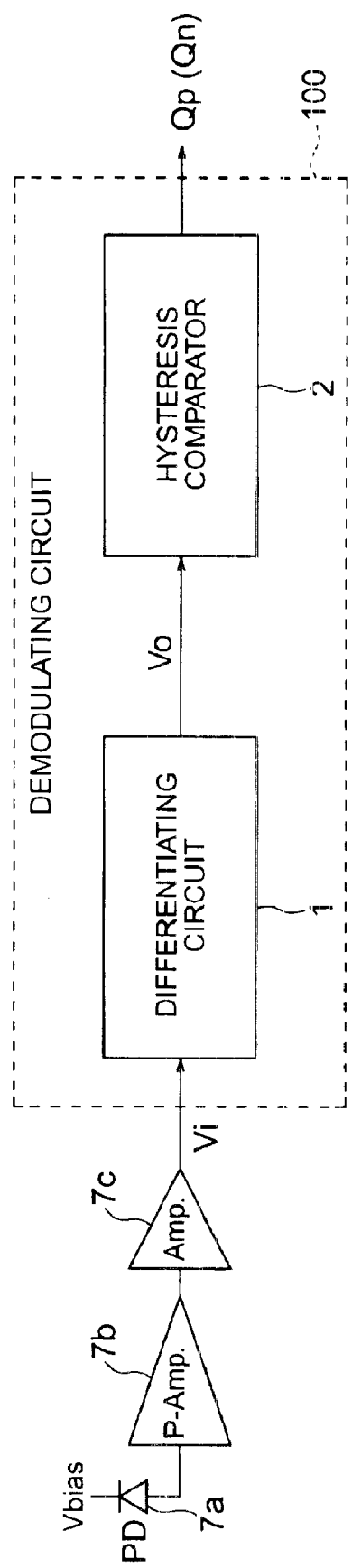
FIG. 2 is a block diagram showing an exemplary usage of the demodulating circuit in FIG. 1 in an optical receiving circuit.

FIG. 2 shows an exemplary usage of the demodulating circuit in FIG. 1 in an optical receiving circuit. An optical receiving element 7a comprising a photodiode (PD) to which a bias voltage (Vbias) is applied outputs a current signal responsive to the received light level. A preamplifier (P-Amp.) 7b converts the current signal to a voltage pulse signal that is likewise responsive to the received light level. A multi-stage amplifier (Amp.) 7c amplifies this voltage pulse signal preparatory to demodulation. Capacitive coupling may be used between the individual stages of the multi-stage amplifier 7c, in which case the dc output level varies depending on whether the amplitude of the pulse signal is in the linear or non-linear amplification range, the ratio of 1's to 0's, and the lengths of runs of 1's or 0's, as noted above. Even when the individual stages of the multi-stage amplifier 7c are not coupled by capacitors, the dc output level may vary according to temperature variations and variations in the power supply voltage.

Figure 3:
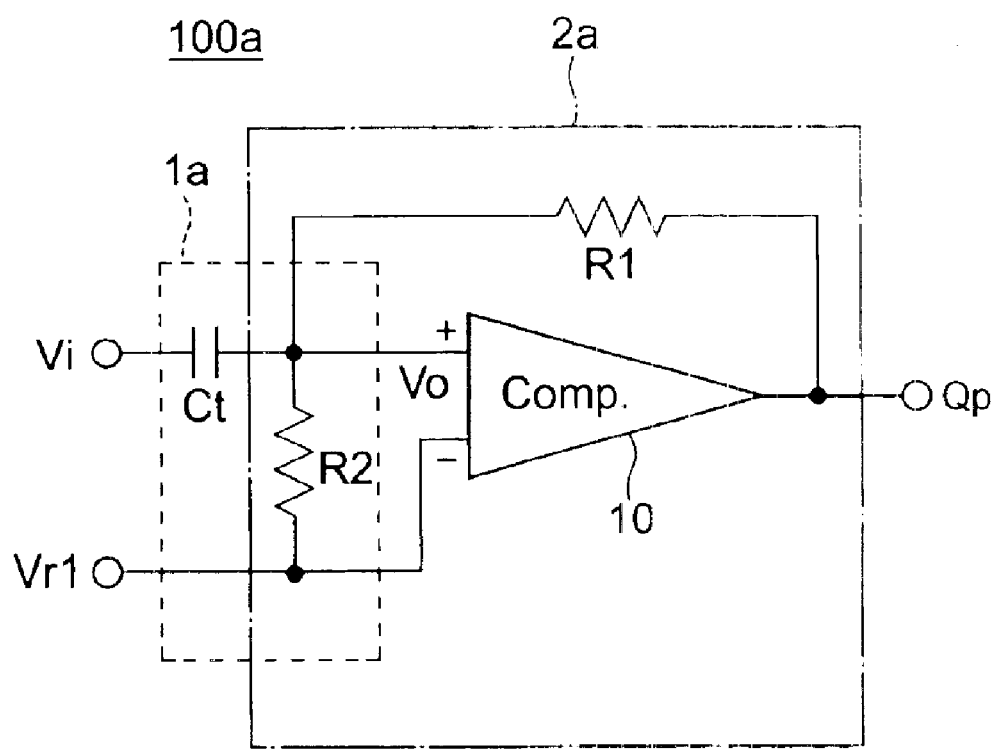
FIG. 3 is a block diagram showing the differentiating circuit and hysteresis comparator in more detail in a demodulating circuit illustrating a first embodiment of the invention.

The block diagram in FIG. 3 shows the differentiating circuit 1a and hysteresis comparator 2a in the demodulating circuit 100a in the first embodiment more detail. The hysteresis comparator 2a includes a comparator element (Comp.) 10, a first resistance element R1, and a second resistance element R2. The comparator element 10 has a non-inverting (+) input terminal for input of a voltage responsive to the differentiated signal Vo, an inverting (−) input terminal for input of a first reference voltage Vr1, and an output terminal for output of a positive-phase demodulated signal Qp responsive to the voltage difference between the non-inverting and inverting inputs. The first resistance element R1 couples the output terminal of the comparator element 10 to its non-inverting (+) input terminal. The second resistance element R2 couples the first reference voltage Vr1 to the non-inverting (+) input terminal of the comparator element 10. The differentiating circuit 1a includes the second resistance element R2 and a differentiating capacitor Ct coupling the input pulse signal Vi to the non-inverting (+) input terminal of the comparator element 10. Strictly speaking, the differentiating circuit has a compound resistance element, including both resistance elements R1 and R2 seen from the non-inverting (+) input terminal of the comparator element 10, but the circuit analysis can be simplified by regarding only the second resistance element R2 as part of the differentiating circuit.

In the demodulating circuit 100a in FIG. 3, the first reference voltage Vr1 is input to the inverting (−) input terminal of the comparator element 10 in the hysteresis comparator 2a. The positive-phase demodulated signal Qp is output at the high or low logic level. The first and second resistance elements R1, R2 constitute a feedback circuit that provides positive feedback at the non-inverting (+) input terminal of the comparator element 10 by dividing the potential difference between the positive-phase demodulated signal Qp and the first reference voltage Vr1. In the differentiating-circuit 1a, the differentiating capacitor Ct and the second resistance element R2 detect the change in voltage at the rise or fall of the input pulse signal Vi and output a differentiated signal Vo, responsive to the amount of voltage change.

In the following description, Vo will represent the voltage that would be output by the differentiating circuit 1a if it were not connected to the hysteresis comparator 2a. Thus Vo is normally held at the level of the first reference voltage Vr1, but when the input pulse signal Vi rises, the differentiated signal Vo temporarily rises by an equivalent amount, and when the input pulse signal Vi falls, the differentiated signal Vo temporarily falls by an equivalent amount.

The hysteresis characteristic of the hysteresis comparator 2a in the first embodiment operates in the following way.

When the potential difference between the output Qp of the comparator element 10 and the first reference voltage Vr1 is divided by the first and second resistance elements R1 and R2, the differentiating capacitor Ct is charged or discharged according to the divided voltage, which is also supplied to the non-inverting (+) input terminal of the comparator element 10 as positive feedback.

The first reference voltage Vr1 is between the high and low logic levels. Accordingly, when the output Qp of the comparator element 10 goes high, the non-inverting (+) input terminal is brought to a level higher than the first reference voltage Vr1, maintaining Qp at the high logic level by positive feedback. Similarly, when Qp goes low, the non-inverting (+) input terminal of the comparator element 10 is brought to a level lower than the first reference voltage Vr1, maintaining Qp at the low logic level by positive feedback.

The hysteresis comparator 2a has an upper threshold voltage VothH higher than the first reference voltage Vr1 and a lower threshold voltage VothL lower than the first reference voltage Vr1, these threshold voltages being determined by Vr1 and the resistance ratio R1/R2. These threshold voltages are the voltage levels that the differentiated voltage Vo must cross in order to overcome the positive feedback and reverse the voltage relationship between the inverting and non-inverting input terminals of the comparator element 10. When this voltage relationship is reversed, the positive feedback also reverses. The reversed positive feedback quickly switches the logic state of the positive-phase demodulated signal Qp, and maintains Qp at the switched logic state until the differentiated signal Vo crosses the opposite threshold voltage.

An input-output characteristic in which the existing output voltage level or logic output state is maintained until the input voltage crosses an upper or lower threshold voltage level as described above is generally referred to as a hysteresis characteristic. Thus, the circuit comprising the comparator element 10, first resistance element R1, and second resistance element R2 functions as a hysteresis comparator 2a that converts an input voltage to a logic-level voltage signal with a hysteresis characteristic, thereby generating the positive-phase demodulated signal Qp.

Since the hysteresis comparator 2a has a hysteresis characteristic as described above, when the input voltage crosses a threshold voltage level to invert the logic output level of the hysteresis comparator 2a, this input state only has to be maintained for a short time, just long enough for the input to be recognized and the output to invert. Once the logic output state of the hysteresis comparator 2a has inverted, the inverted state is maintained by the positive feedback operation. Thus, there is no need for the input signal to stay at a voltage exceeding the threshold voltage level. It suffices for the differentiating circuit 1a to detect rising and falling edges in the input pulse signal Vi, and output corresponding differentiated voltages for a short time following each detected edge.

The short time associated with the detected edge should be longer than the time required for the output of the hysteresis comparator 2a to invert and shorter than the width of a single time slot in the pulse signal Vi. When the differentiated signal Vo moves away from the first reference voltage level Vr1, it only has to cross the upper threshold voltage level VothH or lower threshold voltage level VothL long enough to satisfy these conditions.

The time for which the differentiated signal remains above the upper threshold voltage level VothH or below the lower threshold voltage level VothL depends on the time constant of the differentiating circuit 1a in FIG. 3. Basically, it depends on the resistance value of the second resistance element R2, although there is also a non-linear effect when the output Qp of the comparator element 10 inverts.

Figure 4:
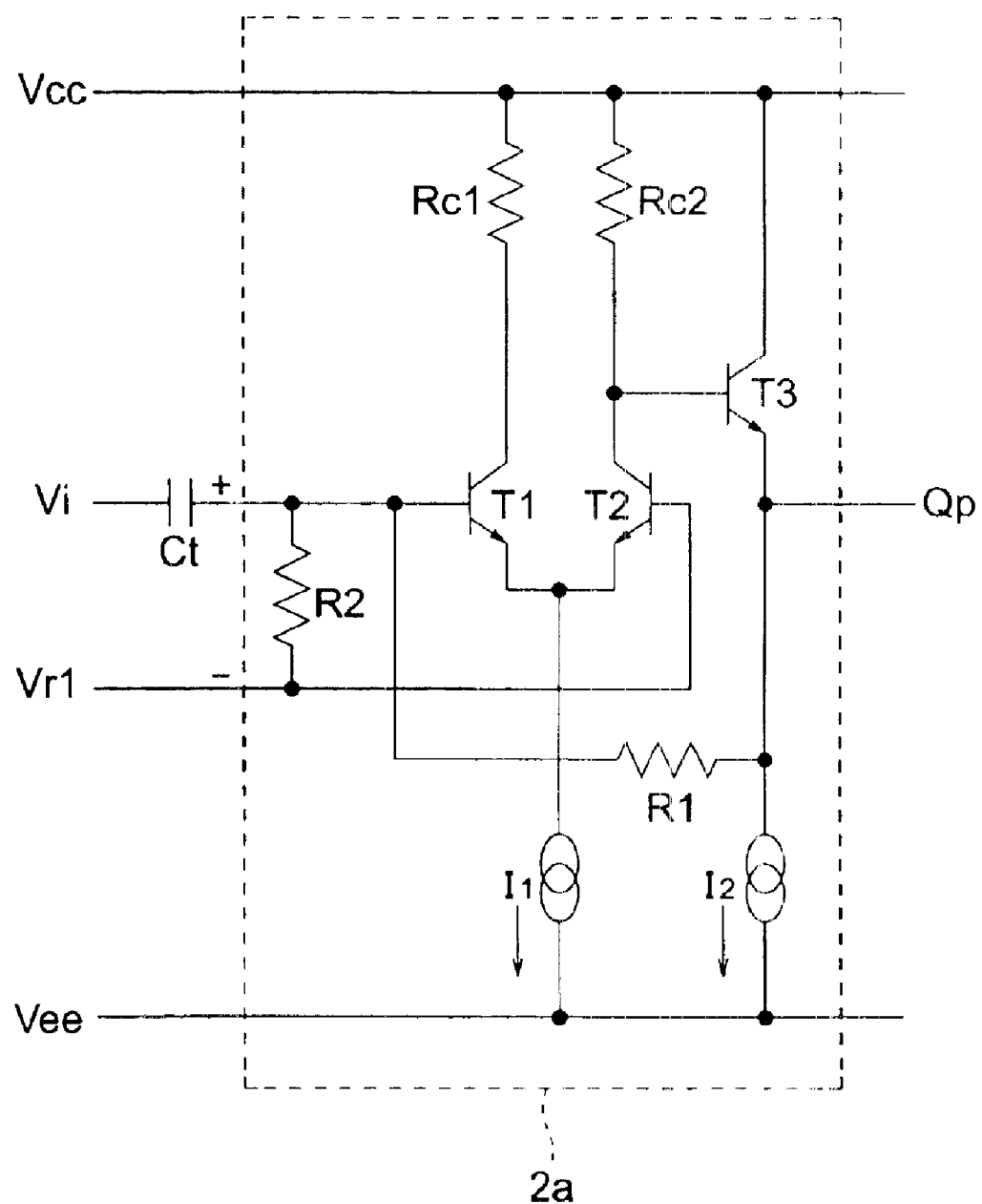
FIG. 4 is a circuit diagram showing the hysteresis comparator in FIG. 3 in more detail.

Referring to the circuit diagram in FIG. 4, the comparator element 10 in the-hysteresis comparator 2a includes bipolar transistors T1, T2, and T3 coupled between a power-supply potential Vcc and a ground potential Vee, resistors Rc1 and Rc2, and current sources sinking currents I1 and I2. Current I1 is conducted on a parallel path through bipolar transistor T1 and resistor Rc1, which are connected in series, and bipolar transistor T2 and resistor Rc2, which are likewise connected in series. Current I2 is conducted through bipolar transistor T3, the base of which is connected to the collector of bipolar transistor T2 and one end of resistor Rc2. The differentiated signal is input to the base of bipolar transistor T1, while the first reference voltage Vr1 is input to the base of bipolar transistor T2. The positive-phase demodulated signal Qp is output from the emitter of bipolar transistor T3.

Figure 5:
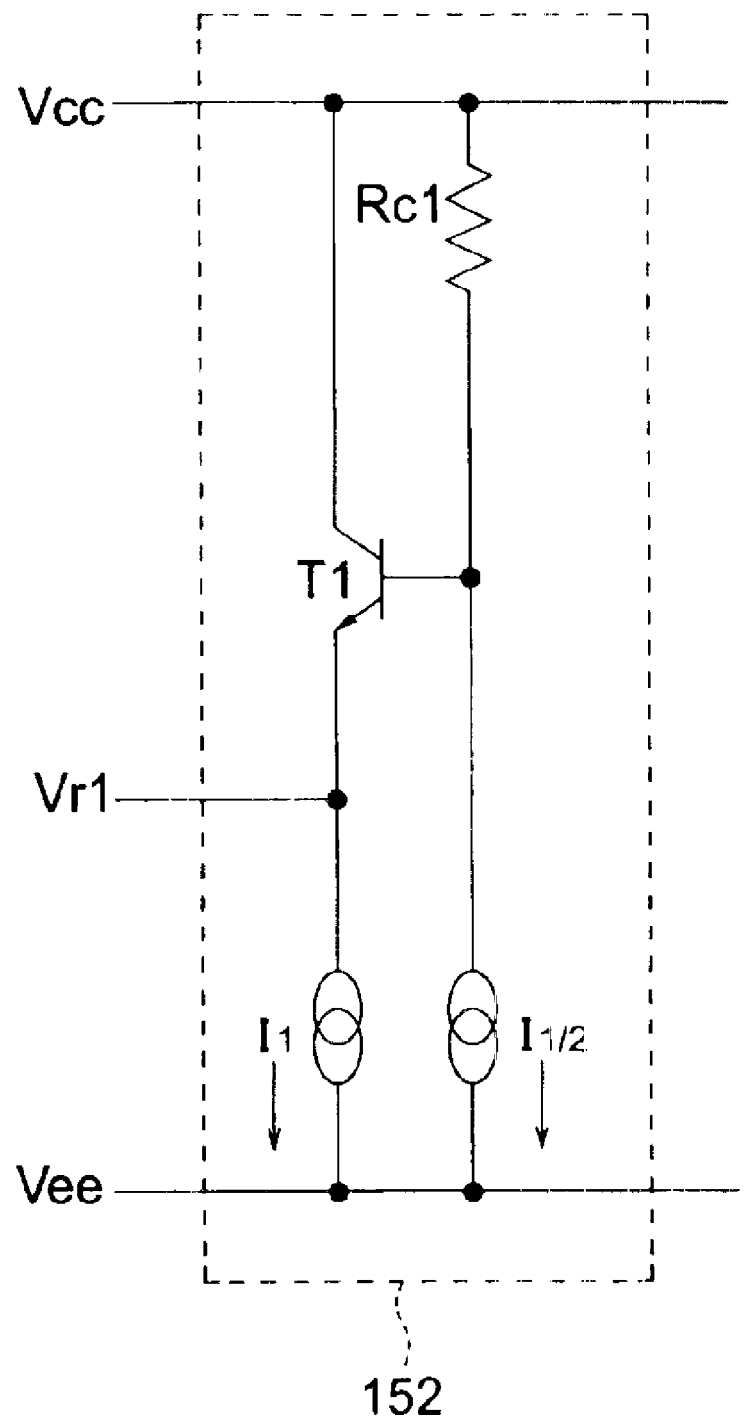
FIG. 5 is a circuit diagram showing a circuit for supplying a first reference voltage to the demodulating circuit in FIG. 3.

Referring to FIG. 5, the circuit 152 that supplies the first reference voltage Vr1 to the demodulating circuit in FIG. 3 comprises another bipolar transistor T1 and another resistor Rc1 connected in parallel between the power-supply potential Vcc and the ground potential Vee. One end of the resistor Rc1 is connected to the base of the bipolar transistor T1. Current sources sink a current (I1) through bipolar transistor T1 and a current (I1)/2 half as large through resistor Rc1. The first reference voltage Vr1 is output from the emitter of bipolar transistor T1.

Figure 6:
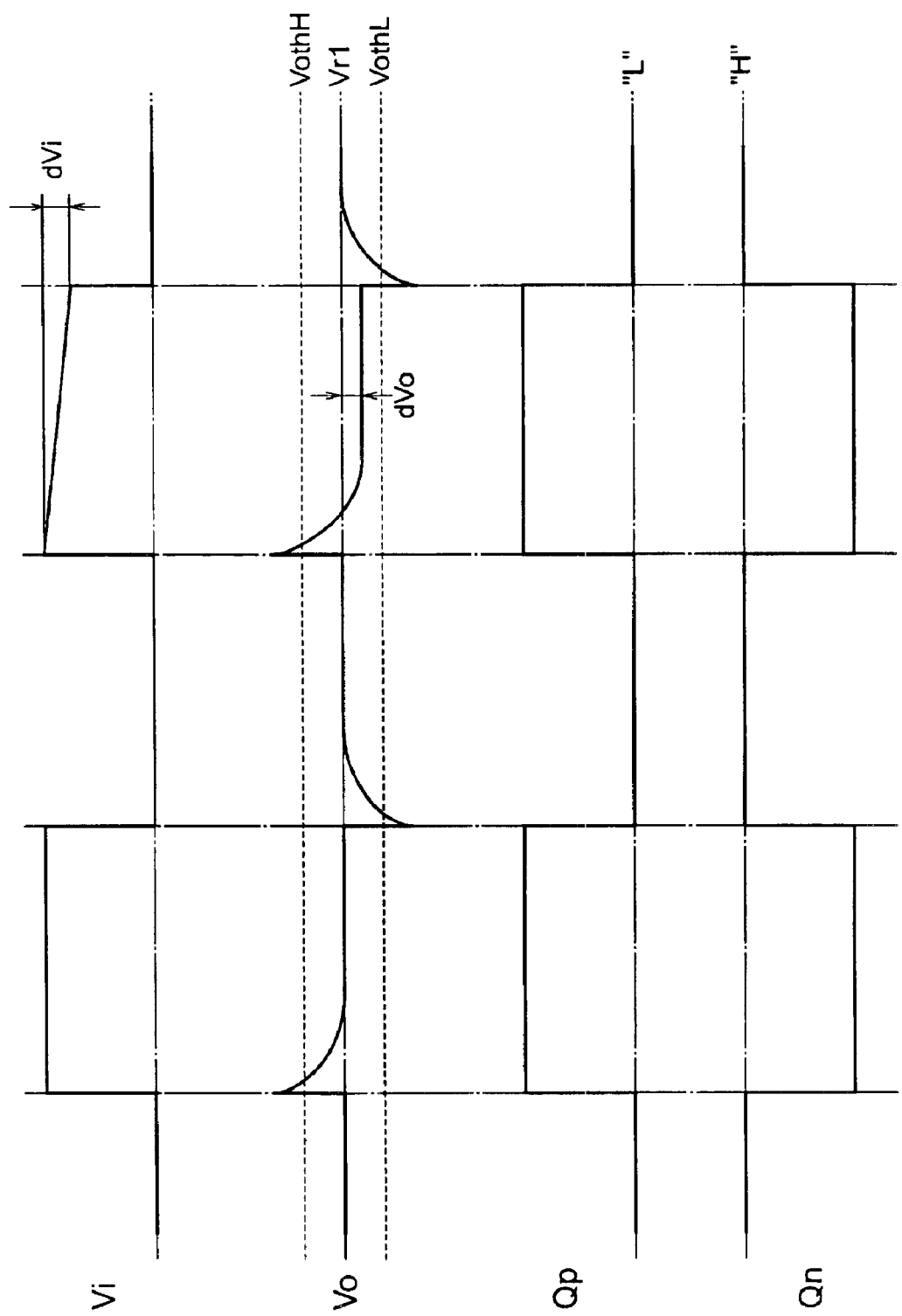
FIG. 6 is a waveform diagram showing waveforms of the pulse signal input to the demodulating circuit in FIG. 1, the resulting differentiated signal, and positive-phase and negative-phase demodulated signals.

Next, the operation of the demodulating circuit in the first embodiment will be described with reference to FIG. 6, which shows waveforms of the signals indicated in FIG. 1: the pulse signal Vi input to the demodulating circuit, the differentiated signal Vo obtained from the pulse signal Vi, and the positive-phase demodulated signal Qp output from the hysteresis comparator 2. FIG. 6 also shows a negative-phase demodulated signal Qn, complementary to Qp, that will be employed in subsequent embodiments. Voltage VothH in FIG. 6 is the upper threshold voltage at which the output of the hysteresis comparator 2 goes high ('H'), while voltage VothL is the lower threshold voltage at which the output of the hysteresis comparator 2 goes low ('L'). Voltage Vr1 is the first reference voltage.

As shown by the first two waveforms in FIG. 6, when a rising or falling edge occurs in the input pulse signal Vi, the differentiated output Vo moves sharply away from the first reference voltage Vr1, positively exceeds the upper threshold voltage VothH or negatively exceeds the lower threshold voltage VothL for a short time, and then returns smoothly and rapidly to a level between the upper and lower threshold voltages. At the rise of the first pulse of the input signal Vi in FIG. 6, for example, the differentiated output Vo rises above the upper threshold voltage VothH, then returns to the first reference voltage Vr1 and remains at this voltage level until the fall of the input signal Vi. The upper threshold voltage VothH and the lower threshold voltage VothL can be set to appropriate values by appropriate selection of the first reference voltage Vr1 and the positive feedback ratio (R1/R2).

As shown by the second and third waveforms in FIG. 6, when the differentiated output Vo rises above the upper threshold voltage VothH, the positive-phase demodulated signal Qp rises very quickly to the high logic level, and is kept at the high level by hysteresis even after Vo returns to the first reference voltage Vr1. Next, when the differentiated output Vo goes below the lower threshold voltage VothL, the positive-phase demodulated signal Qp quickly falls back to the low logic level, and remains there even after the differentiated output Vo returns to Vr1. The positive-phase demodulated signal Qp thus comprises pulses that rise and fall with the same timing as the rise and fall of the input pulse signal Vi.

In the second pulse in FIG. 6, after the voltage of the input signal Vi rises, it gradually drops by an amount dVi because of, for example, a drop in the power supply voltage. Hysteresis prevents this type of gradual variation in the input pulse signal Vi from affecting the demodulated output or causing a possible malfunction. The gradual voltage drop during the second pulse of the input signal Vi in FIG. 6 causes the differentiated voltage Vo to return to a level lower than the first reference voltage Vr1 by an amount dVo, but dVo is less than the difference between the first reference voltage Vr1 and the lower threshold voltage VothL. Accordingly, the gradual drop does not affect the output Qp of the hysteresis comparator 2a, because the differentiated output Vo remains above the lower threshold voltage level, and thus cannot invert Qp from the high to the low logic level. The demodulated signal Qp is therefore held at the high logic level, maintaining a correct pulse waveform.

As described above, the demodulating circuit in this embodiment has a comparatively simple structure comprising a resistor-capacitor differentiating circuit 1a and a hysteresis comparator 2a with simple positive feedback. The hysteresis created by the positive feedback maintains the logic output state of the hysteresis comparator 2a so that runs of consecutive '1's or '0's of any length can be received and demodulated without error.

The demodulating circuit in this embodiment has following effects:

(A1) The demodulating circuit has a simpler structure and can be implemented with fewer circuit elements than conventional circuits.

(A2) Since the number of circuit elements is small, the power consumption of the demodulating circuit is reduced.

(A3) The demodulating circuit is not affected by offsets resulting from multiple preceding amplification stages.

(A4) No extra integrating circuit or peak hold circuit is needed for dc detection. When the demodulating circuit resumes reception of the pulse signal after a quiescent state, the pulse signal can be received even if it begins with a run of identical '1' or '0' symbols.

Second Embodiment

Figure 7:
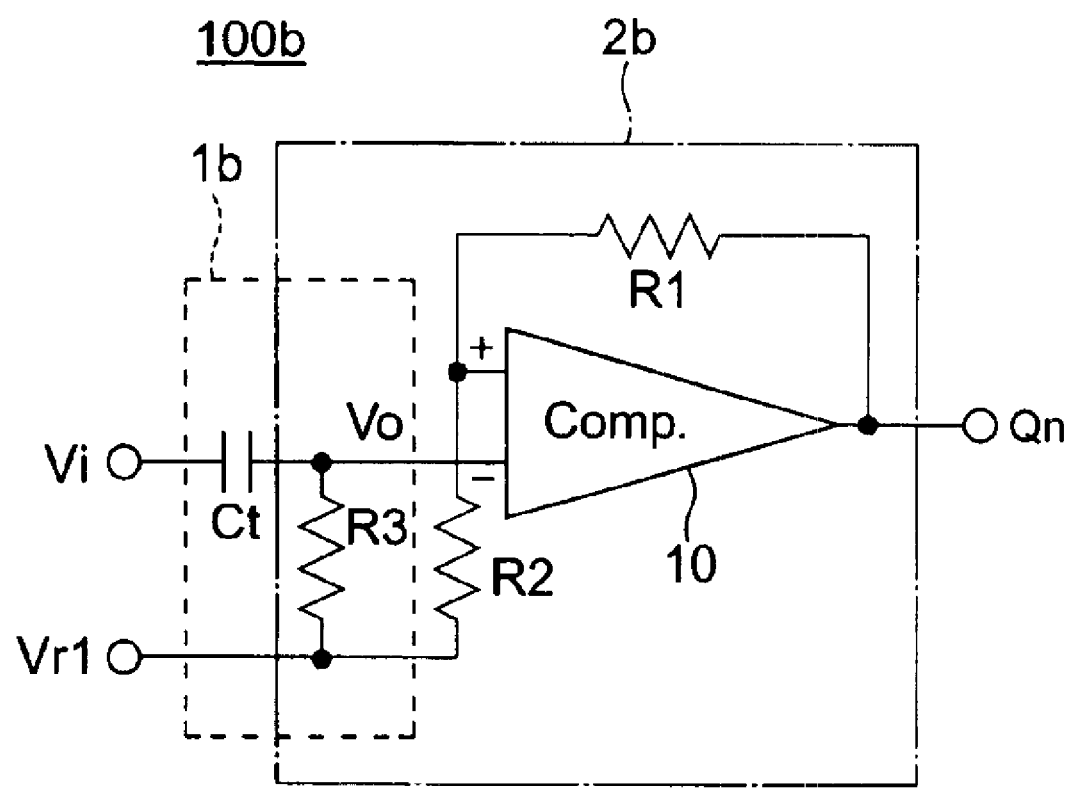
FIG. 7 is a block diagram showing a demodulating circuit in a second embodiment of the invention.

FIG. 7 shows a demodulating circuit 100b in a second embodiment of the present invention. The second embodiment differs from the first embodiment in that the input pulse signal Vi is coupled to the inverting (−) input terminal of the comparator element 10 rather than the non-inverting (+) input terminal. For this reason, the demodulated signal Qn output from the hysteresis comparator 2b is inverted with respect to the input pulse signal Vi. Otherwise, the second embodiment is similar to the first embodiment.

The hysteresis comparator 2b in the demodulating circuit 100b includes the same comparator element 10 and resistance elements R1, R2 as in the first embodiment. The inverting (−) input terminal of the comparator element 10 receives a differentiated signal Vo; the non-inverting (+) input terminal receives a voltage related to the first reference voltage Vr1; the output terminal outputs a negative-phase demodulated signal Qn responsive to the voltage difference between the non-inverting and inverting inputs. The first resistance element R1 couples the output terminal of the comparator element 10 to the non-inverting (+) input terminal. The second resistance element R2 couples the first reference voltage Vr1 to the non-inverting (+) input terminal of the comparator element 10.

The differentiating circuit 1b comprises a differentiating capacitor Ct coupling the input pulse signal Vi to the inverting (−) input terminal of the comparator element 10, and a third resistance element R3 coupling the first reference voltage Vr1 to a node between the differentiating capacitor Ct and the inverting (−) input terminal of the comparator element 10; the differentiated signal Vo is produced at this node. The three resistance elements R1, R2, and R3 constitute a series resistance seen from the inverting (−) input terminal of the comparator element 10.

In the demodulating circuit 100b in FIG. 7, the differentiated signal Vo is input to the inverting (−) input terminal of the comparator element 10 in the hysteresis comparator 2b. The first reference voltage Vr1 is input through resistance element R2 to the non-inverting (+) input terminal of the comparator element 10. The negative-phase demodulated signal Qn is output at the high or low logic level. The first and second resistance elements R1, R2 constitute a feedback circuit that provides positive feedback at the non-inverting (+) input terminal of the comparator element 10 by dividing the potential difference between the negative-phase demodulated signal Qn and the first reference voltage Vr1. In the differentiating circuit 1b, the differentiating capacitor Ct and the third resistance element R3 detect voltage changes at the rise or fall of the pulse signal Vi; the differentiated signal Vo is responsive to the amount of voltage change.

In the differentiating circuit 1b in FIG. 7, the differentiating resistance has the value of the third resistance element R3. Even if the capacitance of the differentiating capacitor Ct is set to a large value, the time constant of the differentiating circuit 1b can be reduced by reducing the resistance of the third resistance element R3, so that the differentiated signal Vo can return to the first reference voltage Vr1 during each input pulse.

The demodulating circuit in the second embodiment also has a comparatively simple structure with low power consumption. When the demodulating circuit resumes pulse reception after a quiescent period, the pulse signal can be received even if it begins with a run of identical '1' or '0' symbols, without being affected by offsets resulting from multiple amplification stages.

Third Embodiment

Figure 8:
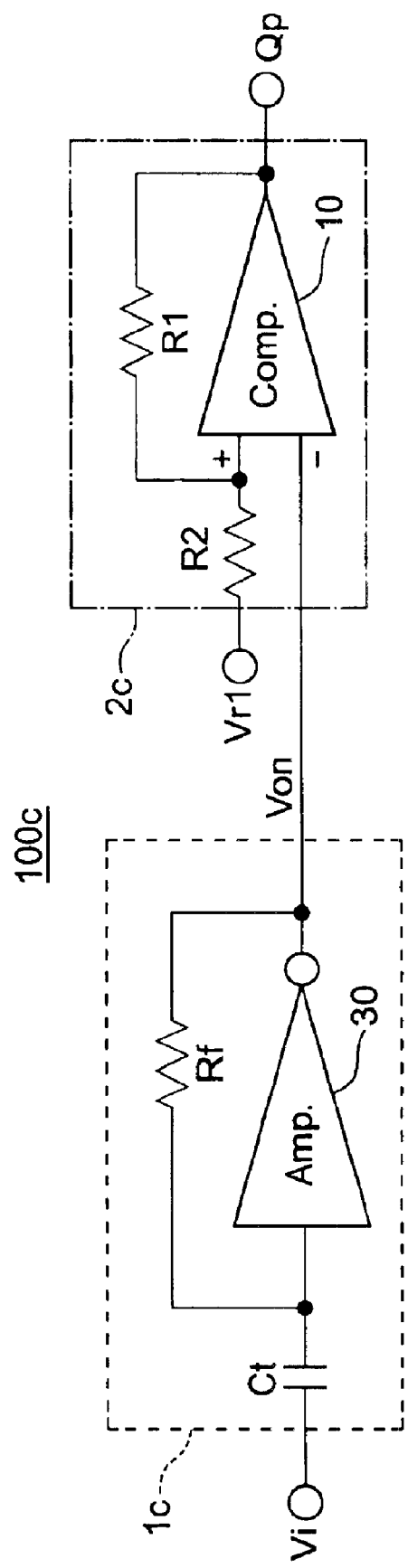
FIG. 8 is a block diagram showing a demodulating circuit in a third embodiment of the invention.

The block diagram in FIG. 8 shows the differentiating circuit 1c and hysteresis comparator 2c in a demodulating circuit 100c according to a third embodiment of the invention. The differentiating circuit 1c comprises an inverting amplifier 30 with a negative feedback resistance element Rf coupled between its input and output terminals. The inverting amplifier 30 receives the input pulse signal Vi via a differentiating capacitor Ct, and outputs a negative-phase differentiated signal Von. The hysteresis comparator 2c includes a comparator element 10, a first resistance element R1, and a second resistance element R2 as in the preceding embodiments. The comparator element 10 receives the negative-phase differentiated signal Von at its inverting (−) input terminal, and outputs a positive-phase demodulated signal Qp at the high or low logic level. The first resistance element R1 couples the positive-phase demodulated signal Qp to the non-inverting (+) input terminal of the comparator element 10. The second resistance element R2 couples a first reference voltage Vr1 to the non-inverting (+) input terminal of the comparator element 10.

Figure 9:
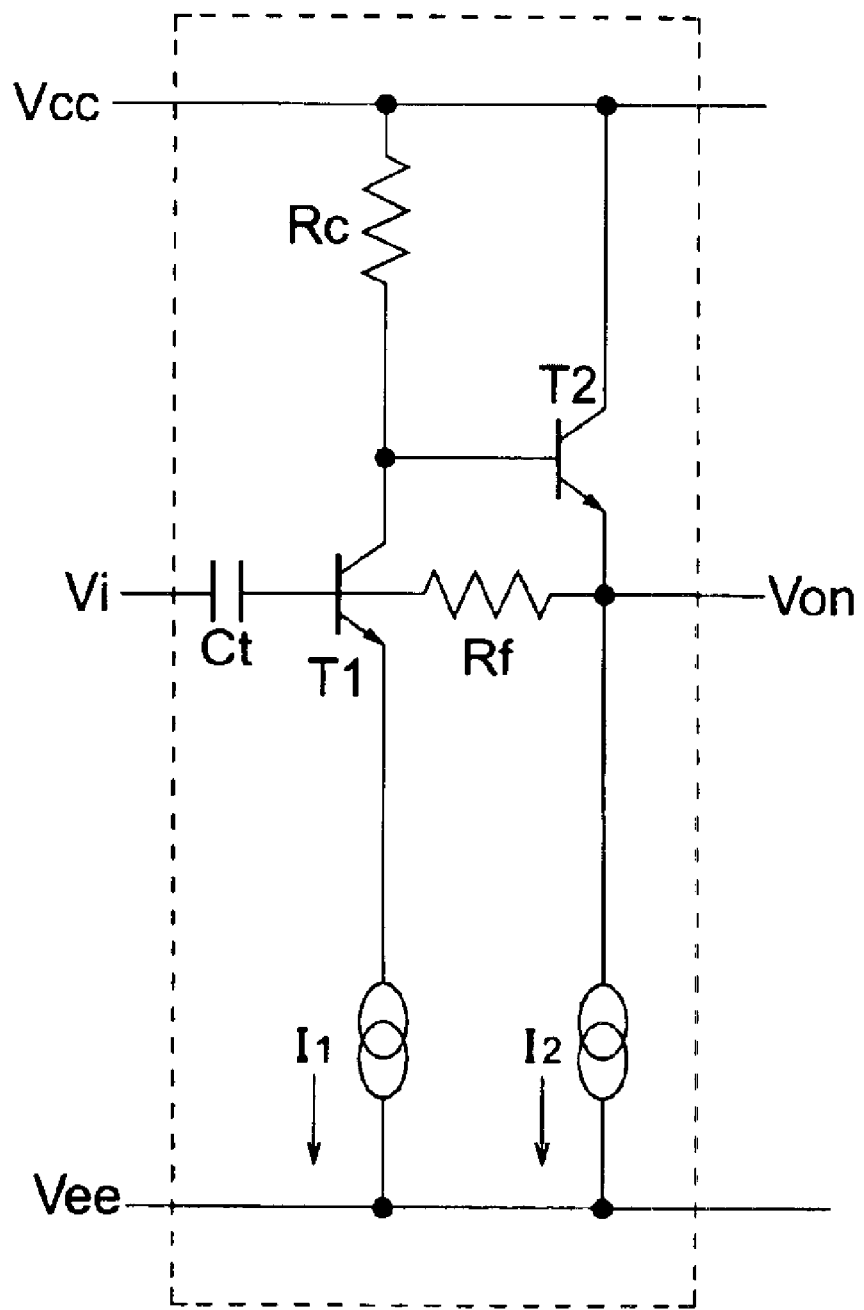
FIG. 9 is a circuit diagram showing the inverting amplifier in FIG. 8.

Referring to the circuit diagram in FIG. 9, the inverting amplifier 30 includes bipolar transistors T1, T2 coupled between the power-supply potential Vcc and the ground potential Vee, a resistor Rc, and current sources that sink currents I1 and I2. One end of resistor Rc is connected to the power-supply potential Vcc; the other end of resistor Rc is connected to the collector of bipolar transistor T1 and the base of bipolar transistor T2. Current I1 is conducted through resistor Rc and bipolar transistor T1; current I2 is conducted through bipolar transistor T2. The input pulse signal Vi is coupled to the base of bipolar transistor T1 through the differentiating capacitor Ct. The negative feedback resistance element Rf is connected between the base of bipolar transistor T1 and the emitter of bipolar transistor T2, from which the negative-phase differentiated signal Von is output.

The differentiating resistance of the differentiating circuit 1c in FIG. 8 has a small value obtained by dividing the resistance value of the negative feedback resistance element Rf by the gain of the inverting amplifier 30. For this reason, even if the capacitance of the differentiating capacitor Ct is set to a large value, the differentiating circuit 1b can have a small time constant, so that a large negative-phase differentiated signal Von can be obtained.

As described above, the demodulating circuit in the third embodiment also has a comparatively simple structure with low power consumption. When the demodulating circuit resumes pulse signal reception after a quiescent period, the pulse signal can be received even if it begins with a run of identical '1' or '0' symbols, without being affected by offsets resulting from multiple preceding amplification stages.

Fourth Embodiment

Figure 10:
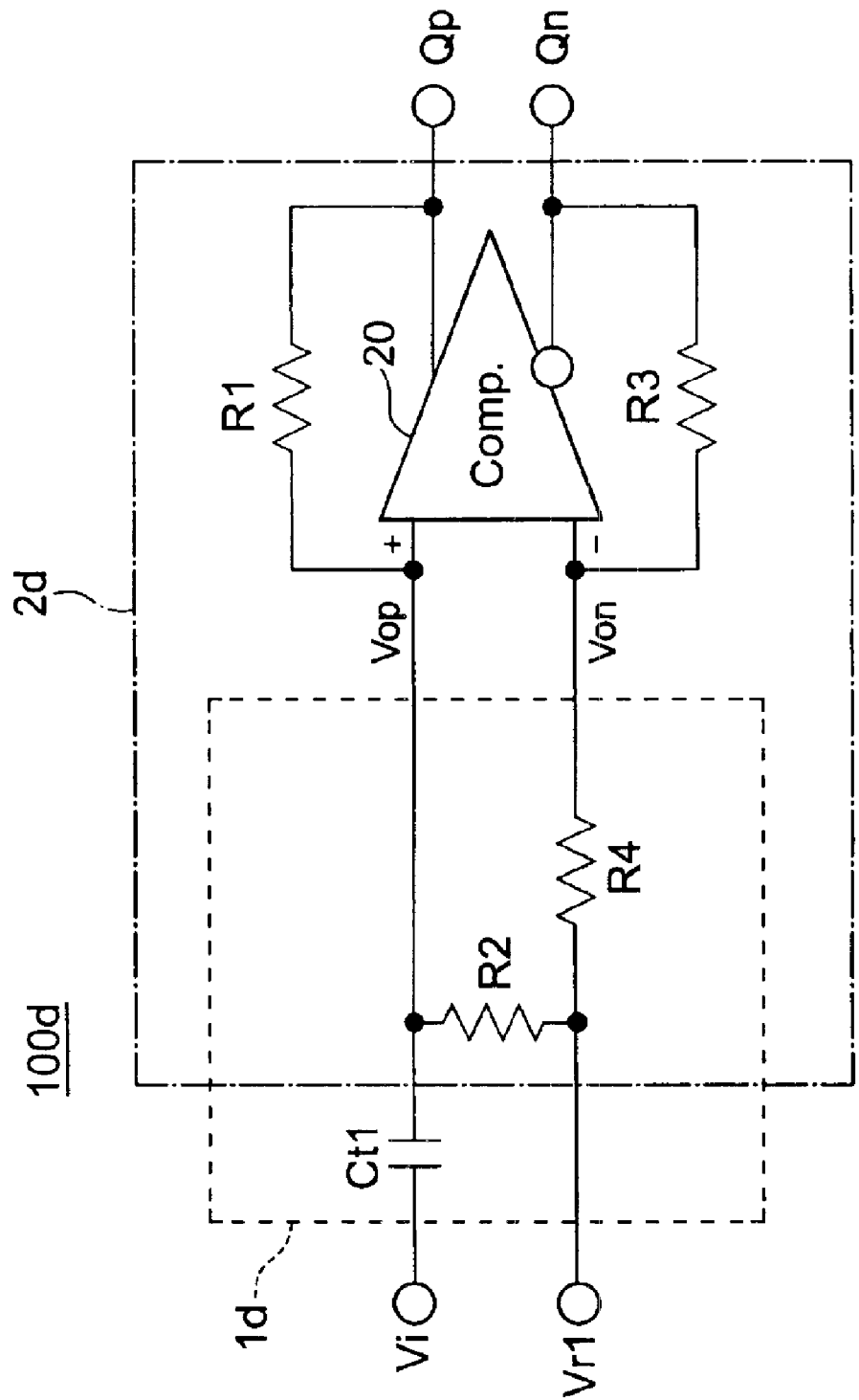
FIG. 10 is a block diagram showing a demodulating circuit in a fourth embodiment of the invention.

The block diagram in FIG. 10 shows the differentiating circuit 1d and hysteresis comparator 2d in a demodulating circuit 100d according to a fourth embodiment of the invention. Differing from the hysteresis comparator 2a in the first embodiment, the hysteresis comparator 2d in the fourth embodiment is a balanced comparator producing a negative-phase demodulated signal Qn as well as a positive-phase demodulated signal Qp. The positive-phase demodulated signal Qp and negative-phase demodulated signal Qn are mutually complementary, as indicated by the waveforms in FIG. 6. The inverting (−) input terminal of the comparator element 20 is coupled through a third resistance element R3 to the Qn output terminal, and through a fourth resistance element R4 to the first reference voltage Vr1. Otherwise, the fourth embodiment is similar to the first embodiment.

The balanced hysteresis comparator 2d in the demodulating circuit 100d in FIG. 10 includes the comparator element 20, a first resistance element R1, a second resistance element R2, the third resistance element R3, and the fourth resistance element R4. The first resistance element R1 and the second resistance element R2 divide the potential difference between the positive-phase demodulated signal Qp and the first reference voltage Vr1 to provide positive feedback at the non-inverting (+) input terminal of the comparator element 20. The third resistance element R3 and the fourth resistance element R4 divide the potential difference between the negative-phase demodulated signal Qn and the first reference voltage Vr1 to provide positive feedback at the inverting (−) input terminal of the comparator element 20. The differentiating circuit 1d includes the second resistance element R2, and a differentiating capacitor Ct1 coupling the input pulse signal Vi to the non-inverting (+) input terminal of the comparator element 20. The four resistance elements R1, R2, R3, and R4 constitute a compound input resistance seen from the non-inverting (+) input terminal of the comparator element 20; the fourth resistance element R4 may also be regarded as part of the differentiating circuit 1d.

Although differing from the first embodiment by generating both positive-phase and negative-phase demodulated signals, the fourth embodiment is consistent with the first embodiment in that positive feedback is provided between the input and the output of the comparator element 20, creating a hysteresis effect.

In the demodulating circuit 100a in the first embodiment in FIG. 3, let Vich be the voltage difference between the non-inverting and inverting inputs to the comparator element 10 when its output is held at the high logic level (Vqh), and let Vicl be the voltage difference between the non-inverting and inverting inputs to the comparator element 10 when its output is held at the low logic level (Vql). These voltage differences Vich and Vicl can be expressed by the following formulas (1) and (2). The asterisk (*) in these formulas and other formulas that follow indicates multiplication:

$$Vich = (Vqh - Vr1) * R2/(R1+R2) \quad (1)$$

$$Vicl = (Vql - Vr1) * R2/(R1+R2) \quad (2)$$

In order to equalize the retention conditions of the high and low logic output states of the comparator element 10, Vich and Vicl must be equal in magnitude and opposite in sign (Vich=−Vicl). This constrains the first reference voltage Vr1 to the value given by the following formula (3):

$$Vqh - Vr1 = -(Vql - Vr1)$$

$$Vr1 = (Vqh + Vql)/2 \quad (3)$$

If the first reference voltage Vr1 has been set to a value that does not satisfy formula (3), Vich=−Vicl does not hold. As a result, it may become difficult to maintain one of the logic output states of the comparator element 10. Alternatively, the switching delay of the comparator element 10 may differ depending on whether the transition of the logic output state is from high to low or from low to high.

If Ac indicates the gain of the comparator element 10, then to stabilize the logic output state by placing the comparator element 10 in an over-input condition, the following inequalities (4) should also be satisfied:

$$Vich > (Vqh - Vql)/Ac$$

$$-Vicl > (Vqh - Vql)/Ac \quad (4)$$

The conditions in these inequalities (4) can be satisfied through appropriate selection of the resistance values of the resistance elements R1 and R2 and the first reference voltage Vr1.

It will now be assumed that in the demodulating circuit 100d in the fourth embodiment in FIG. 10, the positive-phase demodulated signal Qp and the negative-phase demodulated signal Qn output from the comparator element 20 have the same high logic level (Vqh) and the same low logic level (Vql). The input voltage differentials Vich and Vicl of the comparator element 20 can then be expressed by the following formulas (5) and (6):

$$Vich = (Vqh - Vr1)*R2/(R1+R2) - (Vql - Vr1)*R4/(R3+R4) \text{ (if Qp is high and Qn is low)} \quad (5)$$

$$Vicl = (Vql - Vr1)*R2/(R1+R2) - (Vqh - Vr1)*R4/(R3+R4) \text{ (if Qp is low and Qn is high)} \quad (6)$$

If the following condition (7) holds, formulas (5) and (6) can rewritten as formulas (8) and (9) below:

$$K = R2/(R1+R2) = R4/(R3+R4) \quad (7)$$

$$Vich = (Vqh - Vql)*K \text{ (if Qp is high and Qn is low)} \quad (8)$$

$$Vicl = (Vql - Vqh)*K \text{ (if Qp is low and Qn is high)} \quad (9)$$

From the above formulas, it can be seen that the condition Vich=−Vicl can be fulfilled in this embodiment, irrespective of the value of the first reference voltage Vr1, by satisfying formula (7).

Like the preceding embodiments, the demodulating circuit in the fourth embodiment has a comparatively simple structure with low power consumption, can start signal reception from the first pulse after a quiescent period, and is not affected by offsets resulting from multiple amplification stages. Moreover, in the fourth embodiment, the permissible range of variation of the first reference voltage Vr1 is increased, providing greater latitude in the design of the demodulating circuit, and enabling it to tolerate supply voltage and temperature variations, which generally cause the first reference voltage Vr1 to vary. Further, the condition Vich=−Vicl, which was difficult to satisfy in the first to third embodiments, can be readily fulfilled in the fourth embodiment.

Fifth Embodiment

Figure 11:
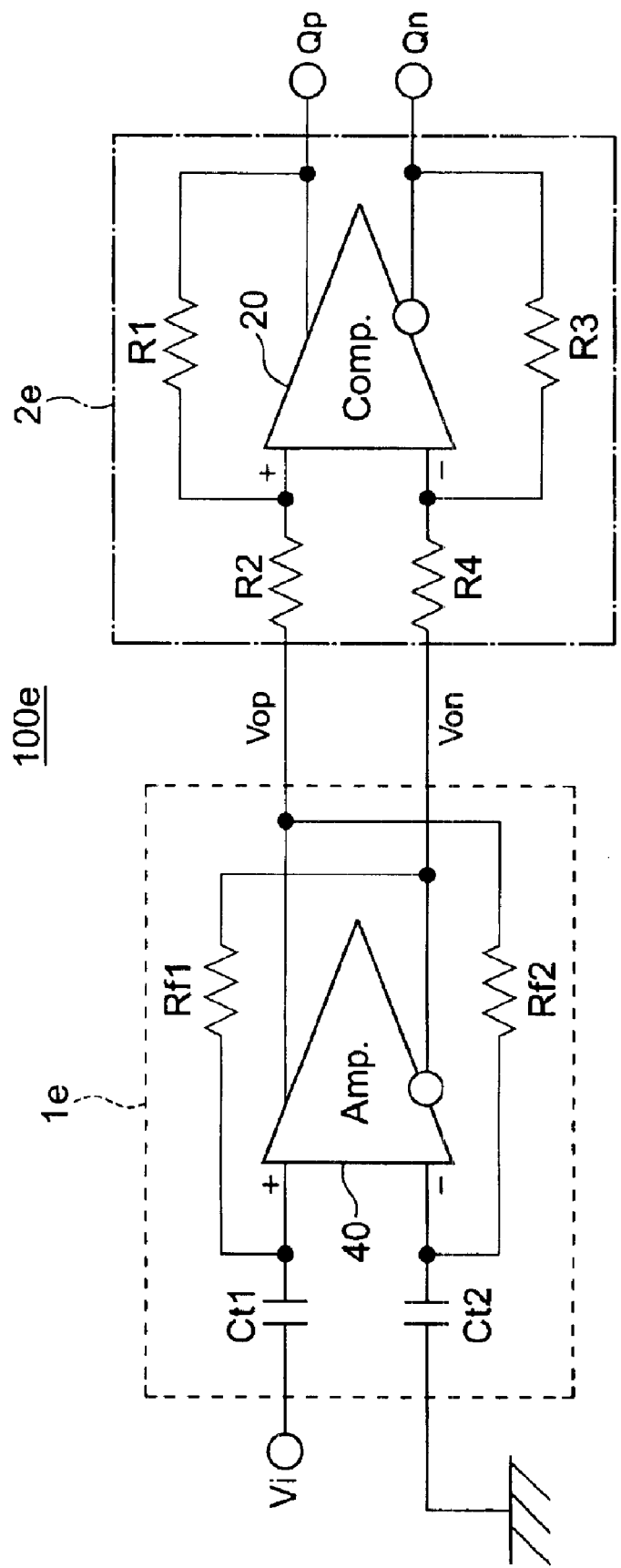
FIG. 11 is a block diagram showing a demodulating circuit in a fifth embodiment of the invention.

The block diagram in FIG. 11 shows the differentiating circuit 1e and balanced hysteresis comparator 2e in a demodulating circuit 100e according to a fifth embodiment of the invention.

The differentiating circuit 1e includes a differential amplifier 40 that outputs a positive-phase signal Vop and a negative-phase signal Von, a first negative feedback resistance element Rf1, a second negative feedback resistance element Rf2, and a pair of differentiating capacitors Ct1, Ct2. The non-inverting (+) input terminal of the differential amplifier 40 is coupled through the first negative feedback resistance element Rf1 to the negative-phase (Von) output terminal, while the inverting (−) input terminal of the differential amplifier 40 is coupled through the second negative feedback resistance element Rf2 to the positive-phase (Vop) output terminal. Differentiating capacitor Ct1 couples the input pulse signal Vi to the non-inverting (+) input terminal. Differentiating capacitor Ct2 couples the inverting (−) input terminal to ground.

The balanced hysteresis comparator 2e includes a comparator element 20 that produces a positive-phase demodulated signal Qp and a negative-phase demodulated signal Qn, and four resistance elements R1, R2, R3, R4. The demodulated signals Qp and Qn are logic-level voltage signals. The first resistance element R1 and the second resistance element R2 divide the potential difference between the positive-phase demodulated signal Qp and the positive-phase differentiated signal Vop to provide positive feedback at the non-inverting (+) input terminal of the comparator element 20. The third resistance element R3 and the fourth resistance element R4 divide the potential difference between the negative-phase demodulated signal Qn and the negative-phase differentiated signal Von to provide positive feedback at the inverting (−) input terminal of the comparator element 20. The balanced hysteresis comparator 2e has a hysteresis characteristic in which the logic output state inverts when either one of the two differentiated signals Vop and Von moves outside the voltage range between an upper and a lower threshold voltage level.

Figure 12:
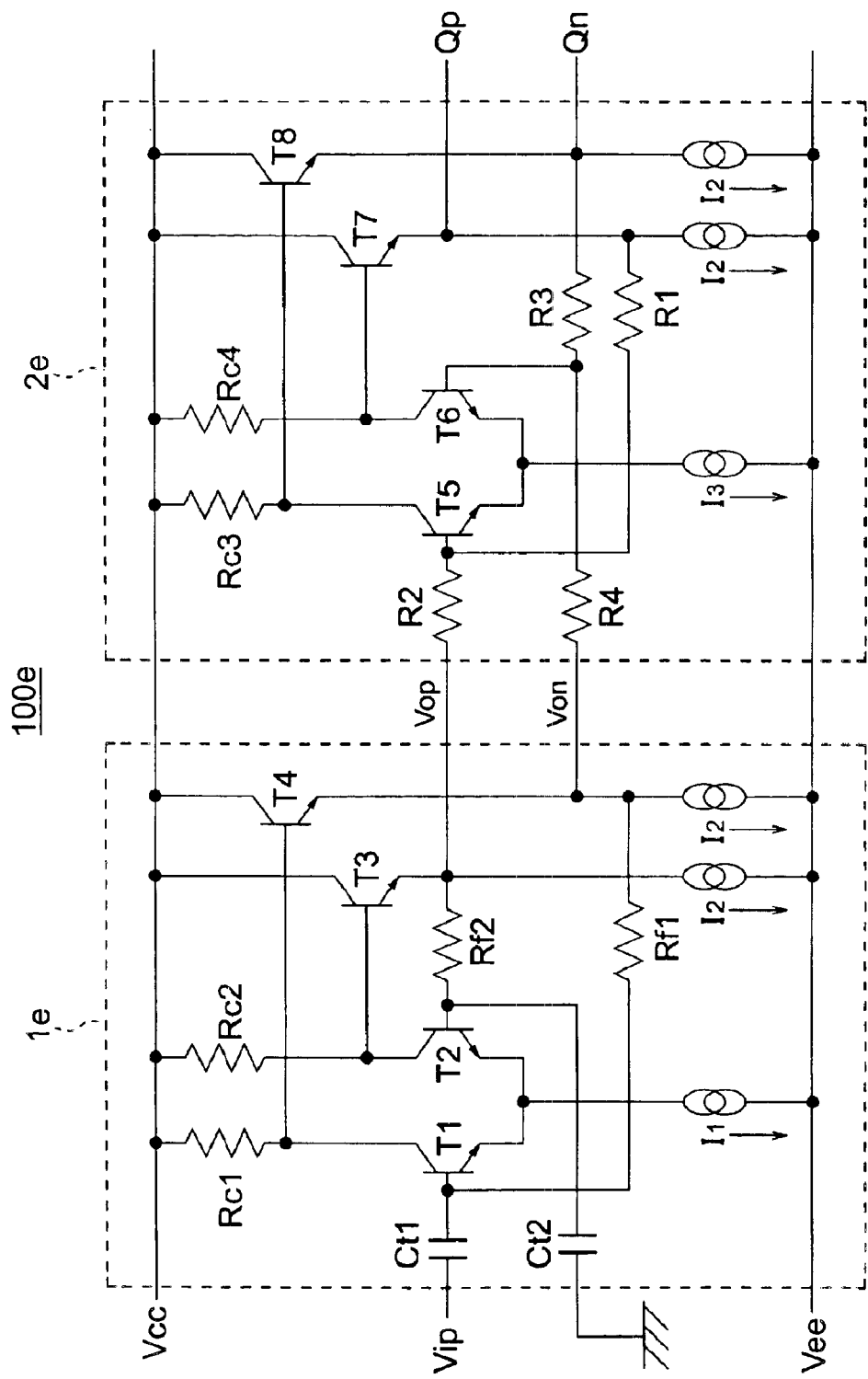
FIG. 12 is a circuit diagram of the demodulating circuit in FIG. 11.

Referring to the circuit diagram in FIG. 12, the differential amplifier 40 in the differentiating circuit 1e includes bipolar transistors T1, T2, T3, and T4 coupled between the power-supply potential Vcc and the ground potential Vee, resistors Rc1 and Rc2, and three current sources that sink currents I1 and I2. Current I1 is conducted through either bipolar transistor T1 and resistor Rc1, which are connected in series, or bipolar transistor T2 and resistor Rc2, which are connected in series. Current I2 is conducted through bipolar transistor T3, the base of which is connected to the collector of bipolar transistor T2 and one end of resistor Rc2. An equal current I2 is conducted through bipolar transistor T4, the base of which is connected to the collector of bipolar transistor T1 and one end of resistor Rc1. When a pulse signal Vip is input to the base of bipolar transistor T1, negative feedback produces a complementary pulse signal at the base of bipolar transistor T2. The positive-phase differentiated signal Vop is output from the emitter of the bipolar transistor T3; the negative-phase differentiated signal Von is output from the emitter of the bipolar transistor T4.

The comparator element 20 in the hysteresis comparator 2e has a similar circuit structure including bipolar transistors T5, T6, T7, and T8, resistors Rc3 and Rc4, and three current sources that sink currents I1 and I2. The positive-phase differentiated signal Vop is input to the base of bipolar transistor T5, while the negative-phase differentiated signal Von is input to the base of bipolar transistor T6. The demodulated signals Qp and Qn are output from the emitters of bipolar transistors T7 and T8, respectively. The difference between the differentiating circuit 1e and the hysteresis comparator 2e is that the former employs negative feedback and the later employs positive feedback.

As the fifth embodiment is comparable to the third embodiment, a restriction that must be imposed on the first reference voltage Vr1 to satisfy the condition Vich=−Vicl in the third embodiment will now be described.

In the demodulating circuit 100c in the third embodiment in FIG. 8, let Vab be the output bias voltage of the inverting amplifier 30 (the output voltage established by negative feedback in the resting state, after capacitor Ct has charged or discharged), let Vich be the voltage difference between the non-inverting and inverting inputs to the comparator element 10 when its output is held at the high logic level (Vqh), and let Vicl be the voltage difference between the non-inverting and inverting inputs to the comparator element 10 when its output is held at the low logic level (Vql). These input voltage differentials Vich and Vicl can be expressed by the following formulas (10) and (11):

$$Vich=(Vqh-Vr1)*R2/(R1+R2)+Vr1-Vab \quad (10)$$

$$Vicl=(Vql-Vr1)*R2/(R1+R2)+Vr1-Vab \quad (11)$$

If K is written for R2/(R1+R2), the requirement for equal magnitudes of opposite sign (Vich=−Vicl) is expressed by the following formula (12).

$$(Vqh+Vql)+2((1-K)*Vr1-Vab)=0 \quad (12)$$

Formula (12) indicates that in order to satisfy the above condition (Vich=−Vicl), there is a restriction involving the quantity K, the first reference voltage Vr1, and the output bias voltage Vab.

In the demodulating circuit 100e in the fifth embodiment in FIG. 11, let Vich be the voltage difference between the non-inverting and inverting inputs to the comparator element 20 when the positive-phase demodulated signal Qp is held at the high logic level (Vqh) and the negative-phase demodulated signal Qn is held at the low logic level (Vqh), and let Vicl be the voltage difference between the non-inverting and inverting inputs to the comparator element 20 when these output logic levels are reversed. Further, let the output bias voltage of the differential amplifier 40 in the resting state, after the capacitors Ct1 and Ct2 have charged or discharged, be Vab. The input voltage differentials Vich and Vicl can be expressed by the following formulas (13) and (14):

$$Vich=(Vqh-Vab)*R2/(R1+R2)-(Vql-Vab)*R4/(R3+R4) \text{ (if Qp is high and Qn is low)} \quad (13)$$

$$Vicl=(Vql-Vab)*R2/(R1+R2)-(Vqh-Vab)*R4/(R3+R4) \text{ (if Qp is low and Qn is high)} \quad (14)$$

The inequalities (4) given in the fourth embodiment must also be satisfied in the fifth embodiment.

If the quantity K satisfies equation (15), formulas (13) and (14) can be rewritten as formulas (16) and (17):

$$K=R2/(R1+R2)=R4/(R3+R4) \quad (15)$$

$$Vich=(Vqh-Vql)*K \text{ (if Qp is high and Qn is low)} \quad (16)$$

$$Vicl=(Vql-Vqh)*K \text{ (if Qp is low and Qn is high)} \quad (17)$$

From the above formulas, it can be seen that the condition Vich=−Vicl can be fulfilled in the fifth embodiment irrespective of the value of the output bias voltage Vab.

The fifth embodiment is thus similar in effect to the fourth embodiment. Specifically, the fifth embodiment has the following effects:

(B1) Although the input voltage differentials Vich and Vidl of the comparator element 20 when the outputs of the comparator element 20 are held at the high or low logic levels are influenced by the first reference voltage Vr1 and the output bias voltage Vab of the amplifier in the differentiating circuit 1c in the third embodiment, this influence can be eliminated in the fifth embodiment.

(B2) In the fifth embodiment, the permissible ranges of variation of the first reference voltage Vr1 and the output bias voltage Vab of the inverting amplifier 30 in the differentiating circuit 1e are increased, providing greater latitude in the design of the demodulating circuit.

(B3) When the supply voltage and temperature of the demodulating circuit vary, the output voltages Vqh and Vql, first reference voltage Vr1, and output bias voltage Vab generally vary with respective temperature coefficients. The fifth embodiment can tolerate such variations.

(B4) The condition Vich=−Vicl, which was difficult to satisfy in the third embodiment, can be readily fulfilled in the fifth embodiment.

Sixth Embodiment

Figure 13:
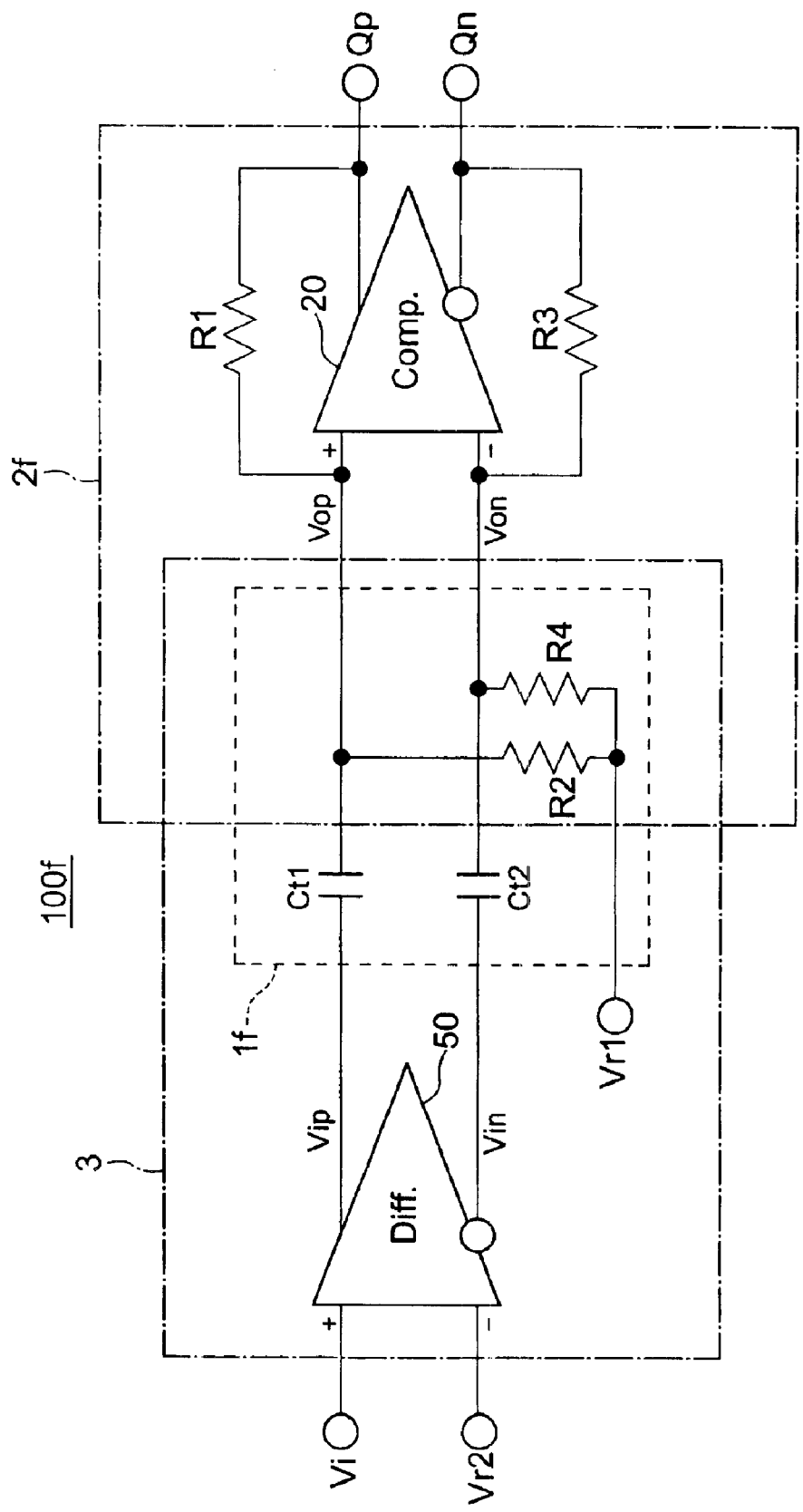
FIG. 13 is a block diagram showing a demodulating circuit in a sixth embodiment of the invention.

The block diagram in FIG. 13 shows a demodulating circuit 100f according to a sixth embodiment of the invention, in which a differential signal generating circuit (Diff) 50 is added to the differentiating circuit 1f to form a differentiating circuit unit 3. The differential signal generating circuit 50 converts the input pulse signal Vi to a pair of differential signals Vip and Vin, so that a more accurately balanced pair of differentiated signals Vop and Von can be applied to the input terminals of the hysteresis comparator 2f. The hysteresis comparator 2f is a balanced comparator of the type used, for example, in the fourth embodiment. The differentiating circuit 1f is similar to the differentiating circuit 1d in the fourth embodiment, except that it includes two differentiating capacitors Ct1, Ct2.

Figure 14:
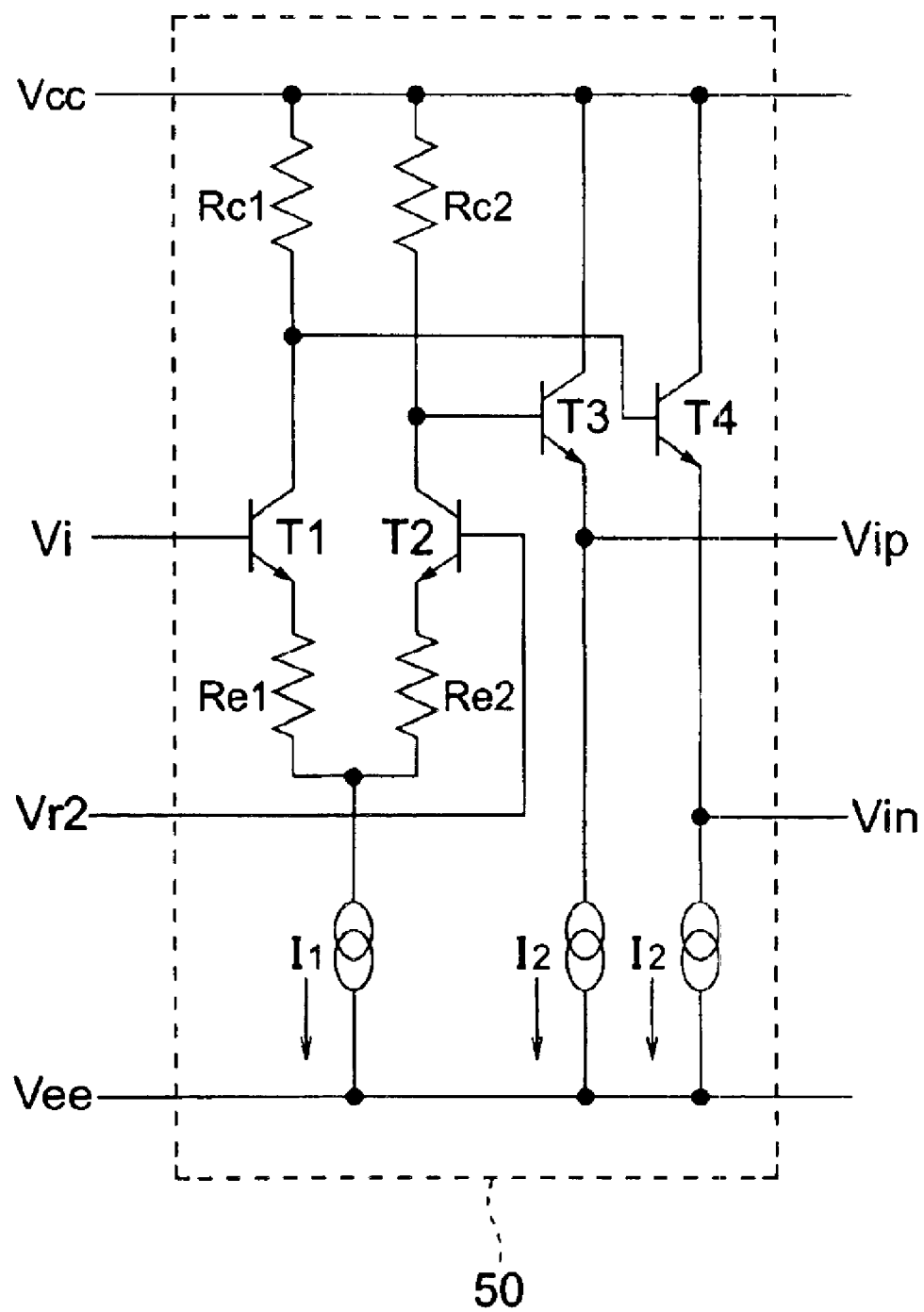
FIG. 14 is a circuit diagram showing the differential signal generating circuit in the demodulating circuit in FIG. 13.

Referring to the circuit diagram in FIG. 14, the differential signal generating circuit 50 includes bipolar transistors T1, T2, T3, and T4 coupled between the power-supply potential Vcc and the ground potential Vee, resistors Rc1, Rc2, Re1, and Re2, and three current sources that sink currents I1 and I2. Resistor Rc1 is connected to the collector of bipolar transistor T1; resistor Re1 is connected to the emitter of bipolar transistor T1. Resistor Rc2 is connected to the collector of bipolar transistor T2; resistor Re2 is connected to the emitter of bipolar transistor T2. Current I1 can follow two parallel paths, one through either resistor Re1, bipolar transistor T1, and resistor Rc1, which are connected in series, the other through resistor Re2, bipolar transistor T2, and resistor Rc2, which are connected in series. Current I2 is conducted from the collector to the emitter of bipolar transistor T3, the base of which is connected to the collector of bipolar transistor T2. An equal current I2 is conducted from the collector to the emitter of bipolar transistor T4, the base of which is connected to the collector of bipolar transistor T1. The pulse signal Vi is input to the base of the bipolar transistor T1, while a second reference voltage Vr2 is input to the base of the bipolar transistor T2. The positive-phase differential signal Vip is output from the emitter of the bipolar transistor T3, while the negative-phase differential signal Vin is output from the emitter of the bipolar transistor T4.

Figure 15:
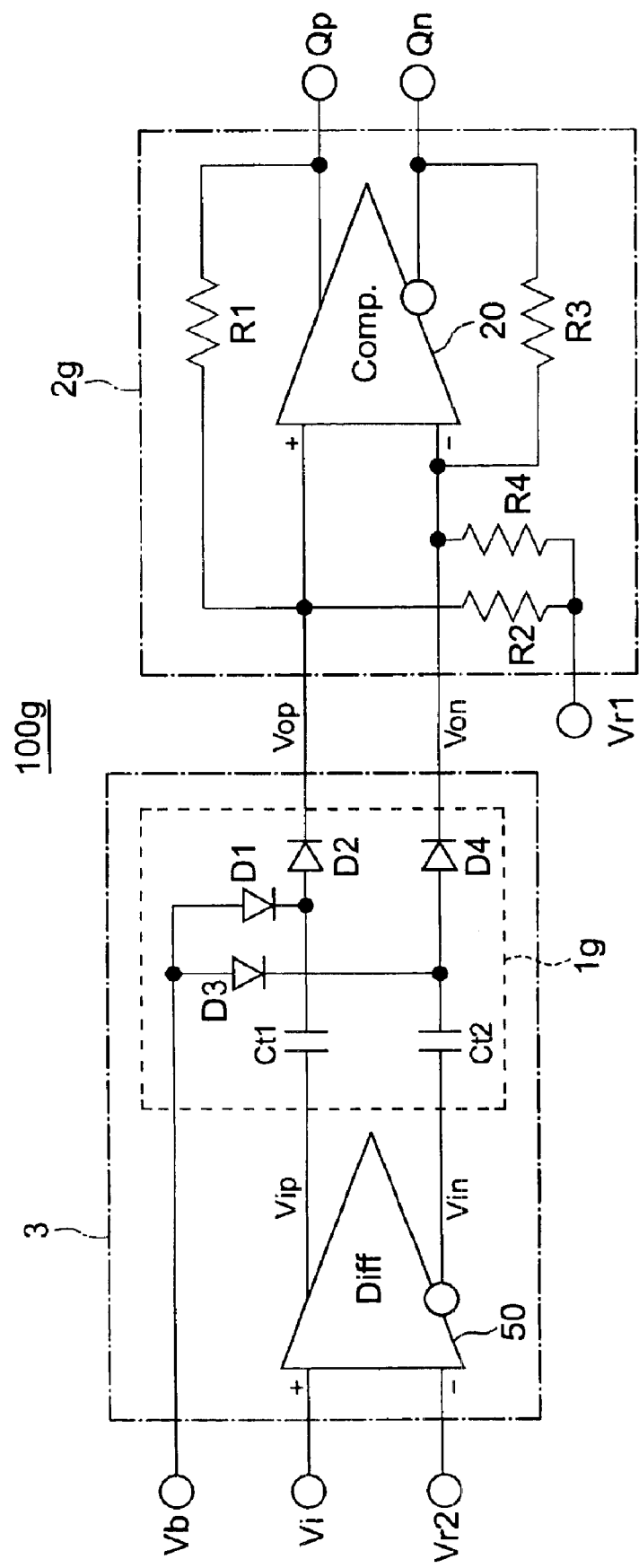
FIG. 15 is a block diagram showing another possible structure of the demodulating circuit in the sixth embodiment of the invention.

The block diagram in FIG. 15 shows another possible structure of the demodulating circuit in the sixth embodiment.

The demodulating circuit 100g in FIG. 15 employs a non-linear diode-based differentiating circuit 1g. This type of differentiating circuit can be used in place of the differentiating circuit 1f in FIG. 13 because the differentiated signals Vop and Von are balanced, due to the effect of the differential signal generating circuit 50. The differentiating circuit 1g in FIG. 15 receives a bias voltage Vb. Diodes D1 and D2 are connected in series between the Vb input terminal and the non-inverting (+) input terminal of the comparator element 20, the cathode of diode D1 being connected to the anode of diode D2. Diode D2 is also in series between differentiating capacitor Ct1 and the non-inverting (+) input terminal of the comparator element 20. Additional diodes D3 and D4 are connected in series between the Vb input terminal and the inverting (−) input terminal of the comparator element 20, the cathode of diode D3 being connected to the anode of diode D4. Diode D4 is also in series between differentiating capacitor Ct2 and the inverting (−) input terminal of the comparator element 20.

Figure 16:
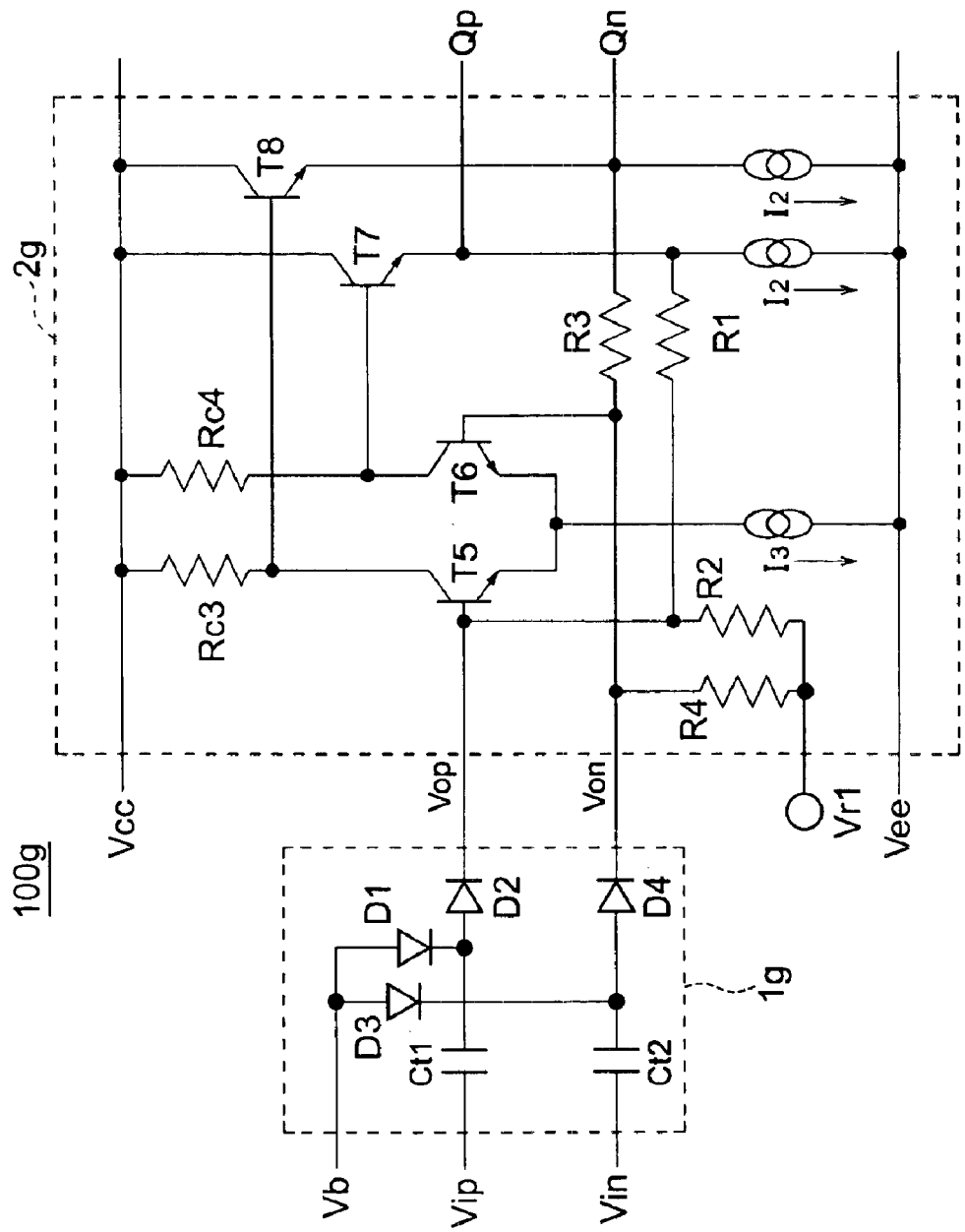
FIG. 16 is a circuit diagram showing the balanced hysteresis comparator in the demodulating circuit in FIG. 15.

The balanced hysteresis comparator 2g in FIG. 15 is obtained by coupling both of the resistance elements R2 and R4 in the balanced hystereis comparator 2e in FIG. 12 to the first reference voltage Vr1, as shown in FIG. 16.

Figure 17:
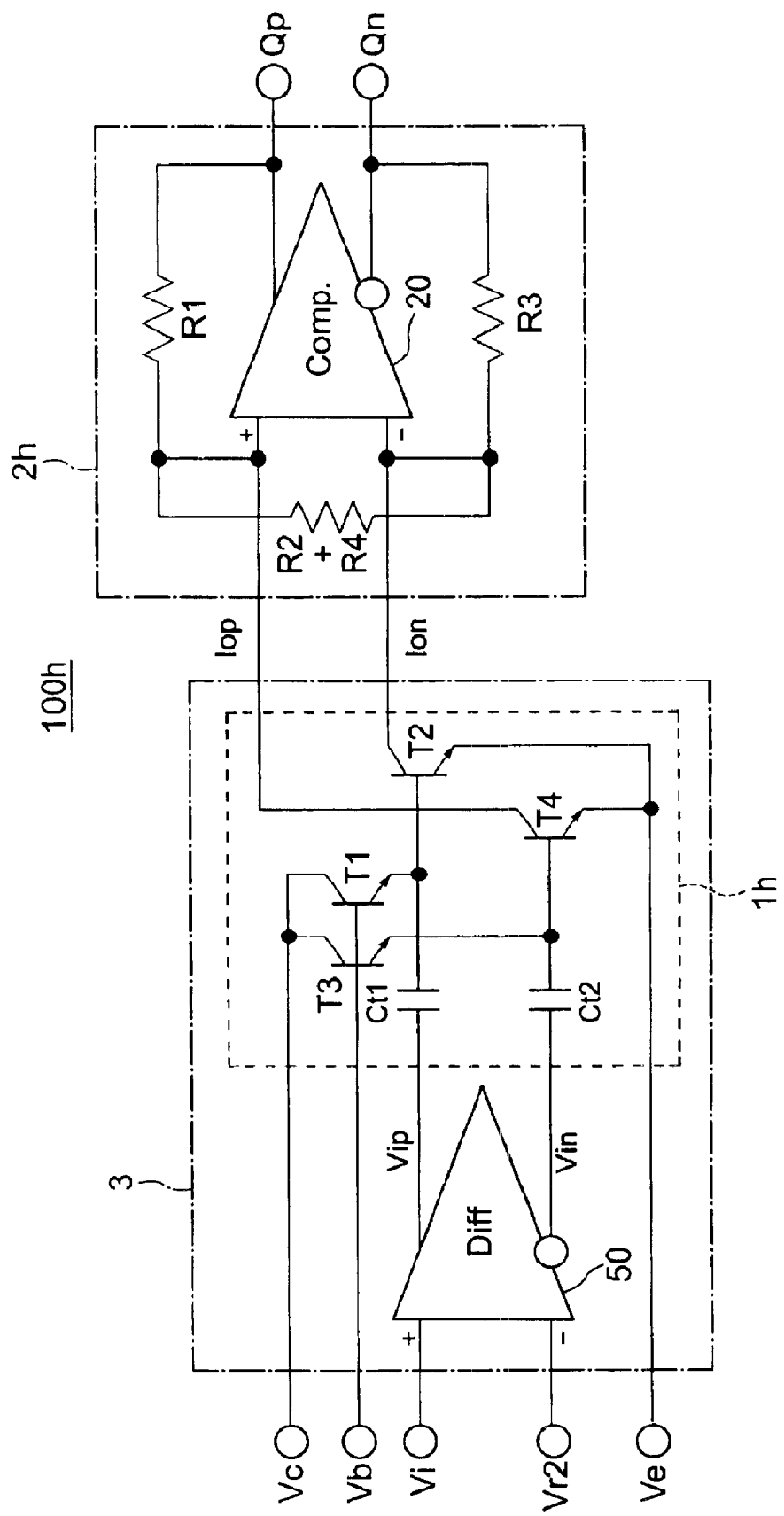
FIG. 17 is a block diagram showing still another possible structure of the demodulating circuit in the sixth embodiment.

The block diagram in FIG. 17 shows still another possible structure of the demodulating circuit in the sixth embodiment. This demodulating circuit 100h employs a non-linear transistor-based differentiating circuit 1g that outputs a positive-phase differentiated current signal Iop and a negative-phase differentiated current signal Ion. The differentiating circuit 1g includes bipolar transistors T1 to T4. An emitter voltage Ve is supplied to the emitters of transistors T2 and T4, a collector voltage Vc is supplied to the collectors of transistors T1 and T3, and a base voltage Vb is supplied to the bases of transistors T1 and T3. Transistor T2 has its base connected to differentiating capacitor Ct1 and its collector connected to the inverting (−) input terminal of the comparator element 20; transistor T1 has its emitter connected to the base of transistor T2. Transistor T4 has its base connected to differentiating capacitor Ct2 and its collector connected to the non-inverting (+) input terminal of the comparator element 20; transistor T3 has its emitter connected to the base of transistor T4.

Figure 18:
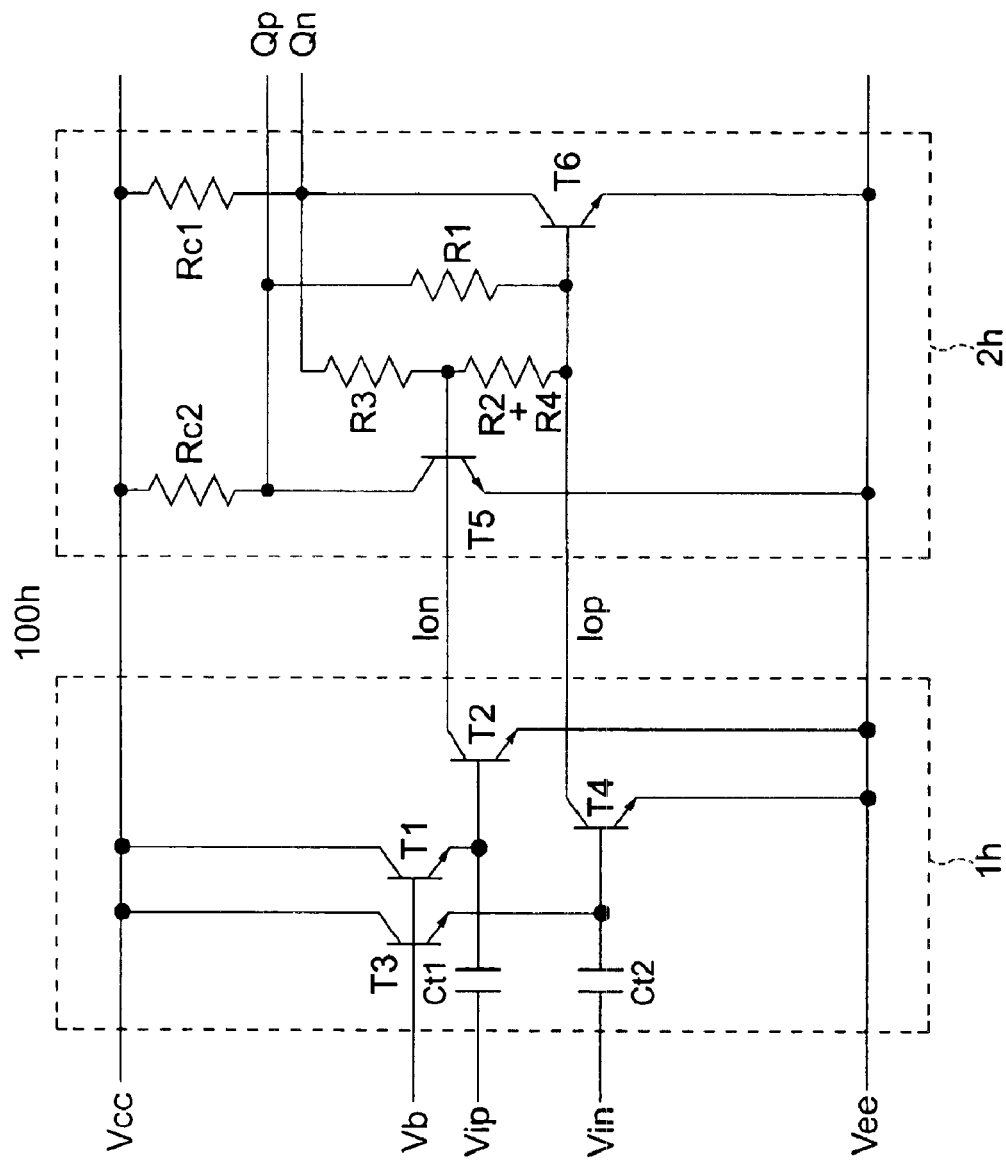
FIG. 18 is a circuit diagram showing the balanced hysteresis comparator in the demodulating circuit in FIG. 17.

Referring to the circuit diagram in FIG. 18, the comparator element in the balanced hysteresis comparator 2h in the demodulating circuit 100h includes bipolar transistors T5 and T6 coupled between the power-supply potential Vcc and the ground potential Vee, and resistors Rc1 and Rc2. Resistor Rc2 is connected in series with the collector of bipolar transistor T5; resistor Rc1 is connected in series with the collector of bipolar transistor T6. The positive-phase differentiated current signal Iop is input to the base of bipolar transistor T6, while the negative-phase differentiated current signal Ion is input to the base of bipolar transistor T5. The balanced hysteresis comparator 2h further includes a first resistance element R1, a second resistance element R2, a third resistance element R3, and a fourth resistance element R4, the second and fourth resistance elements R2, R4 being combined into a single compound resistance. The first resistance element R1, compound resistance R2+R4, and third resistance element R3 divide the potential difference between the positive-phase demodulated signal Qp and the negative-phase demodulated signal Qn to provide positive feedback at both input terminals of the comparator element 20.

Referring again to FIG. 13, the differential signal generating circuit 50 receives the input pulse signal Vi at its non-inverting (+) input terminal and the second reference voltage Vr2 at its inverting (−) input terminal. The first differentiating capacitor Ct1 couples the positive-phase differential signal Vip to the non-inverting (+) input terminal of the comparator element 20, while the second differentiating capacitor Ct2 couples the negative-phase differential signal Vin to the inverting (−) input terminal of the comparator element 20.

Next, the operation of the demodulating circuit in the sixth embodiment will be described. Since the operation and effect of the balanced hysteresis comparator are the same as in the fourth embodiment, a repeated description will be omitted.

In the demodulating circuit 100f in the sixth embodiment, the balanced hysteresis comparator 2f receives the positive-phase balanced differentiated signal Vop and the negative-phase balanced differentiated signal Von, both of which accurately indicate voltage changes at the rise and fall of the input pulse signal Vi. Accordingly, the balanced hysteresis comparator 2f has similar response times and response waveforms, regardless of whether the transition of its logic output state is from high to low or low to high. In contrast, the balanced hysteresis comparator 2d in the fourth embodiment does not receive balanced differentiated signals, so its response time and output waveforms differ depending on whether the transition of the logic output state is from high to low or low to high, due to the non-linearity of the demodulating circuit.

As described above, the demodulating circuit in the sixth embodiment provides the effects that were provided in the fourth embodiment. In addition, the inputs to the balanced hysteresis comparator are balanced. The balanced hysteresis comparator can therefore be considered as a set/reset flip-flop with its non-inverting (+) input terminal receiving the positive-phase differentiated signal Vop as a set signal and its inverting (−) input terminal receiving the negative-phase differentiated signal Von as a reset signal. Thus, use of the non-linear diode-based differentiating circuit 1g shown in FIG. 15 or the non-linear transistor-based differentiating circuit 1h shown in FIG. 17 becomes possible, affording greater latitude in circuit design. In short, the sixth embodiment has the following additional effects:

(C1) Due to the balanced hysteresis comparator and the balanced differentiated signals Vop and Von, the response time and the response waveforms of the hysteresis comparator do not differ depending on whether the transition of the logic output state is from high to low or low to high.

(C2) Use of a non-linear diode-based or transistor-based differentiating circuit becomes possible, affording greater latitude in circuit design.

Seventh Embodiment

Figure 19:
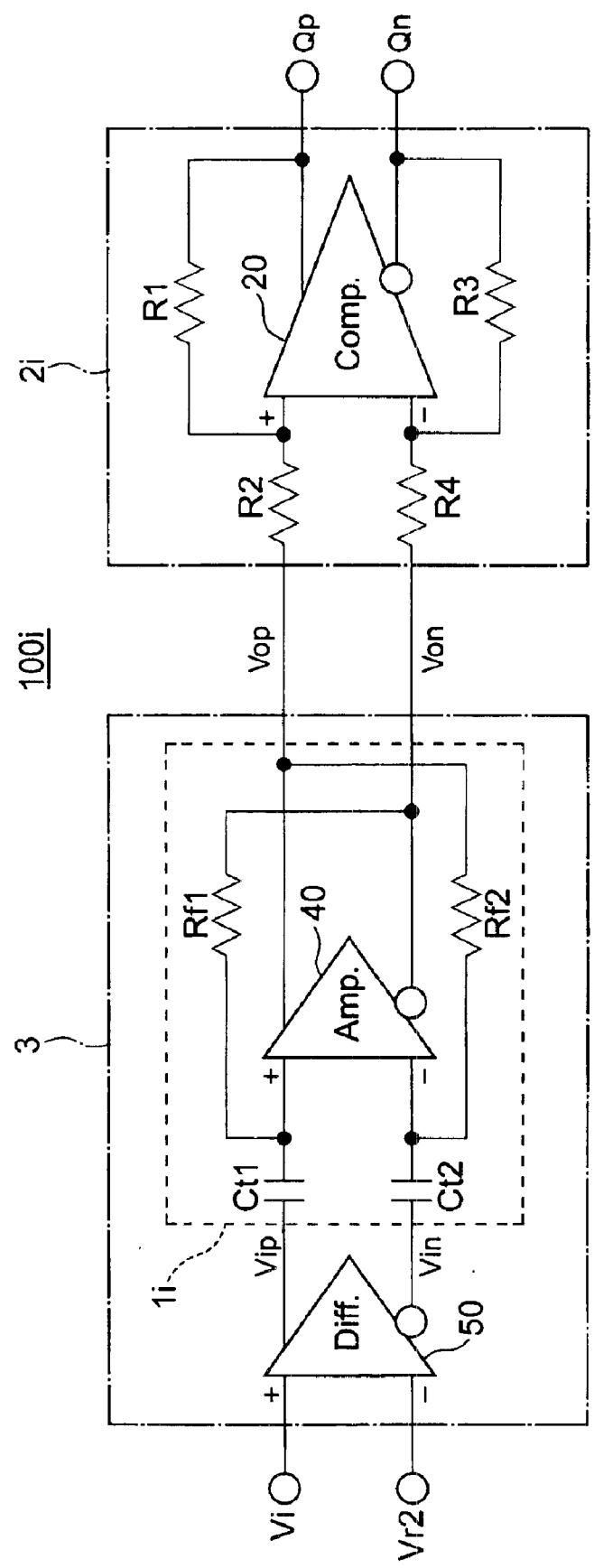
FIG. 19 is a block diagram showing a demodulating circuit in a seventh embodiment of the invention.

The block diagram in FIG. 19 shows a demodulating circuit 100i according to a seventh embodiment of the invention, which includes the differential signal generating circuit 50 added in the sixth embodiment. The differentiating circuit 1i is similar to the differentiating circuit 1e in the fifth embodiment, except for the different coupling arrangements of the differentiating capacitors Ct1 and Ct2 resulting from the addition of the differential signal generating circuit 50. Differentiating capacitor Ct1 now couples the positive-phase differential signal Vip to the non-inverting (+) input terminal of the differential amplifier 40, while differentiating capacitor Ct2 couples the negative-phase differential signal Vin to the inverting (−) input terminal of the differential amplifier 40. The differential signal generating circuit 50 receives the pulse signal Vi at its non-inverting (+) input terminal and a second reference voltage Vr2 in its inverting (−) input terminal and outputs the positive-phase differential signal Vip and the negative-phase differential signal Vin. As in the sixth embodiment, an accurately balanced pair of differentiated signals Vop and Von can be applied to the input terminals of the hysteresis comparator 2i.

The differential signal generating circuit 50 and differentiating circuit 1I form a differentiating circuit unit 3 having substantially the same effect as in the sixth embodiment: the response time and the response waveforms of the hysteresis comparator do not differ depending on whether the transition of the logic output state is from high to low or low to high, and there is considerable latitude in circuit design.

Eighth Embodiment

Figure 20:
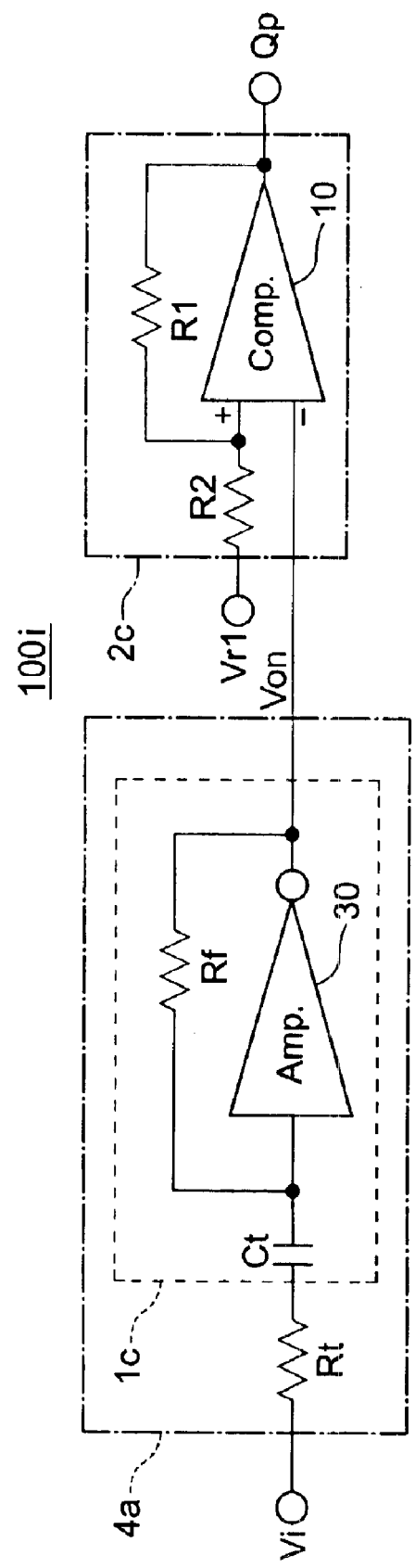
FIG. 20 is a block diagram showing a demodulating circuit in an eighth embodiment of the invention.

The block diagram in FIG. 20 shows a demodulating circuit 100j according to an eighth embodiment of the invention, in which a resistance element Rt for adjusting the differentiating characteristic of the differentiating circuit 1c in the third embodiment is connected in series with the input terminal of the differentiating capacitor Ct to form a differentiating circuit unit 4a.

If the gain of the inverting amplifier 30 in the third embodiment is A, and the resistance value of the negative feedback resistance element connected between the input and output terminals of the inverting amplifier 30 is Rf, then the input resistance Ri of the inverting amplifier 30, the output amplitude ΔVo produced from an input amplitude ΔVi, and the time constant τ of the differentiating circuit 1c can be expressed by the following formulas (18), (19), and (20), respectively:

$$Ri = Rf/(A+1) \qquad (18)$$

$$\Delta Vo = \Delta Vi * A \qquad (19)$$

$$\tau = Ct*Ri = Ct*Rf/(A+1) \qquad (20)$$

The time constant τ of the differentiating circuit 1c is the main factor determining the pulse duration in the differentiated output signal.

From the above formulas, it can be seen that if the gain A of the inverting amplifier 30 in the third embodiment is sufficiently large, the value of the output amplitude ΔVo becomes very large because it is multiplied by the unaltered value of A, and the value of the time constant τ of the differentiating circuit 1c becomes very small because it is divided by (A+1). By contrast, in the differentiating circuit unit 4a in the eighth embodiment, since the resistance element Rt for adjusting the differentiating characteristic of the differentiating circuit 1c is connected in series with the differentiating capacitor Ct, formulas (19) and (20) can be rewritten as formulas (21) and (22), respectively:

$$\Delta Vo = -\Delta Vi * Rf / (Rt + Rf / (1 + A)) \quad (21)$$
$$\approx -\Delta Vi * Rf / Rt$$

$$\tau = Ct * (Rt + Ri) = Ct * (Rt + Rf / (A + 1)) \quad (22)$$
$$\approx Ct * Rt$$

The above formulas (21) and (22) indicate that the values of the output amplitude ΔVo and the time constant T are not strongly affected by the gain A of the inverting amplifier 30, and can be adjusted to appropriate values, regardless of the value of the gain A.

As described above, in the eighth embodiment, the additional input resistance element Rt enables the output amplitude ΔVo and the time constant τ of the differentiating circuit 1c (hence the duration of the differentiated output pulses) to be adjusted to appropriate values regardless of the gain value of the inverting amplifier 30. Greater latitude in circuit design can be thereby obtained.

Ninth Embodiment

Figure 21:
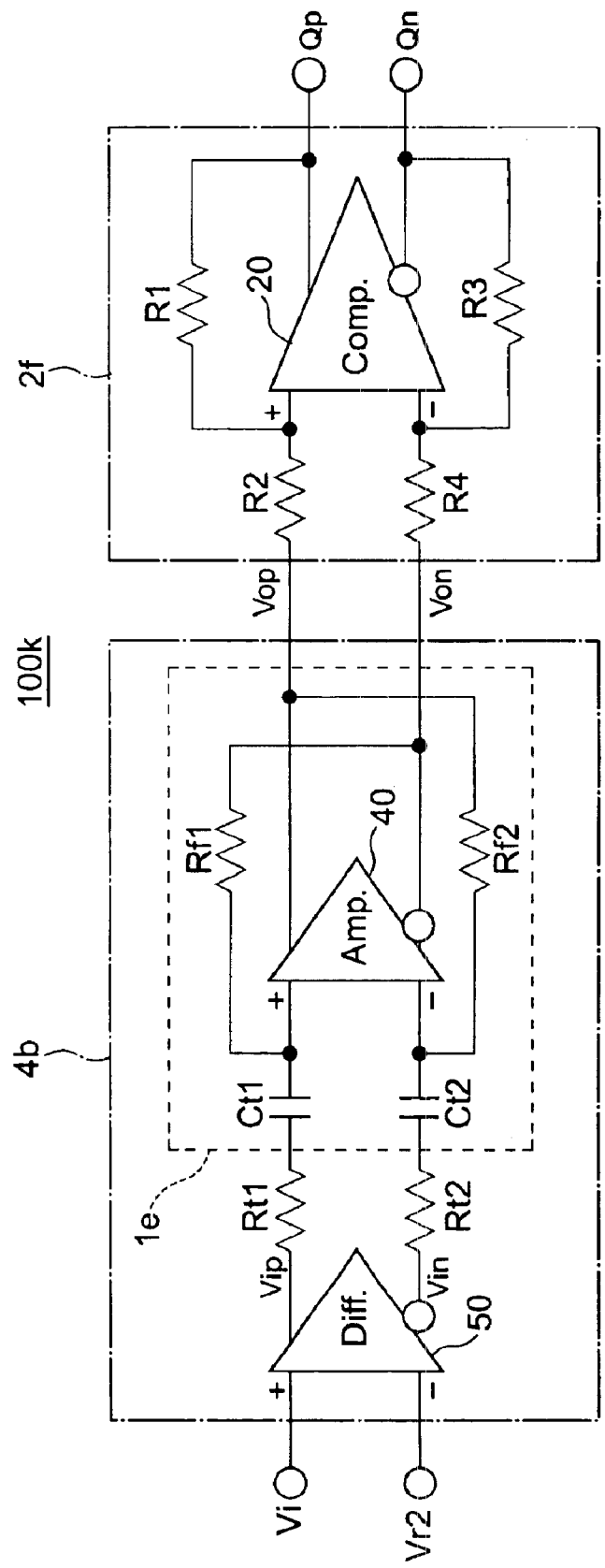
FIG. 21 is a block diagram showing a demodulating circuit in a ninth embodiment of the invention.

The block diagram in FIG. 21 shows the differentiating circuit unit 4b and the balanced hysteresis comparator 2f in a demodulating circuit 100k according to a ninth embodiment of the invention.

In the demodulating circuit 100k, resistance elements Rt1 and Rt2 for adjusting the differentiating characteristics of the differentiating circuit are added to the differentiating circuit unit 3 in the seventh embodiment to form a differentiating circuit unit 4b. Resistance element Rt1 is connected in series between the differential signal generating circuit 50 and differentiating capacitor Ct1; resistance element Rt2 is connected in series between the differential signal generating circuit 50 and differentiating capacitor Ct2. As in the seventh embodiment, the positive-phase differentiated signal Vop is fed back to the differential amplifier 40 through a negative feedback resistance element Rf1, while the negative-phase differentiated signal Von is fed back through a negative feedback resistance element Rf2.

The formulas (21) and (22) given in the eighth embodiment apply to the ninth embodiment as well, if Rf is replaced by Rf1 or Rf2. The output amplitude ΔVo and the time constant τ of the differentiating circuit 1e can accordingly be adjusted to appropriate values, regardless of the gain value of the differential amplifier 40, and greater latitude in circuit design can be obtained than in the seventh embodiment.

Tenth Embodiment

Figure 22:
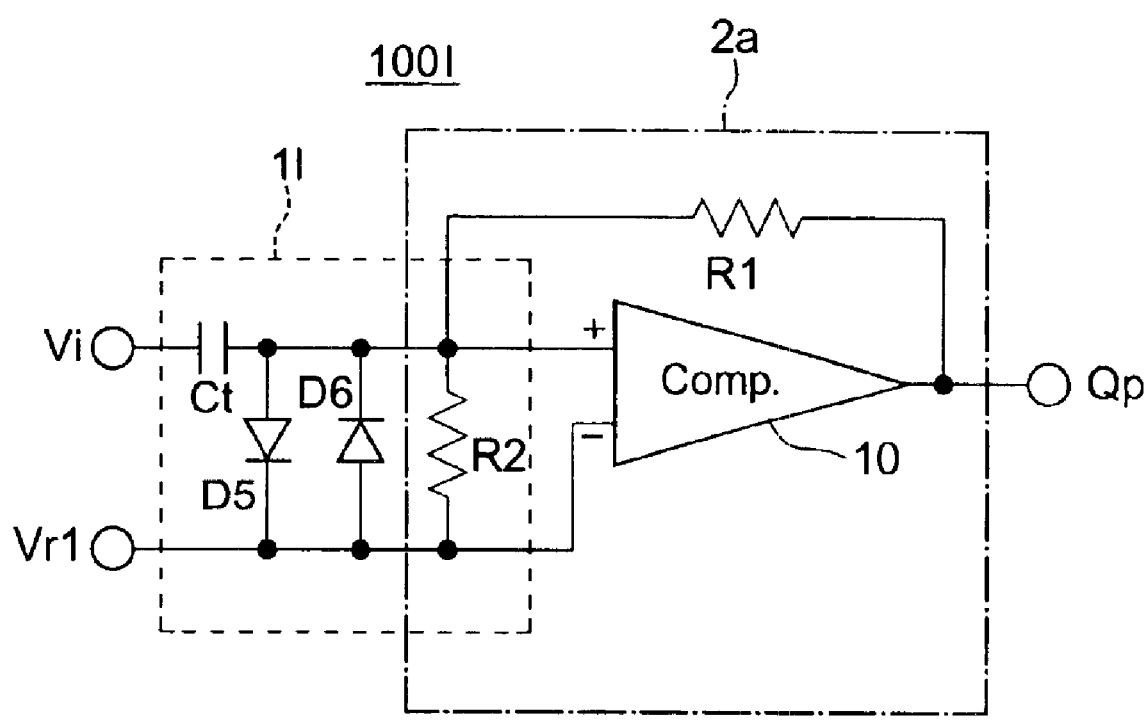
FIG. 22 is a block diagram showing a demodulating circuit in a tenth embodiment of the invention.

The block diagram in FIG. 22 shows the differentiating circuit 11 and the hysteresis comparator 2a in a demodulating circuit 100l according to a tenth embodiment of the invention. The hysteresis comparator 2a is identical to the hysteresis comparator in the first embodiment.

The differentiating circuit 11 is similar to the differentiating circuit 1a in the first embodiment, but includes additional circuit elements for limiting the amplitude of the differentiated signal input to the comparator element 10. The limiting elements are a pair of diodes D5 and D6 coupled in parallel, with reverse orientations, between the input terminals of the comparator element 10. Diode D5 has its anode coupled to the differentiating capacitor Ct and the non-inverting (+) input terminal of the comparator element 10, and its cathode coupled to the first reference voltage Vr1 and the inverting (−) input terminal of the comparator element 10; diode D6 has its cathode coupled to the differentiating capacitor Ct and the non-inverting (+) input terminal of the comparator element 10, and its anode coupled to the first reference voltage Vr1 and the inverting (−) input terminal of the comparator element 10.

Figure 23:
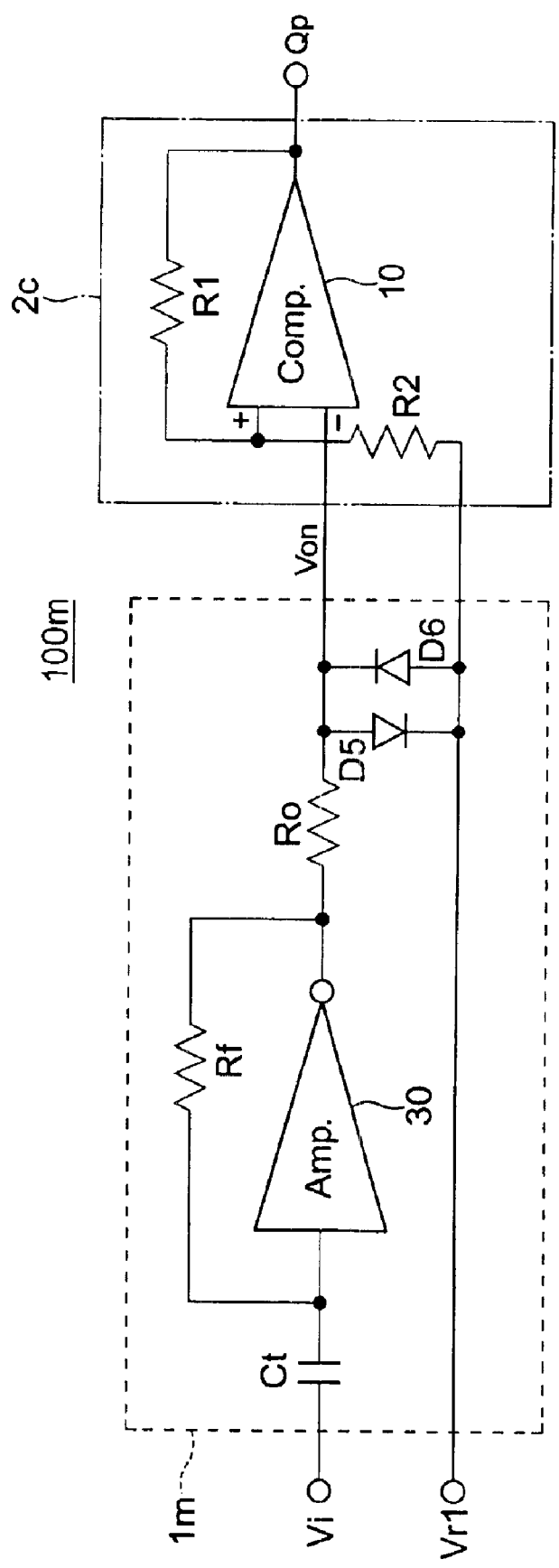
FIG. 23 is a block diagram showing another possible structure of the demodulating circuit in the tenth embodiment.

The block diagram in FIG. 23 shows another possible structure of the demodulating circuit in the tenth embodiment. This demodulating circuit 100m includes the same hysteresis comparator 2c as in the third embodiment. The differentiating circuit 1m is similar to the differentiating circuit 1c in the third embodiment, but includes an additional resistance element Ro connected in series between the output terminal of the inverting amplifier 30 and the inverting (−) input terminal of the comparator element 10. Diodes D5 and D6 are connected in parallel, with reverse orientations, between the first reference voltage Vr1 and the inverting (−) input terminal of the comparator element 10. These circuit elements form a circuit for limiting the amplitude of the differentiated signal Von input to the comparator element 10.

Figure 24:
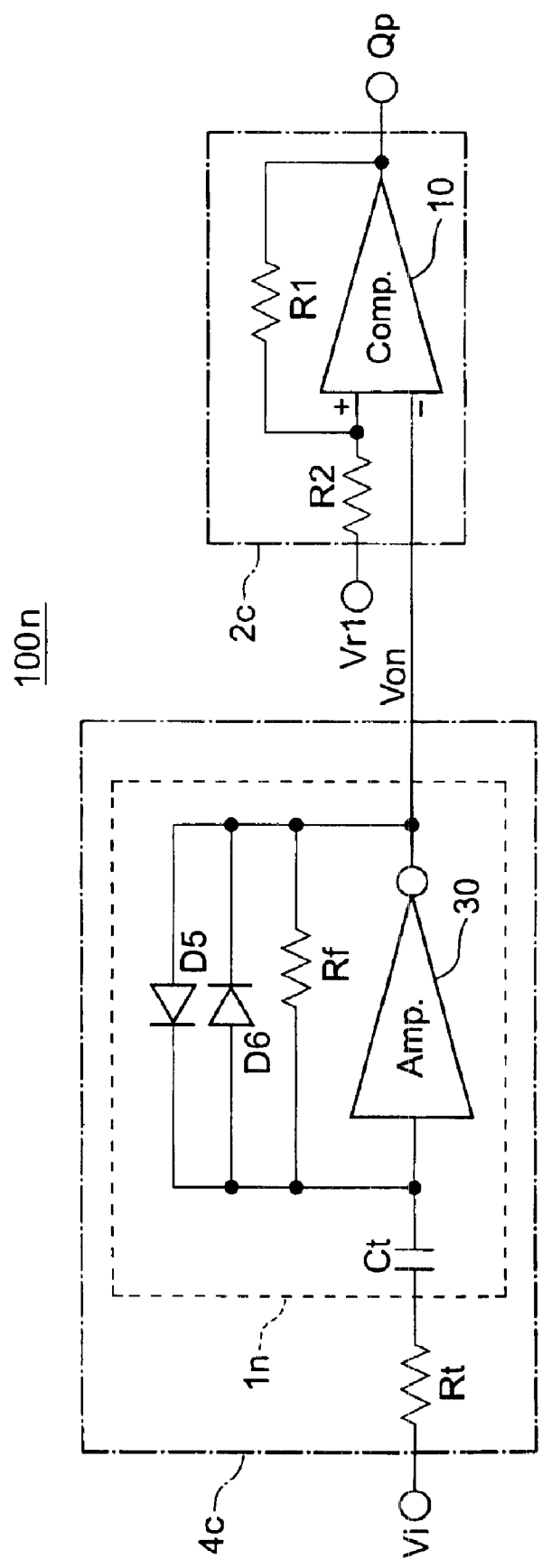
FIG. 24 is a block diagram showing still another possible structure of the demodulating circuit in the tenth embodiment.

The block diagram in FIG. 24 shows still another possible structure of the demodulating circuit in the tenth embodiment. This demodulating circuit 100n has a hysteresis comparator 2c and differentiating circuit unit 4c similar to the corresponding elements in the eighth embodiment, but the differentiating circuit 1n in the differentiating circuit unit 4c includes oppositely oriented diodes D5 and D6 coupled in parallel with the feedback resistance element Rf between the input and output terminals of the inverting amplifier 30. Diodes D5 and D6 limit the amplitude of the differentiated output signal Von.

Figure 25:
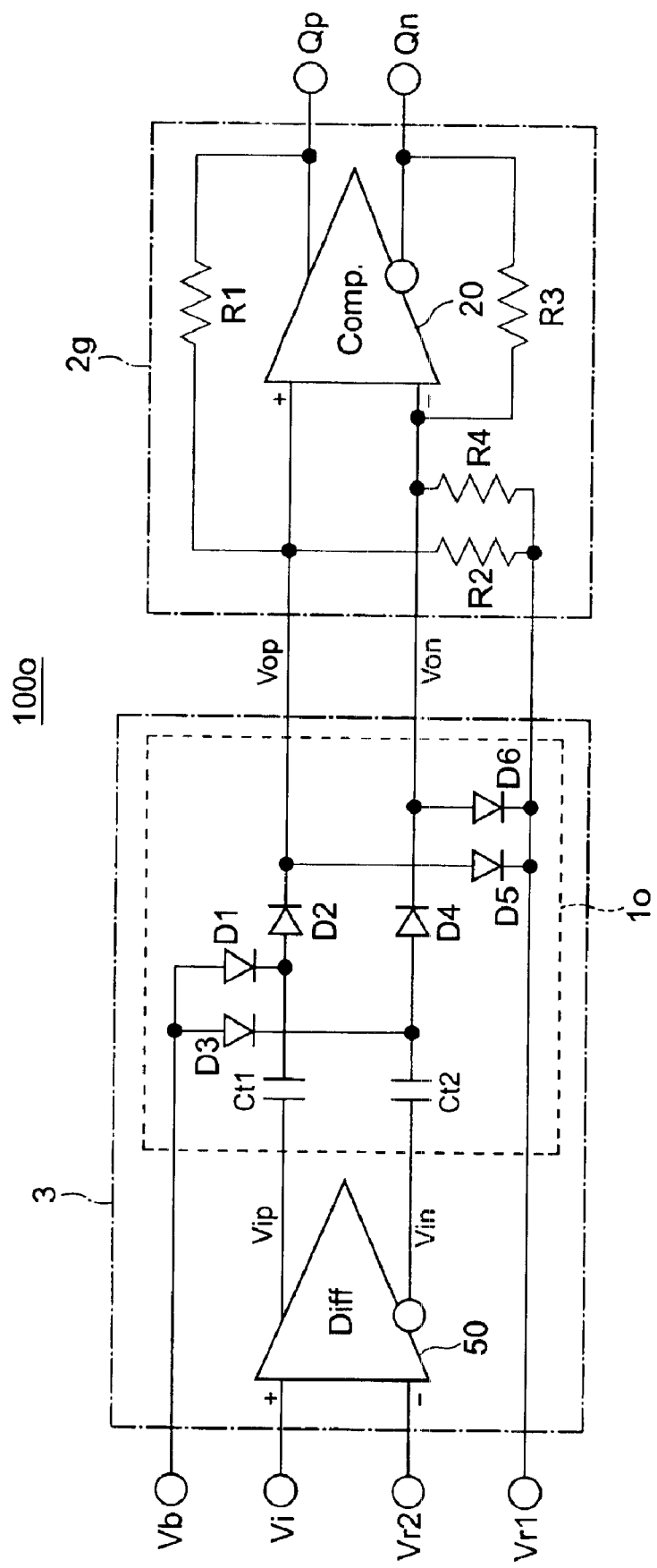
FIG. 25 is a block diagram showing yet another possible structure of the demodulating circuit in the tenth embodiment.

The block diagram in FIG. 25 shows yet another possible structure of the demodulating circuit in the tenth embodiment. This demodulating circuit 100o has a hysteresis comparator 2g and differentiating circuit unit 3 similar to the corresponding elements shown in FIG. 15 in the sixth embodiment, but the differentiating circuit 1o in the differentiating circuit unit 3 includes additional diodes D5 and D6. Diode D5 has its anode connected to the cathode of diode D2, and its cathode coupled to the first reference voltage Vr1; diode D6 has its anode connected to the cathode of diode D4, and its cathode coupled to the first reference voltage Vr1. Diodes D5 and D6 limit the amplitude of the differentiated output signals Vop and Von.

Figure 26:
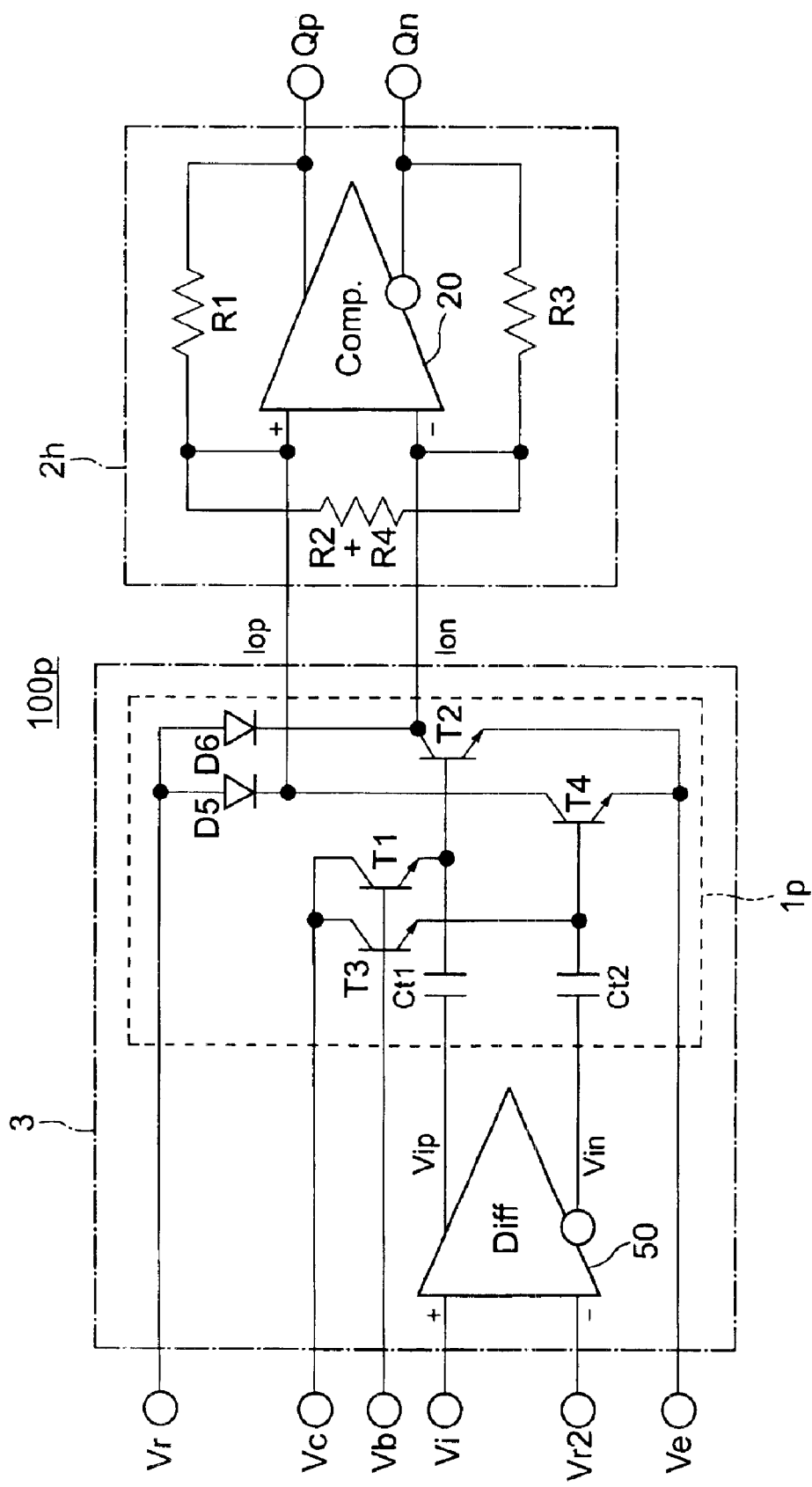
FIG. 26 is a block diagram showing still another possible structure of the demodulating circuit in the tenth embodiment.

The block diagram in FIG. 26 shows still another possible structure of the demodulating circuit in the tenth embodiment. This demodulating circuit 100p has a hysteresis comparator 2h and differentiating circuit unit 3 similar to the corresponding elements shown in FIG. 17 in the sixth embodiment, but the differentiating circuit 1p in the differentiating circuit unit 3 includes additional diodes D5 and D6. A reference voltage Vr is supplied to the anodes of both diodes D5 and D6. Diode D5 has its cathode connected to the non-inverting (+) input terminal of the comparator element 20 and the collector of transistor T4; diode D6 has its cathode connected to the inverting (−) input terminal of the comparator element 20 and the collector of transistor T2. Diodes D5 and D6 limit the amplitude of the differentiated current signals Iop and Ion.

The amplitude value ΔVi of the pulse signal Vi input to the demodulating circuit 1s not fixed but may vary, sometimes becoming relatively large, sometimes becoming relatively small. If the differentiating circuit 1m of the demodulating circuit 100m in FIG. 23 is designed so that a differentiated output ΔVo exceeding the threshold value for inversion of the demodulated output of the hysteresis comparator can be obtained even if the amplitude value ΔVi of the pulse signal Vi is small, then, conversely, when the amplitude value ΔVi of the pulse signal Vi becomes large, the inverting amplifier 30 may saturate, or the operation of the demodulating circuit may become unstable because the differentiated output of the differentiating circuit 1m departs too widely from the appropriate input level.

As described above, in the tenth embodiment, a limiter circuit (or circuit elements for limiting the amplitude of the differentiated output signal) is added to the differentiating circuit. Thus, even if the amplitude value ΔVi of the input pulse signal Vi becomes large, the amplitude of the differentiated signal output from the differentiating circuit can be limited to a certain value or less. Consequently, the likelihood of unstable operation of the demodulating circuit because the differentiated signal departs from the appropriate input level of the comparator element 10 can be reduced, or the unstable operation itself can be prevented.

Eleventh Embodiment

Figure 27:
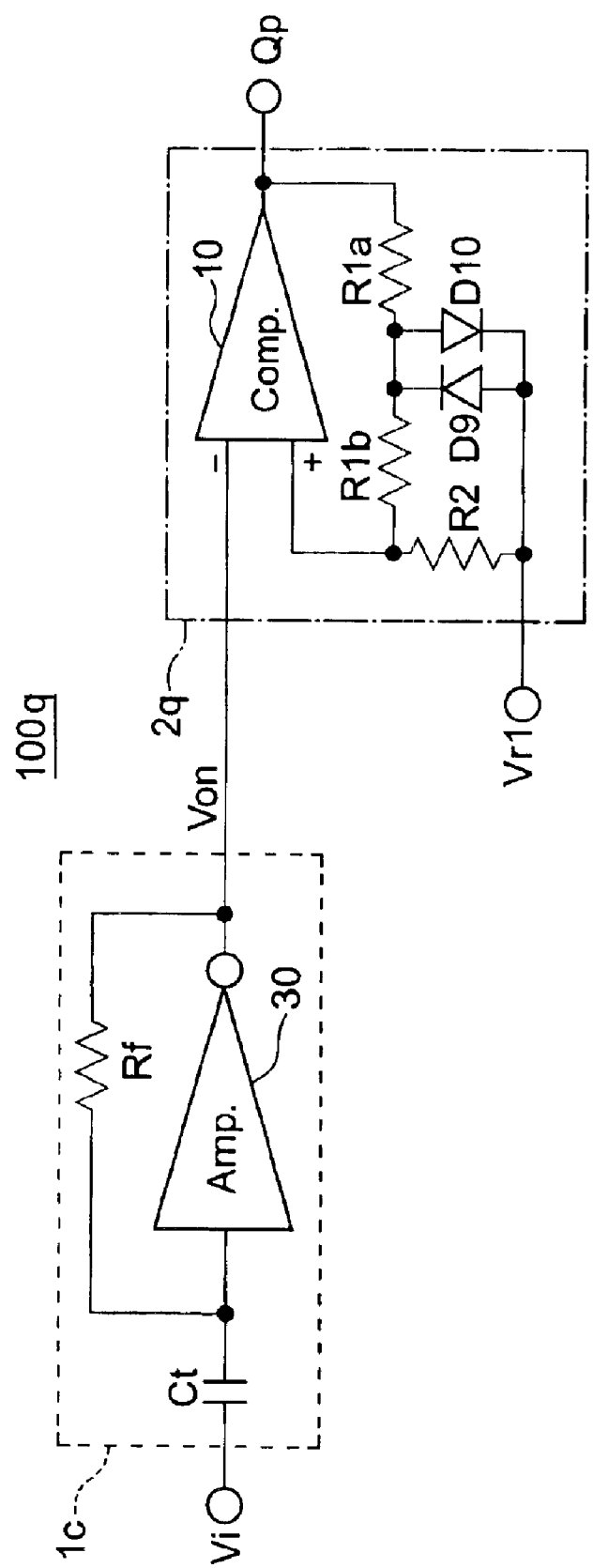
FIG. 27 is a block diagram showing a demodulating circuit in an eleventh embodiment of the invention.

The block diagram in FIG. 27 shows the differentiating circuit 1c and the hysteresis comparator 2q in a demodulating circuit 100q according to an eleventh embodiment of the invention. The differentiating circuit 1c is identical to the differentiating circuit in the third embodiment. The hysteresis comparator 2q is similar to the hysteresis comparator 2c in the third embodiment, but includes additional circuit elements coupled to the positive feedback resistance element R1 to limit the amplitude of the positive feedback.

In the demodulating circuit 100q in FIG. 27, the first resistance element R1 that provided positive feedback of the output of the hysteresis comparator 2c in the demodulating circuit 100c in the third embodiment in FIG. 8 is divided into a pair of resistance elements R1a and R1b coupled in series, and diodes D9 and D10 are coupled in parallel, with reverse orientations, between the first reference voltage Vr1 and the connection node between the resistance elements R1a and R1b. These circuit elements form a circuit that limits the value of the positive feedback of the output of the hysteresis comparator 2q, especially in the steady state while the output of the hysteresis comparator 2q is not changing.

Figure 28:
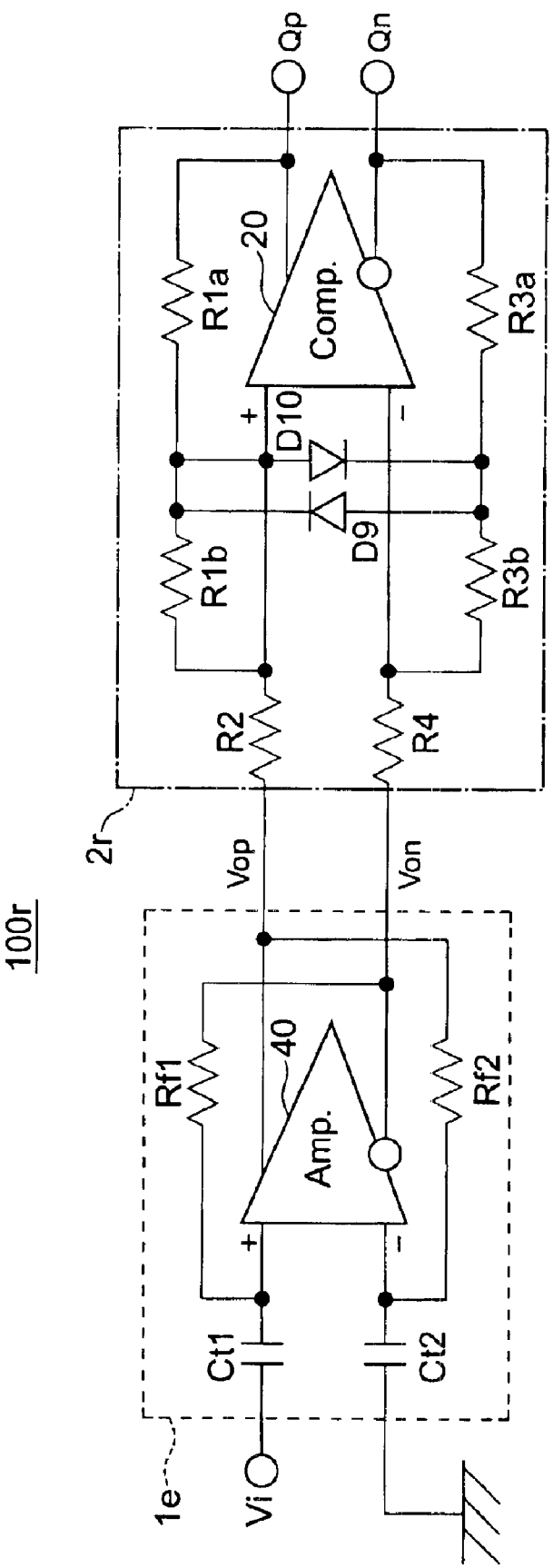
FIG. 28 is a block diagram showing another possible structure of the demodulating circuit in the eleventh embodiment.

The block diagram in FIG. 28 shows another possible structure of the demodulating circuit in the eleventh embodiment.

The demodulating circuit 100r in FIG. 28 has a balanced hysteresis comparator 2r similar to the balanced hysteresis comparator 2e of the demodulating circuit 100e in the fifth embodiment in FIG. 11, but including additional diodes D9 and D10 that limit the amplitudes of the positive feedback signals, especially in the steady state. The first resistance element R1 is divided into resistance elements R1a and R1b, coupled in series, that provide positive feedback of the positive-phase demodulated signal; the third resistance element R3 is divided into resistance elements R3a and R3b, coupled in series, that provide positive feedback of the negative-phase demodulated signal. Diodes D9 and D10 are coupled in parallel, with reverse orientations, between the connection node between resistance elements R1a and R1b and the connection node between resistance elements R3a and R3b.

The amplitude of the demodulated signals output from the comparator elements 10 and 20 in FIGS. 27 and 28 generally increases as the power supply voltage increases or the ambient temperature rises, and generally decreases as the power supply voltage decreases or the ambient temperature falls. In the preceding embodiments, these variations in the output amplitude of the hysteresis comparator alter the feedback voltage input to the hysteresis comparator to maintain the output of the hysteresis comparator, as indicated by formulas (16) and (17). Consequently, the threshold levels for inverting the output of the comparator element 10 or 20 also vary.

In the eleventh-embodiment, the additional circuit elements (diodes D9 and D10 in FIGS. 27 and 28) that limit the steady-state positive feedback output voltage also limit variations in the threshold levels for inverting the output of the comparator element 10 or 20, even if the output amplitude of the hysteresis comparator varies due to external conditions. Since the threshold levels for inversion of the output of the hysteresis comparator remain relatively constant, the demodulating circuit can operate in a stable manner despite variations in external conditions such as the power supply voltage or ambient temperature.

Twelfth Embodiment

Figure 29:
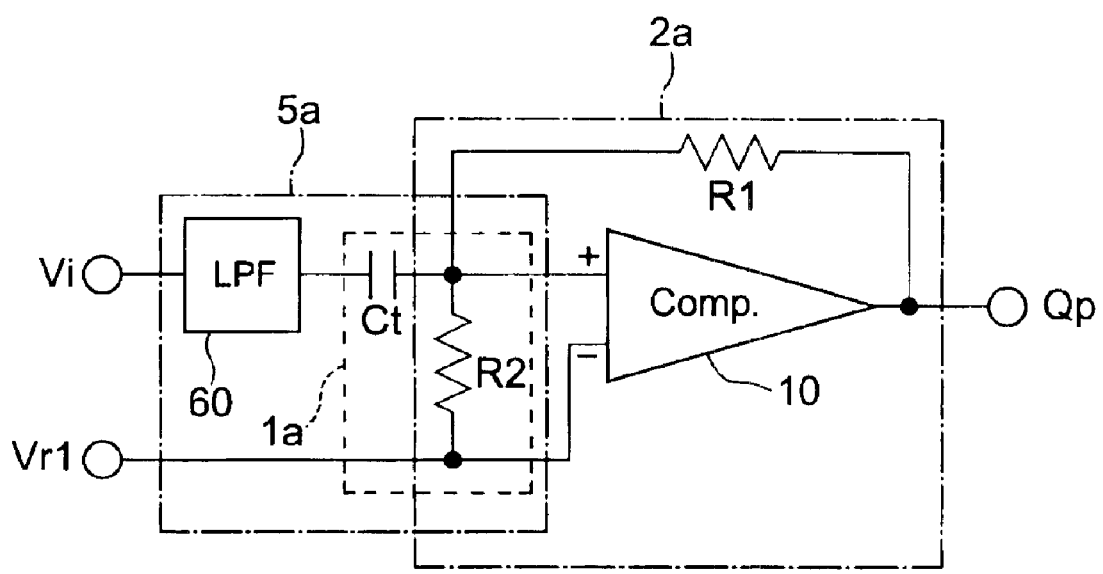
FIG. 29 is a block diagram showing a demodulating circuit in a twelfth embodiment of the invention.

The block diagram in FIG. 29 shows the differentiating apparatus 5a and the hysteresis comparator 2a in a demodulating circuit 100s according to a twelfth embodiment of the invention. The differentiating apparatus 5a includes the differentiating circuit 1a of the first embodiment, and an additional low-pass filter (LPF) 60 through which the input pulse signal Vi is coupled to the differentiating capacitor Ct.

Figure 30:
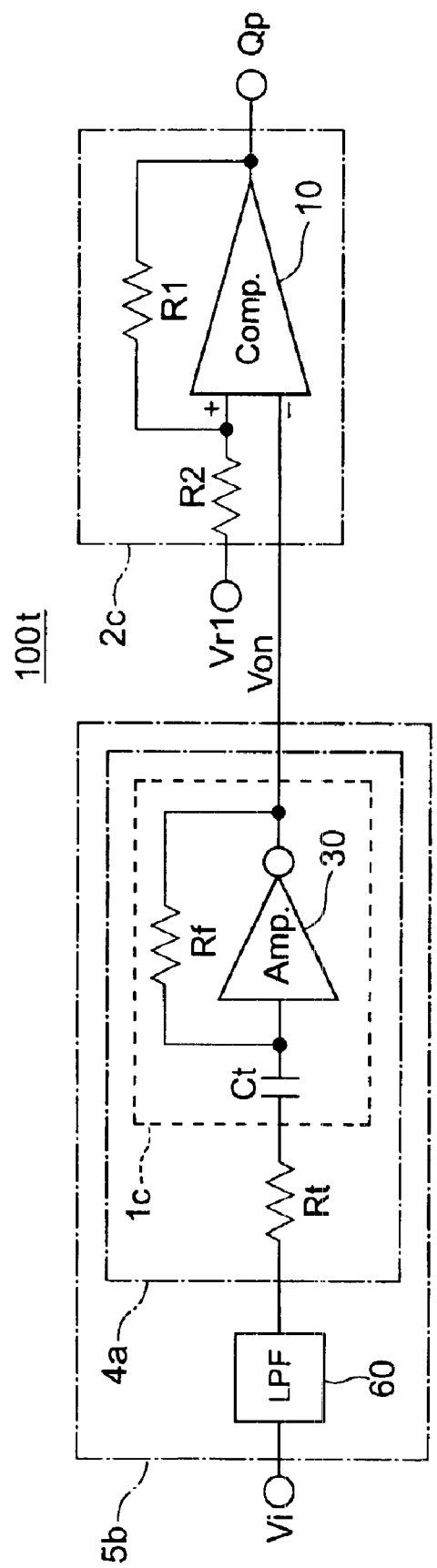
FIG. 30 is a block diagram showing another possible structure of the demodulating circuit in the twelfth embodiment.

The block diagram in FIG. 30 shows another possible structure of the demodulating circuit in the twelfth embodiment. The differentiating apparatus 5b in this demodulating circuit 100t includes the differentiating circuit unit 4a of the eight embodiment (FIG. 20), and an additional low-pass filter 60 through which the input pulse signal Vi is coupled to the resistance element Rt that adjusts the differentiating characteristic.

Figure 31:
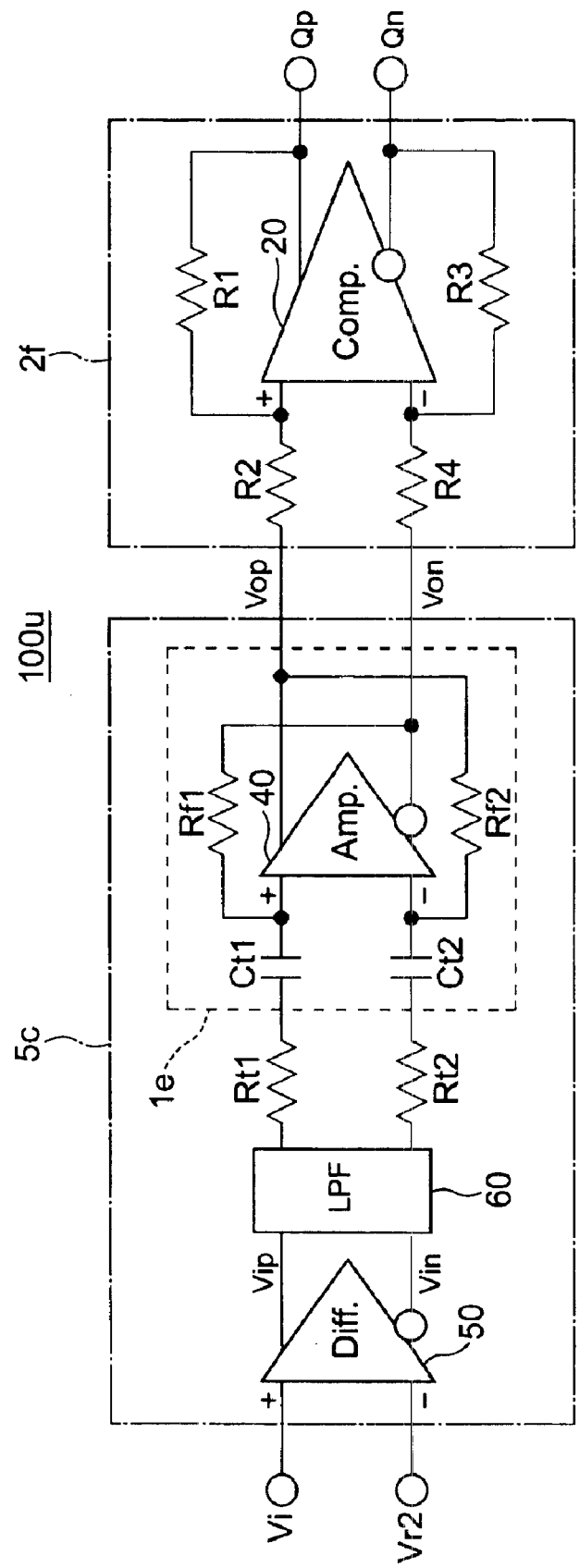
FIG. 31 is a block diagram showing still another possible structure of the demodulating circuit in the twelfth embodiment.

The block diagram in FIG. 31 shows still another possible structure of the demodulating circuit in the twelfth embodiment. The differentiating circuit apparatus 5c in this demodulating circuit 100u is similar to the differentiating circuit unit 4b in the ninth embodiment (FIG. 21), except that a dual-channel low-pass filter 60 is inserted between the differential signal generating circuit 50 that generates the differential signals Vip and Vin and the resistance elements Rt1 and Rt2 that adjust the differentiating characteristics of the differentiating circuit 1e. The hysteresis comparator 2f is identical to the hysteresis comparator in the ninth embodiment.

Since the differentiating circuit basically has a high-pass filter (HPF) characteristic, it may sometimes pass high-frequency noise components that cause the hysteresis comparator to malfunction. The low-pass filter 60 inserted in the twelfth embodiment eliminates this unwanted high-frequency noise. Malfunctions of the hysteresis comparator can be thereby be reduced or prevented.

Thirteenth Embodiment

Figure 32:
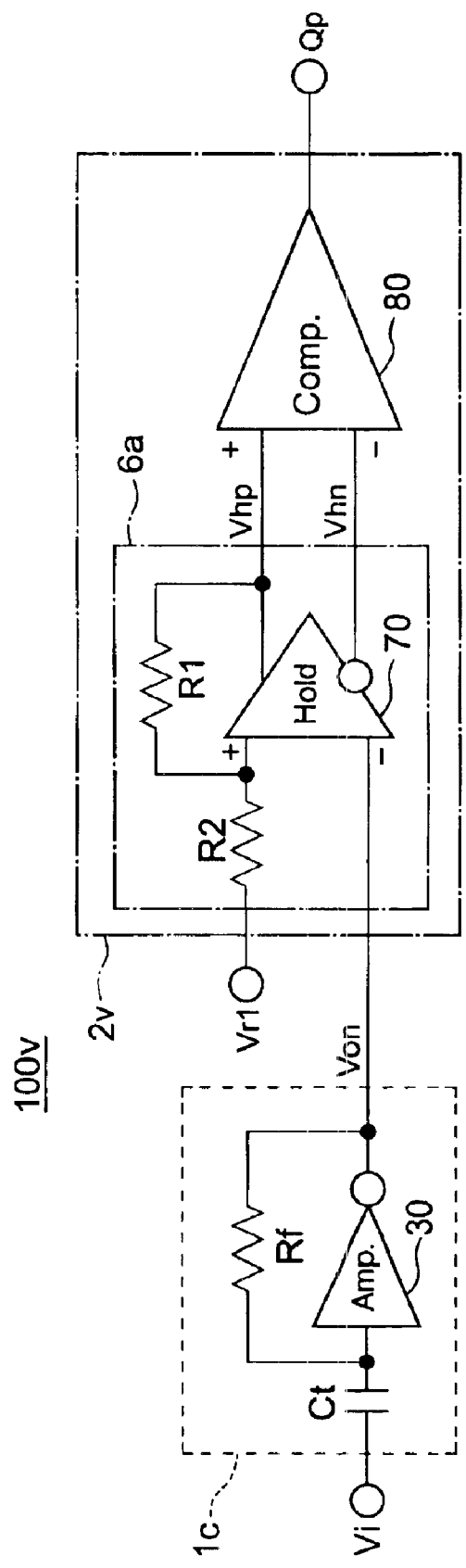
FIG. 32 is a block diagram showing a demodulating circuit in a thirteenth embodiment of the invention.

The block diagram in FIG. 32 shows the differentiating circuit 1c and the hysteresis comparator 2v in a demodulating circuit 100v according to a thirteenth embodiment of the invention. The differentiating circuit 1c is identical to the differentiating circuit in the third embodiment in FIG. 8. The hysteresis comparator 2v is similar to the hysteresis comparator 2c in the third embodiment, but is separated into a logic state holding unit 6a and a logic level converting unit (Comp.) 80.

The logic state holding unit 6a includes a logic state holding differential amplifier (Hold) 70 and a pair of resistance elements R1, R2. The logic state holding differential amplifier 70 receives the negative-phase differentiated signal Von at its inverting (−) input terminal and outputs a pair of intermediate signals Vhp and Vhn. These signals Vhp, Vhn are output as complementary binary logic signals that switch between two states or levels that may differ from the logic levels of the demodulated signal Qp. The first resistance element R1 couples the positive-phase intermediate signal Vhp to the non-inverting (+) input terminal of the logic state holding differential amplifier 70; the second resistance element R2 couples the first reference voltage Vr1 to the same non-inverting (+) input terminal. The non-inverting (+) input terminal of the logic level converting unit 80 receives the positive-phase intermediate signal Vhp from the logic state holding differential amplifier 70, and the inverting (−) input terminal of the logic level converting unit 80 receives the negative-phase intermediate signal Vhn. The logic level converting unit 80 outputs a positive-phase demodulated signal Qp.

Figure 33:
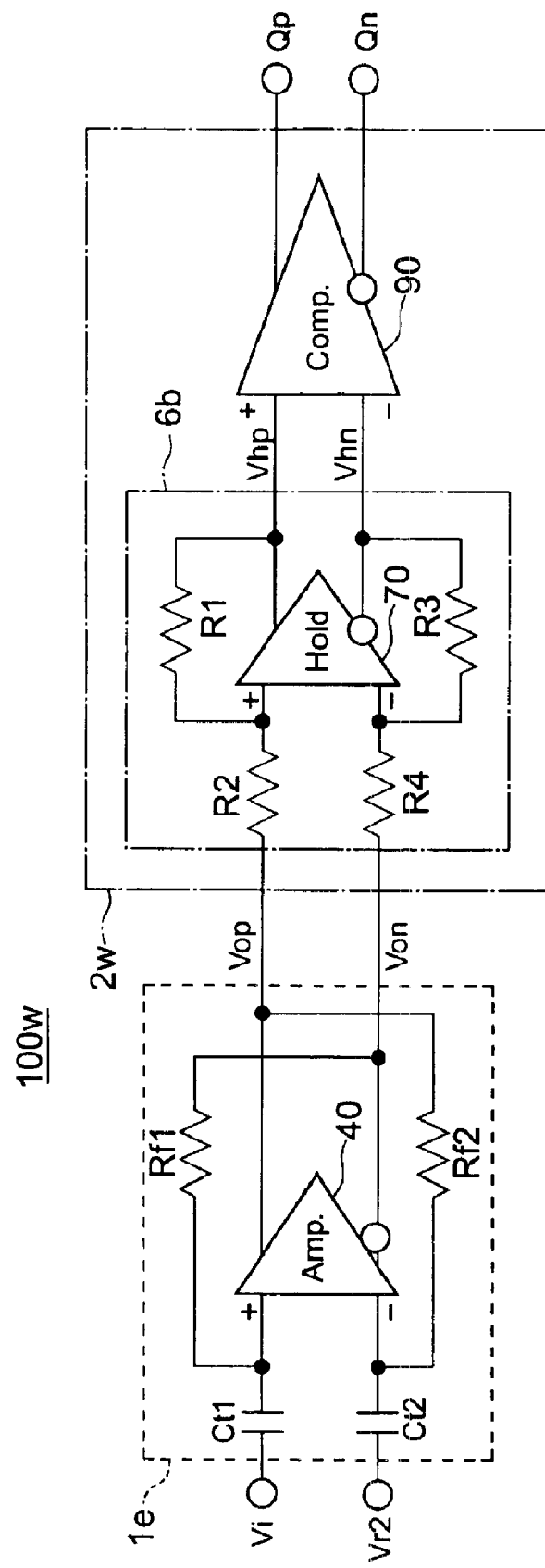
FIG. 33 is a block diagram showing another possible structure of the demodulating circuit in the thirteenth embodiment.

The block diagram in FIG. 33 shows another possible structure of the demodulating circuit in the thirteenth embodiment. This demodulating circuit 100*w* uses the same differentiating circuit 1*e* as in the fifth embodiment in FIG. 11, but the hysteresis comparator 2*w* is separated into a logic state holding unit 6*b* and a logic level converting unit 90.

The logic state holding unit 6*b* includes a logic state holding differential amplifier 70 and four resistance elements R1, R2, R3, R4. The logic state holding differential amplifier 70 receives the differentiated signals Vop, Von from the differentiating circuit 1*e* and generates a positive-phase intermediate signal Vhp and a negative-phase intermediate signal Vhn. The first resistance element R1 couples the positive-phase intermediate signal Vhp to the non-inverting (+) input terminal of the logic state holding differential amplifier 70; the second resistance element R2 couples the positive-phase differentiated signal Vop to the same non-inverting (+) input terminal. The third resistance element R3 couples the negative-phase intermediate signal Vhn to the inverting (−) input terminal of the logic state holding differential amplifier 70; the fourth resistance element R4 couples the negative-phase differentiated signal Von to the same inverting (−) input terminal. The non-inverting (+) input terminal of the logic level converting unit 90 receives the positive-phase intermediate signal Vhp from the logic state holding differential amplifier 70, and the inverting (−) input terminal of the logic level converting unit 90 receives the negative-phase intermediate signal Vhn. The logic level converting unit outputs a positive-phase demodulated signal Qp and a negative-phase demodulated signal Qn.

The hysteresis comparator 2*v* or 2*w* switches the intermediate signals Vhp, Vhn between first and second states when the differentiated signal Von or Vop exceeds an upper or lower threshold, and maintains the intermediate signals Vhp, Vhn in these states after the differentiated signal or signals Von, Vop return to their rest state. This operation is similar to the operation of the hysteresis comparators 2*c* to 2*e* in the third to fifth embodiments, so a detailed description will be omitted. The logic level converting unit 80 or 90 operates as a comparator element that inverts the logic level of the demodulated signal Qp (or demodulated signals Qp and Qn) when the intermediate signals Vhp, Vhn switch states; a detailed description of this simple comparison operation will also be omitted.

The advantage of separating the hysteresis comparator into a logic state holding unit 6*a* or 6*b* and a logic level converting unit 80 or 90 is the following.

A comparator element comprising TTL logic circuits or the like is generally suitable for outputting an unbalanced (single-ended) logic signal, and is often employed for this purpose, but it is not necessarily appropriate for use as the balanced dual-output hysteresis comparator described in the fourth and subsequent embodiments above. However, if the hysteresis comparator is separated into a balanced logic state holding unit 6*a* or 6*b* and a logic level converting unit 80 or 90 with unbalanced output, as in the present embodiment, it can be provided with both a balanced hysteresis comparator function and a suitably buffered unbalanced logic output function.

The output logic levels in the hysteresis comparator are constrained by the type of logic circuits used: e.g., TTL levels if TTL logic circuits are used, or ECL levels if ECL logic circuits are used. Consequently, to provide positive feedback at an appropriate level for a conventional type of hysteresis comparator, the output amplitude or dc bias voltage of the differentiating circuit is constrained. If the hysteresis comparator is separated into a logic state holding unit and a logic level converting unit as in the present embodiment, however, the logic state holding unit 6*a* or 6*b* can be specialized for appropriate positive feedback, and the differentiating circuit and the logic level converting unit 80 or 90 can be specialized for optimal coupling or optimal level conversion. Thus, the differentiating circuit, logic state holding unit 6*a* or 6*b*, and logic level converting unit 80 or 90 can be individually optimized.

Figure 34:
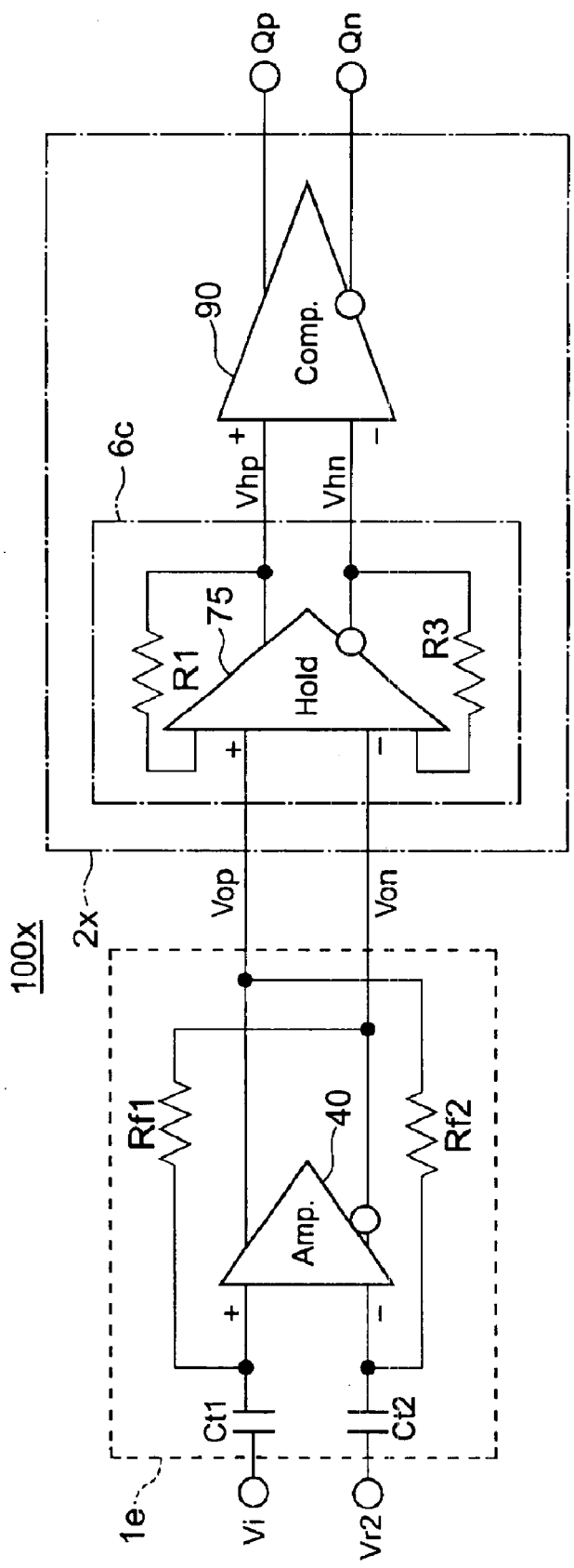
FIG. 34 is a block diagram showing a variation of the thirteenth embodiment in which the logic state holding unit is separated into an input unit and a positive feedback holding unit.

If the logic state holding unit 6*a* or 6*b* is further separated into an input unit (master) and a positive feedback holding unit (slave), still greater latitude in the design of the demodulating circuit can be obtained. The block diagram in FIG. 34 shows a demodulating circuit 100*x* in which the logic state holding unit is separated in this way. The differentiating circuit 1*e* is identical to the differentiating circuit in FIG. 33. The hysteresis comparator 2*x* is similar to the hysteresis comparator 2*w* in FIG. 33, but the logic state holding differential amplifier 75 in the logic state holding unit 6*c* has separate input terminals for (master) input of the differentiated signals and (slave) input of the positive feedback signals.

Figure 35:
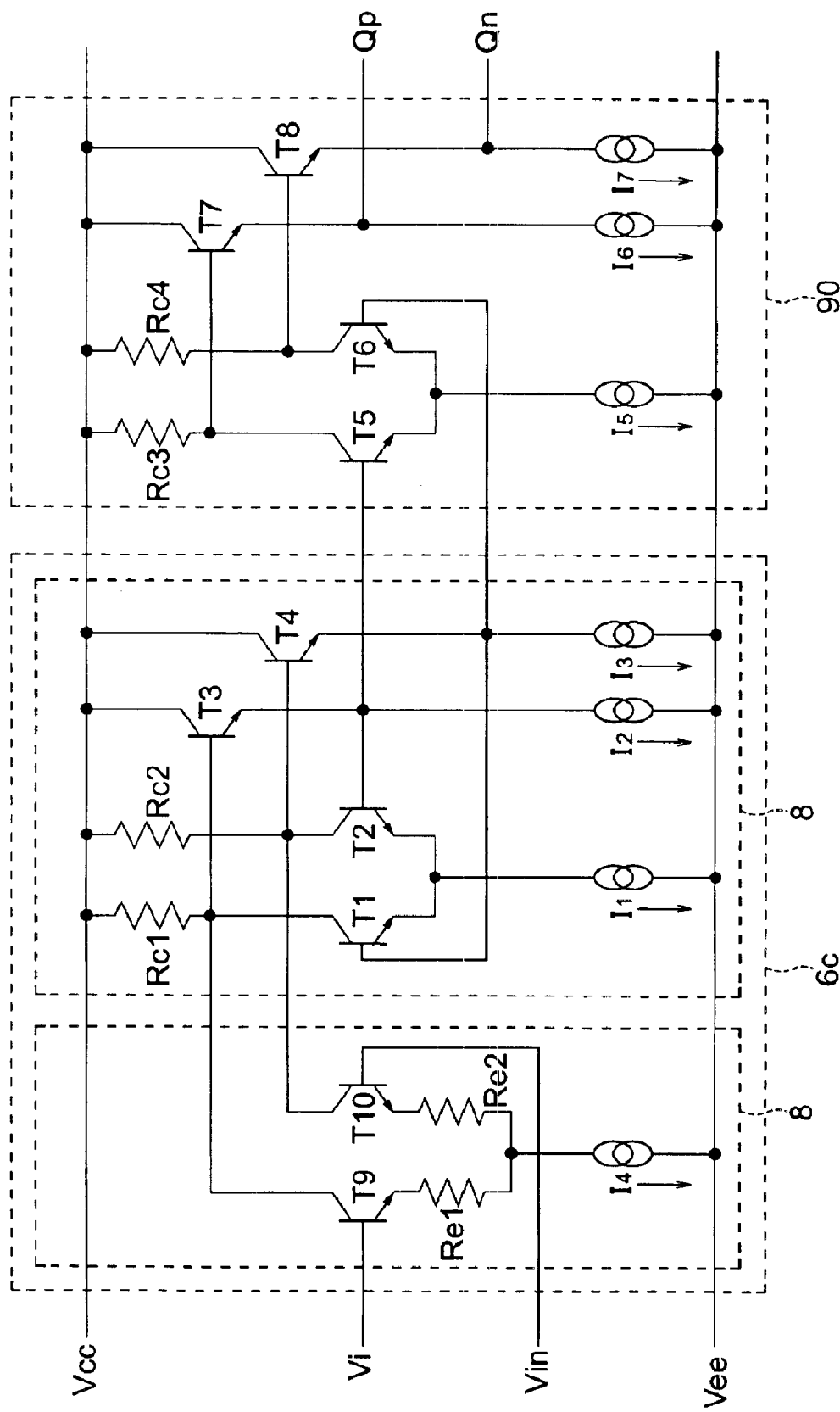
FIG. 35 is a circuit diagram showing the logic state holding unit in FIG. 34.

Referring to the circuit diagram in FIG. 35, the logic state holding unit 6*c* includes an input unit 8 and a positive feedback holding unit 9. The input unit 8 includes bipolar transistors T9 and T10, resistors Re1 and Re2, and a current source that sinks current I4. The positive feedback holding unit 9 includes bipolar transistors T1 to T4, resistors Rc1 and Rc2, and current sources that sink currents I1 to I3.

The current sources in the hysteresis comparator 2*x* in FIG. 35 are designed so that current I4 is greater than current I1. When the logic output state of the hysteresis comparator is being maintained in a steady state, current I1 flows substantially through just one of resistors Rc1 and Rc2, but current I4 may flow differentially through both resistors Rc1 and Rc2, depending on the conductivity of transistors T9 and T10 in the (differential) input unit 8. Since current I4 is greater than current I1, the high-low relationship between the base potentials of transistor T3 and T4, which are connected to resistors Rc1 and Rc2, can be inverted by current I4. Positive feedback then quickly inverts the state of the positive feedback holding unit 9 including transistors T1 and T2. The threshold values for the input voltage to the positive feedback holding unit 9, that is, the values that determine when the output of the positive feedback holding unit 9 inverts, can be adjusted by selection of appropriate values for resistors Re1 and Re2 and current I4.

The input bias of the logic state holding differential amplifier 70 in the demodulating circuit 100*w* in FIG. 33 is affected by the output bias of the differential amplifier 40 in the differentiating circuit 1e, so both circuit configurations are constrained by the need to obtain a bias at which both can operate. Since the logic state holding unit 6c in FIG. 35 is separated into an input unit 8 and a positive feedback holding unit 9, however, the input bias of the input unit 8 does not affect the bias of the positive feedback holding unit 9. Accordingly, there is no need for the positive feedback holding unit 9 to have the same bias as the differentiating circuit 1. Greater latitude in the design of the demodulating circuit thereby becomes possible, without imposing constraints on the biases of the differentiating circuit 1 and the positive feedback holding unit 9.

As described above, the thirteenth embodiment has the following effect:

(D1) Since the logic state holding unit is separated into an input unit and a positive feedback holding unit, the demodulating circuit can be designed so that the output bias of the differentiating circuit 1 and the bias of the positive feedback holding unit differ from each other.

A similar effect can be obtained in the other embodiments by separating the hysteresis comparator in those embodiments into an input unit and a positive feedback holding unit.

Fourteenth Embodiment

Figure 36:
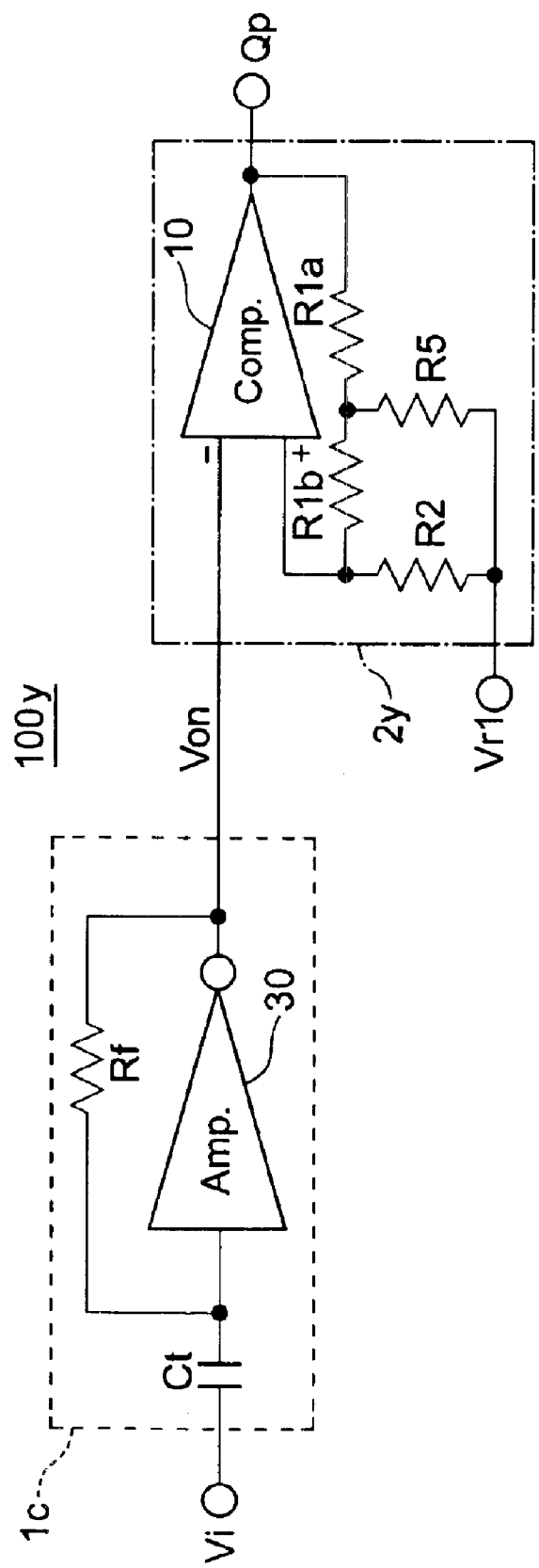
FIG. 36 is a block diagram showing a demodulating circuit in a fourteenth embodiment of the invention.

The block diagram in FIG. 36 shows the differentiating circuit 1c and the hysteresis comparator 2y in a demodulating circuit 100y in a fourteenth embodiment of the invention. The differentiating circuit 1c is identical to the differentiating circuit of the demodulating circuit 100c in the third embodiment in FIG. 8. The hysteresis comparator 2y is similar to the hysteresis comparator 2c, but includes a different feedback circuit with a combination of resistance elements R1a, R1b, R2, R5, each having a small resistance, connected in a ladder configuration so as to obtain a large feedback ratio.

Figure 37:
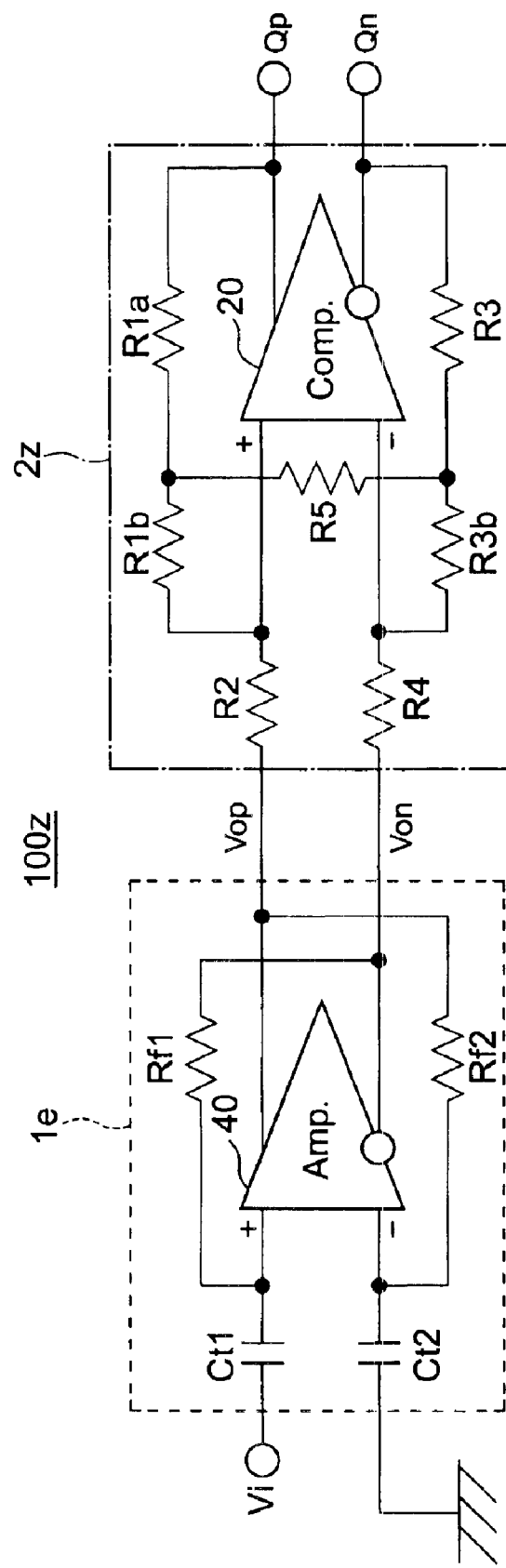
FIG. 37 is a block diagram showing another possible structure of the demodulating circuit in the fourteenth embodiment.

The block diagram in FIG. 37 shows another possible structure of the demodulating circuit in the fourteenth embodiment. This demodulating circuit 100z has a differentiating circuit 1e and hysteresis comparator 2z similar to the corresponding elements shown in FIG. 11 in the fifth embodiment, but the feedback circuits in the hysteresis comparator 2z comprise a combination of resistance elements, each having a small resistance, connected in the ladder configuration so as to obtain a large feedback ratio.

Assume that the first resistance element R1 and the second resistance element R2 in the demodulating circuit 100c in FIG. 8 have respective resistance values of 100 kΩ and 1 kΩ so as to obtain a positive feedback ratio of 1/100, for example. The same positive feedback ratio of 1/100 can be obtained in the demodulating circuit 100y in FIG. 36 by setting the resistance of resistance elements R1a and R1b to 9 kΩ, the resistance of resistance element R2 to 1 kΩ, and the resistance of resistance element R5 to 1.1 kΩ. Thus a ratio equivalent to a feedback resistance of 100 kΩ is obtained by connecting two 9-kΩ resistance elements and a 1.1-kΩ resistance element in a ladder configuration. Likewise, in the demodulating circuit 100z in FIG. 37, a desired feedback ratio can be obtained by using comparatively small resistances connected in a ladder configuration, obviating the need for high-resistance elements.

Reducing the resistance values of the resistance elements as in the fourteenth embodiment reduces the area required for circuit integration. A feedback resistance element R1 with a resistance of approximately 100 kΩ (e.g., R1=99 kΩ) in the demodulating circuit 100c in the third embodiment, for example, takes up more space than the equivalent resistance elements R1a, R1b, and R5 in the demodulating circuit 100y in the fourteenth embodiment, which have a total resistance of only approximately 20 kΩ (e.g., R1a= R1b=9 kΩ, R5=1.1 kΩ, R1a+R1b+R5 =19.1 kΩ). Use of resistance elements with small resistance values reduces the stray capacitance and the associated time constant of each resistance element, so that the adverse effects due to the stray capacitance of the resistance elements can be mitigated.

Fifteenth Embodiment

Figure 38A:
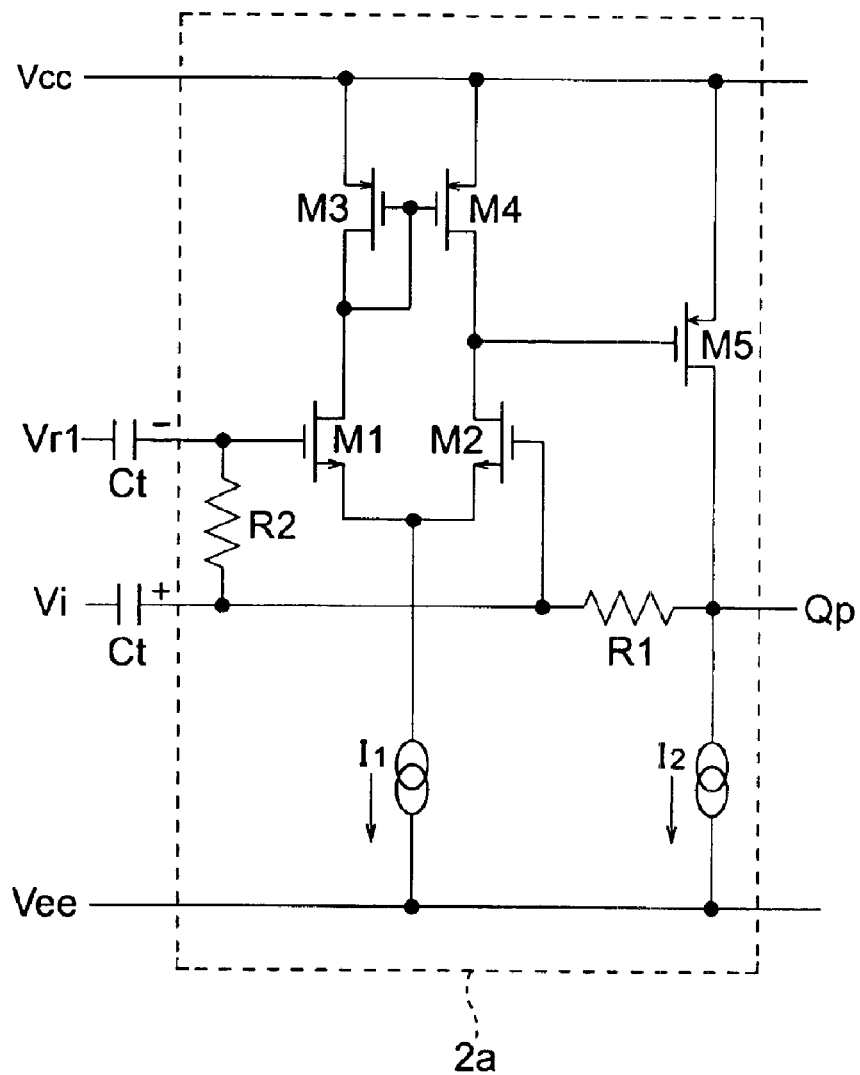
FIG. 38A is a circuit diagram showing the hysteresis comparator in a demodulating circuit in a fifteenth embodiment.
Figure 38B:
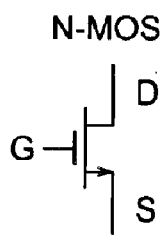
FIGS. 38B and 38C illustrate transistor symbols used in FIG. 38A.
Figure 38C:
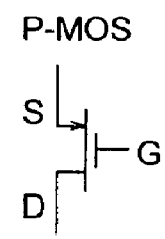

The circuit diagram in FIG. 38A shows an example of the hysteresis comparator in a demodulating circuit according to a fifteenth embodiment of the invention. This hysteresis comparator is similar to the single-input (unbalanced) hysteresis comparator 2a in the first embodiment shown in FIG. 4, but the bipolar transistors and load resistance elements are replaced with metal-oxide-semiconductor field-effect transistors (MOS FETs) M1 to M5. The circuit in FIG. 38A has a complementary configuration using both n-channel (N-MOS) transistors, the circuit symbol for which is shown in FIG. 38B, and p-channel (P-MOS) transistors, the circuit symbol for which is shown in FIG. 38C. The letters S, G, and D in FIGS. 38B and 38C indicate source, gate, and drain, respectively.

Figure 39:
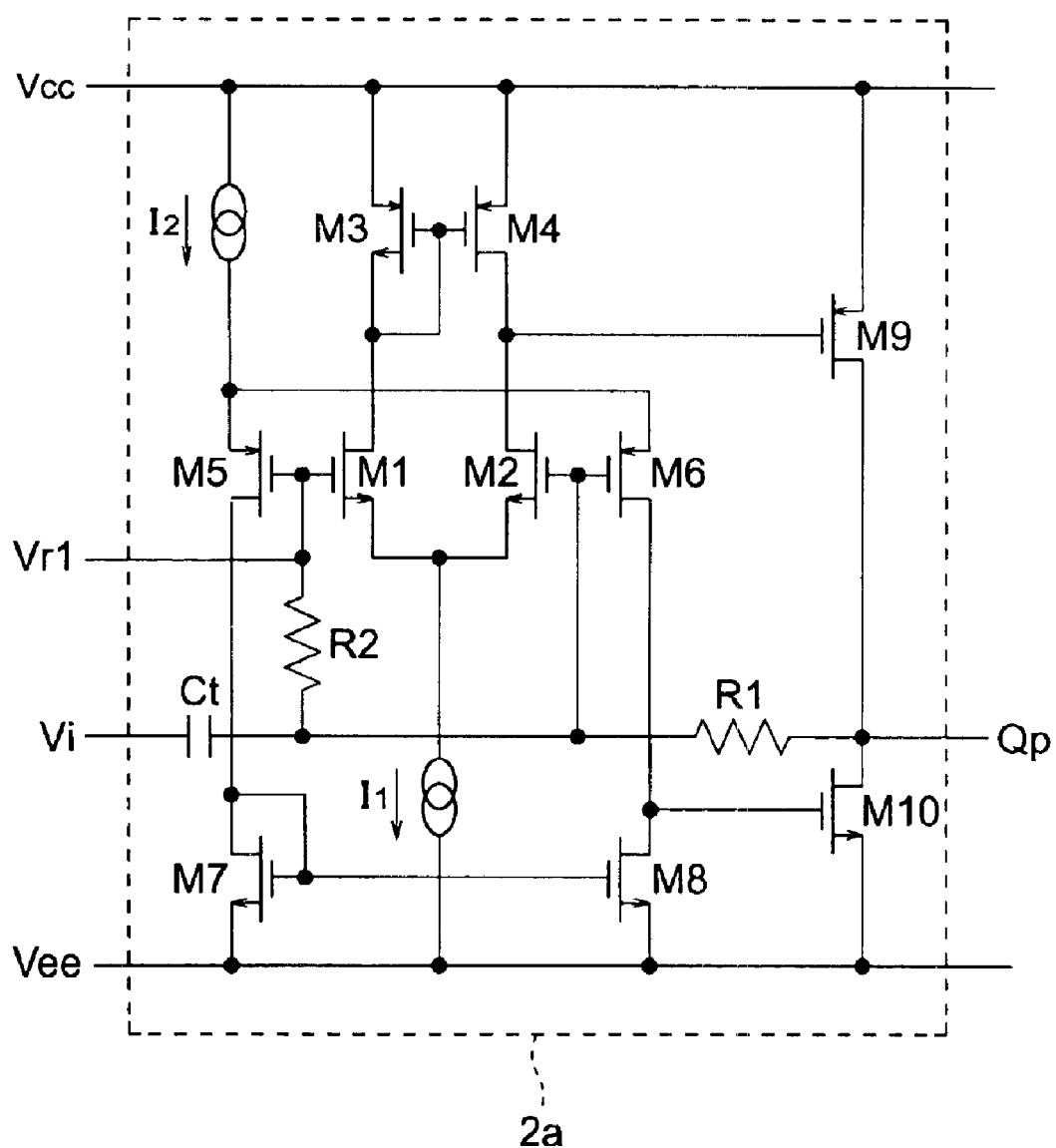
FIGS. 39, 40, 41, 42, 43, and 44 are circuit diagrams showing alternative structures of the hysteresis comparator in the fifteenth embodiment.

FIG. 39 shows another example, in which the circuit configuration of the hysteresis comparator 2a in the first embodiment is more extensively modified, using MOS FETs M1 to M10. Despite the modifications, the operation of the complementary MOS (C-MOS) hysteresis comparators in FIGS. 38A and 39 is generally similar to the operation of the bipolar hysteresis comparator 2a in the first embodiment, so detailed descriptions will be omitted.

Figure 40:
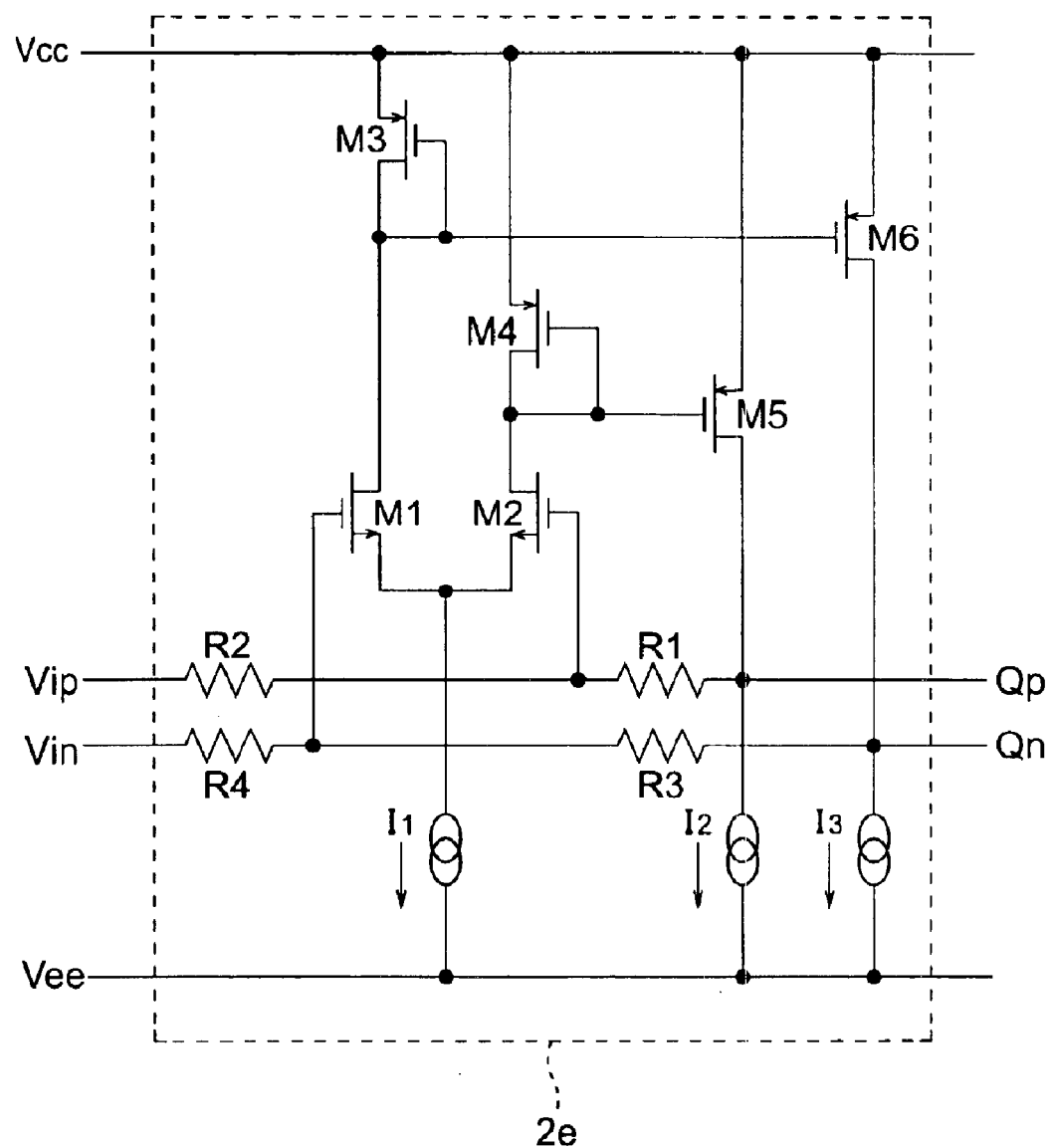
Figure 41:
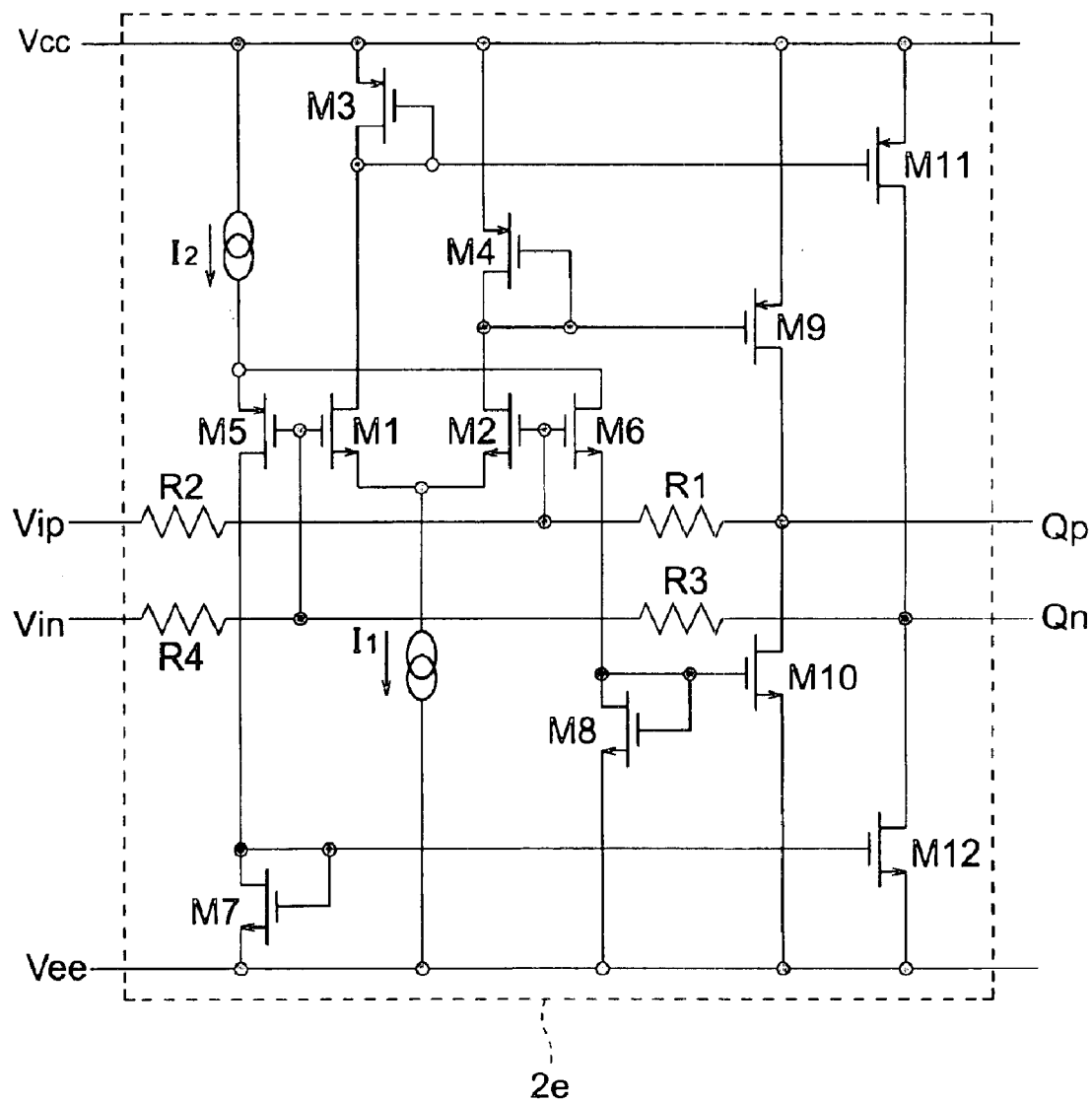

FIGS. 40 and 41 show other possible structures of the hysteresis comparator in the fifteenth embodiment. The hysteresis comparators in FIGS. 40 and 41 are similar to the hysteresis comparator 2e in the fifth embodiment in FIG. 12, but have a C-MOS configuration in which bipolar transistors and load resistance elements are replaced with n-channel and p-channel MOS FETs M1 to M6 (FIG. 40) or M1 to M12 (FIG. 41).

Figure 42:
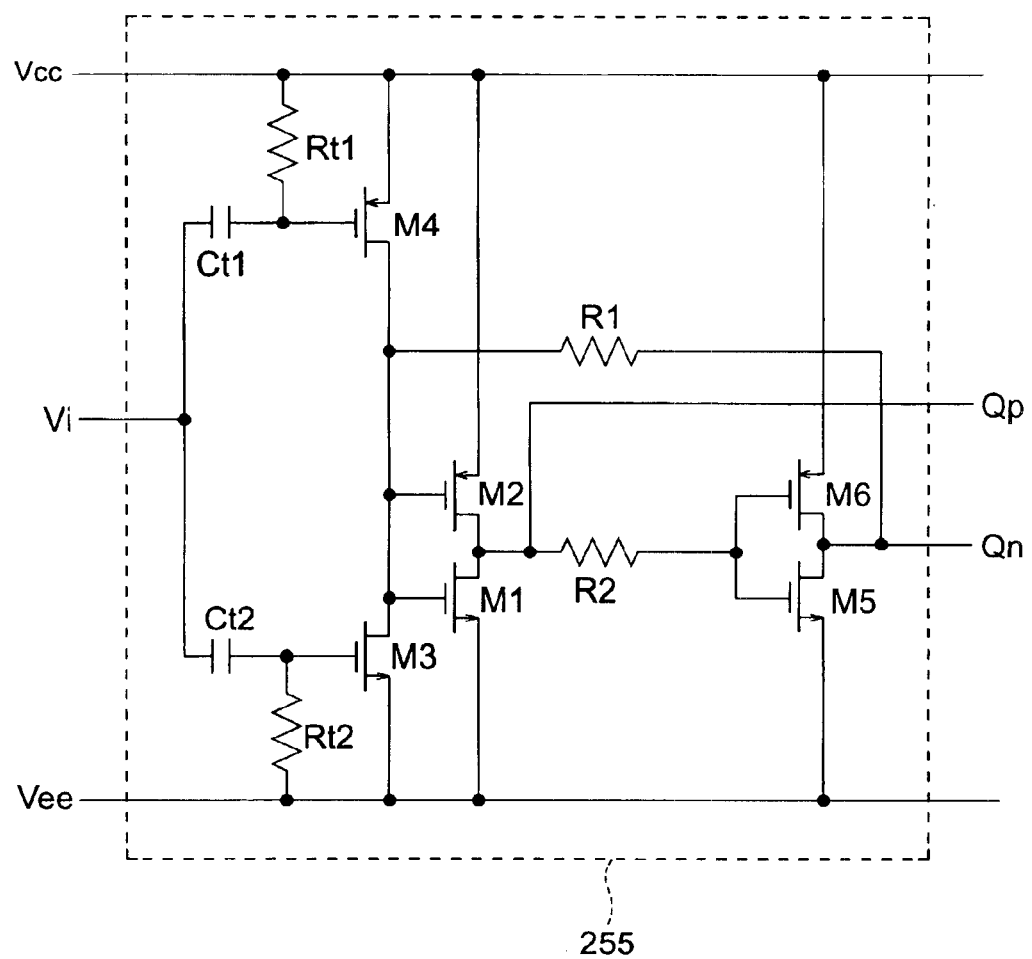
Figure 43:
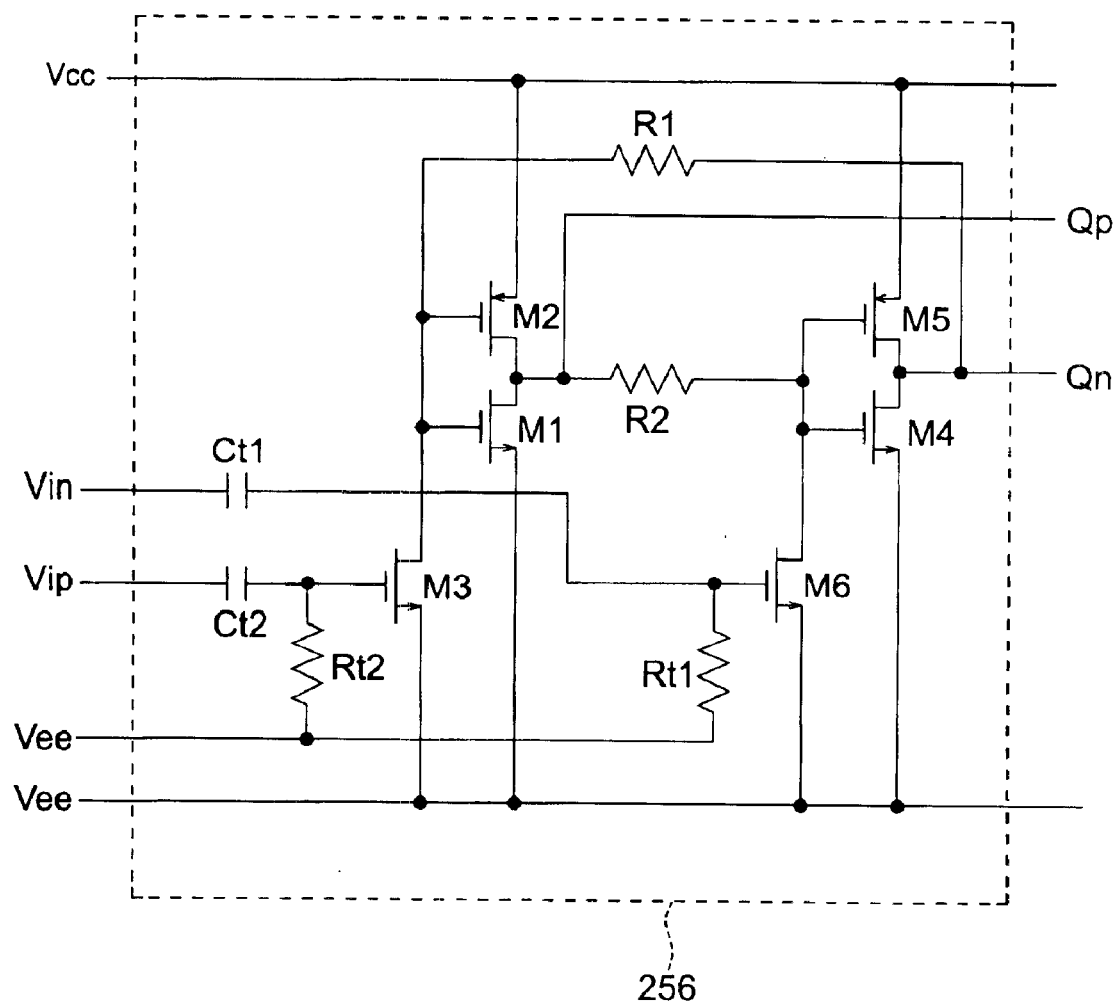
Figure 44:
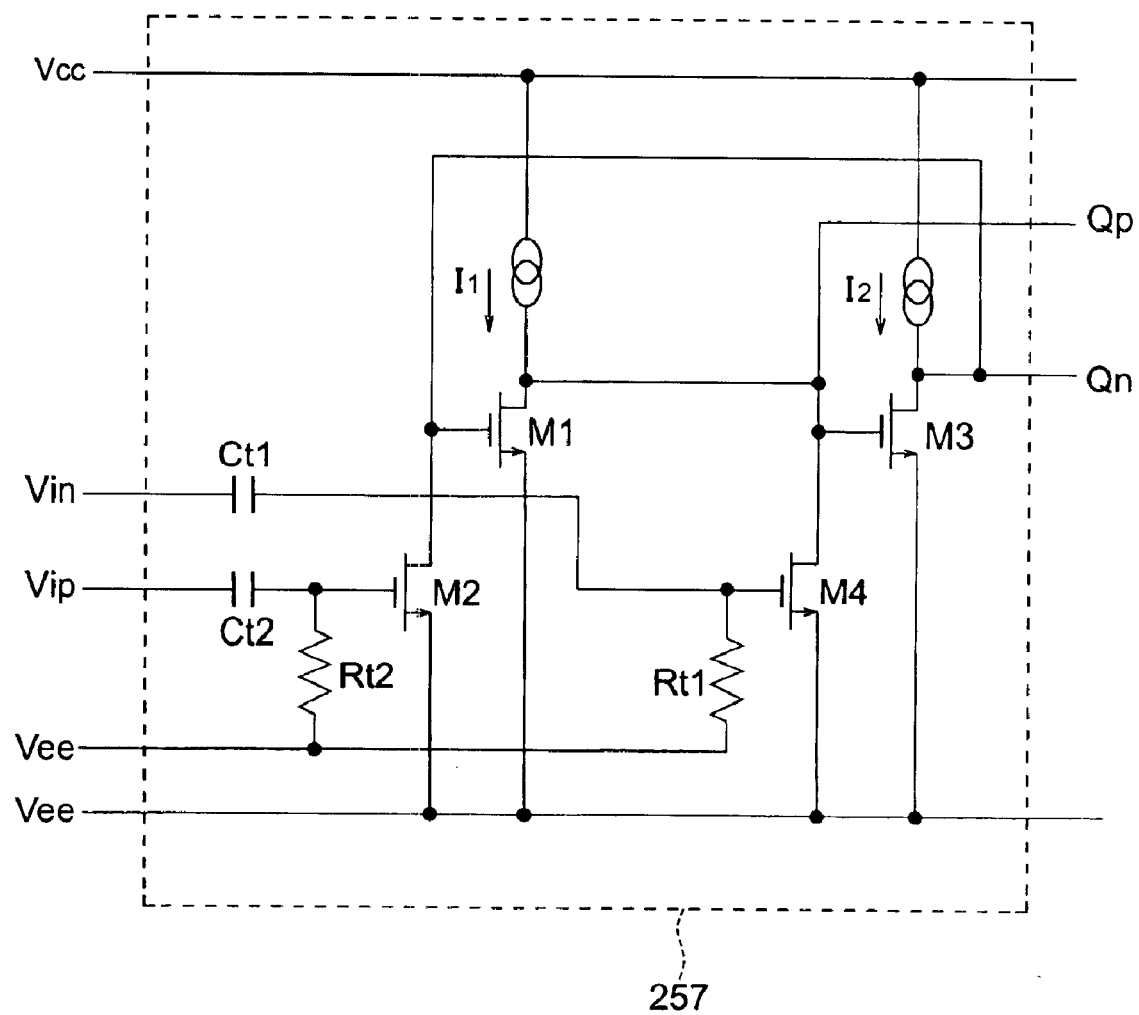

The circuit diagrams in FIGS. 42 to 44 show still other possible structures of the hysteresis comparator in the fifteenth embodiment. The hysteresis comparators in these drawings are analogous to the hysteresis comparators in the sixth embodiment shown in FIGS. 15 to 18, but use C-MOS or N-MOS-latch circuits. The circuit 255 in FIG. 42 enables the output of the hysteresis comparator to invert when the input signal Vi crosses an easily adjustable threshold voltage Vth. The circuits 256, 257 in FIGS. 43 and 44 provide a similar advantage for differential input signals Vin and Vip.

The demodulating circuits in the fifteenth embodiment provide substantially the same effects as the demodulating circuits in the other embodiments above even though the bipolar transistors in the hysteresis comparator are replaced with MOS FETs.

The demodulating circuit of the present invention is not limited to the circuits described above. The present invention can be applied in any demodulating circuit having a differentiating circuit and a hysteresis comparator of the general type described in the above embodiments. Various combinations of the above embodiments may also be employed.

The hysteresis comparator may be any type of hysteresis comparator that quickly inverts its output logic when the input of the differentiated signal Vo crosses a predetermined upper threshold voltage level VothH or lower threshold voltage level VothL, and maintains the inverted logic output state by positive feedback after the differentiated signal Vo returns to a steady-state level between these threshold levels.

The positive feedback does not necessarily have to be provided between the input and the output terminals of a comparator element; other positive feedback signal paths can be employed.

The time constant of the differentiating circuit is not limited to any particular value. The time constant should be longer than the time required for differentiation of the input pulse signal Vi, so that a differentiated output that crosses the upper threshold voltage level VothH or lower threshold voltage level VothL can be supplied to the hysteresis comparator, and long enough to allow the output of the hysteresis comparator to invert, but should be shorter than the unit pulse duration in the pulse signal Vi. The differentiating characteristic of the differentiating circuit may be either linear or nonlinear.

Conventionally, when a demodulating circuit is used in an optical receiving circuit, complex and extensive circuitry including a peak hold circuit or a summing circuit has been required, but such circuits consume much power. When the demodulating circuit in the above embodiments is employed in an optical receiving circuit, a capacitively coupled multi-stage amplifier having a comparatively simple structure can be employed. The number of circuit elements can therefore be reduced, and power consumption can also be reduced.

As described above, the demodulating circuit in this invention has a comparatively simple structure comprising a differentiating circuit and a hysteresis comparator with a comparator element for which simple positive feedback is provided. The hysteresis characteristic of the hysteresis comparator allows the demodulated signal to be maintained at the correct level despite runs of consecutive '1's or '0's of any length. Further, the demodulating circuit in this embodiment has a simpler structure and can be implemented with fewer circuit elements than conventional circuits. Since the number of the circuit elements is small, the power consumption of the demodulating circuit is reduced. The demodulating circuit is not affected by offsets resulting from multiple preceding amplification stages. No extra integrating circuit or peak hold circuit is needed for dc level detection. When the demodulating circuit resumes reception of a pulse signal from a quiescent state, the pulse signal can be received even if it begins with a run of identical '1' or '0' symbols.

When the demodulating circuit in the above embodiments is employed in an optical receiving circuit, the differentiating circuit detects voltage changes and outputs a differentiated signal responsive thereto. The logic output level of the demodulated signal is then maintained or inverted by the hysteresis comparator, responsive to the differentiated signal. Thus, a capacitively coupled multi-stage amplifier having a comparatively simple structure can be employed. The number of circuit elements can be thereby reduced, and power consumption can also be reduced.

Numerous variations of the foregoing embodiments have been described, but those skilled in the art will recognize that still further variations are possible within the scope of the invention, which is defined in the appended claims.

What is claimed is:

1. A demodulating circuit for demodulating a pulse signal including runs of identical '1' or '0' symbols, comprising:
    a differentiating circuit for detecting voltage changes at rising and falling transitions of the pulse signal and outputting a differentiated signal responsive to the voltage changes; and
    a hysteresis comparator for comparing the differentiated signal with a first reference voltage according to a predetermined upper threshold voltage higher than the first reference voltage and a predetermined lower threshold voltage lower than the first reference voltage, thereby generating a demodulated signal that maintains a first logic level when the differentiated signal is above the upper threshold voltage, maintains a second logic level when the differentiated signal is below the lower threshold level, and maintains an existing one of the first and second logic levels without changing when the differentiate voltage is between the upper threshold voltage and the lower threshold voltage, wherein:
    the hysteresis comparator comprises
    a comparator element having an inverting input terminal for receiving the first reference voltage, a non-inverting input terminal for receiving the differentiated signal, and an output terminal for output of the demodulated signal,
    a first resistance element coupling the output terminal of the comparator element to the non-inverting input terminal of the comparator element, and
    a second resistance element coupling the first reference voltage to the non-inverting input terminal of the comparator element;
    and the differentiating circuit comprises
    a differentiating capacitor coupling the pulse signal to the non-inverting input terminal of the comparator element, and
    a compound resistance for charging and discharging the differentiating capacitor, the compound resistance including the first resistance element and the second resistance element.

2. A demodulating circuit for demodulating a pulse signal including runs of identical '1' or symbols, '0' comprising:
    a differentiating circuit for detecting voltage changes at rising and falling transitions of the pulse signal and outputting a differentiated signal responsive to the voltage changes; and
    a hysteresis comparator for comparing the differentiated signal with a first reference voltage according to a predetermined upper threshold voltage higher than the first reference voltage and a predetermined lower threshold voltage lower than the first reference voltage, thereby generating a demodulated signal that maintains a first logic level when the differentiated signal is above the upper threshold voltage, maintains a second logic level when the differentiated signal is below the lower threshold level, and maintains an existing one of the first and second logic levels without changing when the differentiated voltage is between the upper threshold voltage and the lower threshold voltage, wherein:
    the hysteresis comparator comprises
    a comparator element having an inverting input terminal for receiving the differentiated signal, a non-inverting input terminal for receiving the first reference voltage, and an output terminal for output of the demodulated signal,
    a first resistance element coupling the output terminal of the comparator element to the non-inverting input terminal of the comparator element, and
    a second resistance element coupling the first reference voltage to the non-inverting input terminal of the comparator element;

and the differentiating circuit comprises
an inverting amplifier having an input terminal and an output terminal, the differentiated signal being output from the output terminal of the inverting amplifier,
a negative feedback resistance element coupled between the input and output terminals of the inverting amplifier, and
a differentiating capacitor coupling the pulse signal to the input terminal of the inverting amplifier.

3. A demodulation circuit for demodulating a pulse signal including runs of identical symbols '1' or '0' symbols, comprising:
a differentiating circuit for detecting voltage changes at rising and falling transitions of the pulse signal and outputting a differentiated signal responsive to the voltage changes; and
a hysteresis comparator for comparing the differentiated signal with a first reference voltage according to a predetermined upper threshold voltage higher than the first reference voltage and a predetermined lower threshold voltage lower than the first reference voltage, thereby generating a demodulated signal that maintains a first logic level when the differentiated signal is above the upper threshold voltage maintains a second logic level when the differentiated signal is below the lower threshold level, and maintains an existing one of the first and second logic levels without changing when the differentiated voltage is between the upper threshold voltage and the lower threshold voltage, wherein:
the differentiating circuit outputs the differentiated signal as a positive-phase differentiated signal;
the differentiating circuit also outputs a negative-phase differentiated signal complementary to the positive-phase differentiated signal;
the hysteresis comparator includes a balanced comparator element having a non-inverting input terminal for receiving the positive-phase differentiated signal and an inverting input terminal for receiving the negative-phase differentiated signal;
the balanced comparator element outputs the demodulated signal a positive-phase demodulated signal; and
the balanced comparator element also outputs a negative-phase demodulated signal complementary to the positive-phase demodulated signal.

4. The demodulating circuit of claim 3, wherein:
the hysteresis comparator further comprises
first and second resistance elements for dividing a potential, difference between the positive-phase demodulated signal and the first reference voltage to provide positive feedback at the non-inverting input terminal of the balanced comparator element, and
third and fourth resistance elements for dividing a potential difference between the negative-phase demodulated signal and the first reference voltage to provide positive feedback at the inverting input terminal of the balanced comparator element;
and the differentiating circuit comprises
a differentiating capacitor coupling the pulse signal to the non-inverting input terminal of the balanced comparator element, and
a compound resistance, including the first, second, third, and fourth resistance elements, for charging and discharging the differentiating capacitor.

5. The demodulating circuit of claim 3, wherein:
the differentiating circuit comprises
a differential amplifier having a non-inverting input terminal and inverting input terminal, for generating the positive-phase differentiated signal and the negative-phase differentiated signal in response to a potential difference between the non-inverting input terminal and the inverting input terminal,
a first negative feedback resistance element coupling the negative-phase differentiated signal to the non-inverting input terminal of the differential amplifier,
a second negative feedback resistance element coupling the positive-phase differentiated signal to the inverting input terminal of the differential amplifier,
a first differentiating capacitor coupling the pulse signal to the non-inverting input terminal of the differential amplifier, and
a second differentiating capacitor coupling a ground potential to the inverting input terminal of the differential amplifier;
and the hysteresis comparator further comprises
first and second resistance elements for dividing a potential difference between the positive-phase demodulated signal output and the positive-phase differentiated signal to provide positive feedback at the non-inverting input terminal of the balanced comparator element, and
third and fourth resistance elements for dividing a potential difference between the negative-phase demodulated signal and the negative-phase differentiated signal to provide positive feedback at the inverting input terminal of the balanced comparator element;
the positive-phase demodulated signal assuming the first logic level when either the positive-phase differentiated signal goes above the upper threshold level or the negative-phase differentiated signal goes below the lower threshold voltage;
the positive-phase demodulated signal assuming the second logic level when either the positive-phase differentiated signal goes below the lower threshold level or the negative-phase differentiated signal goes above the upper threshold voltage.

6. The demodulating circuit of claim 3, wherein the differentiating circuit comprises a differential signal generating circuit having a non-inverting input terminal for receiving the pulse signal and an inverting input terminal for receiving a second reference voltage, the differential signal generating circuit generating a positive-phase differential signal and a negative-phase differential signal responsive to a potential difference between the pulse signal and the second reference voltage, the positive-phase differentiated signal being generated from the positive-phase differential signal, the negative-phase differentiated signal being generated from the negative-phase differential signal.

7. The demodulating circuit of claim 6, wherein:
the hysteresis comparator further comprises
first and second resistance elements for dividing a potential difference between the positive-phase demodulated signal and the first reference voltage to provide positive feedback at the non-inverting input terminal of the balanced comparator element, and
third and fourth resistance elements for dividing a potential difference between the negative-phase demodulated signal and the first reference voltage to provide positive feedback at the inverting input terminal of the balanced comparator element;

and the differentiating circuit further comprises
a first differentiating capacitor coupling the positive-phase differential signal to the non-inverting input terminal of the balanced comparator element, and
a second differentiating capacitor coupling the negative-phase differential signal to the inverting input terminal of the balanced comparator element.

8. The demodulating circuit of claim 6, wherein:
the differentiating circuit further comprises
a differential amplifier having a non-inverting input terminal and an inverting input terminal, for generating the positive-phase differentiated signal and the negative-phase differentiated signal in response to a potential difference between the non-inverting input terminal and the inverting input terminal,
a first negative feedback resistance element coupling the negative-phase differentiated signal to the non-inverting input terminal of the differential amplifier,
a second negative feedback resistance element coupling the positive-phase differentiated signal to the inverting input terminal of the differential amplifier,
a first differentiating capacitor coupling the positive-phase differential signal to the non-inverting input terminal of the differential amplifier, and
a second differentiating capacitor coupling the negative-phase differential signal to the inverting input terminal of the differential amplifier;
and the hysteresis comparator further comprises
first and second resistance elements for dividing a potential difference between the positive-phase demodulated signal and the positive-phase differentiated signal to provide positive feedback at the non-inverting input terminal of the balanced comparator element, and
third and fourth resistance elements for dividing a potential difference between the negative-phase demodulated signal and the negative-phase differentiated signal to provide positive feedback at the inverting input terminal of the balanced comparator element.

9. A demodulating circuit for demodulating a pulse signal including runs of identical '1' or '0' symbols, comprising:
a differentiating circuit for detecting voltage changes at rising and falling transitions of the pulse signal and outputting a differentiated signal responsive to the voltage changes; and
a hysteresis comparator for comparing the differentiated signal with a first reference voltage according to a predetermined upper threshold voltage higher than the first reference voltage and a predetermined lower threshold voltage lower than the first reference voltage, thereby generating a demodulated signal that maintains a first logic level when the differentiated signal is above the upper threshold voltage, maintains a second logic level when the differentiated signal is below the lower threshold level, and maintains an existing one of the first and second logic levels without changing when the differentiated voltage is between the upper threshold voltage and the lower threshold voltage, wherein the differentiating circuit comprises:
an inverting amplifier having an input terminal and an output terminal;
a negative feedback resistance element coupled between the input and output terminals of the inverting amplifier;
a differentiating capacitor connected to the input terminal of the inverting amplifier; and
a resistance element connected in series with the differentiating capacitor, for adjusting a differentiating characteristic of the differentiating circuit.

10. A demodulating circuit for demodulating a pulse signal including runs of identical '1' or '0' symbols, comprising:
a differentiating circuit for detecting voltage changes at rising and falling transitions of the pulse signal and outputting a differentiated signal responsive to the voltage changes; and
a hysteresis comparator for comparing the differentiated signal with a first reference voltage according to a predetermined upper threshold voltage higher than the first reference voltage and a predetermined lower threshold voltage lower than the first reference voltage, thereby generating a demodulated signal that maintains a first logic level when the differentiated signal is above the upper threshold voltage maintains a second logic level when the differentiated signal is below the lower threshold level, and maintains an existing one of the first and second logic levels without changing when the differentiated voltage is between the upper threshold voltage and the lower threshold voltage, wherein the differentiating circuit comprises a limiting element for limiting an amplitude of the differentiated signal.

11. A demodulating circuit for demodulating a pulse signal including runs of identical '1' or '0' symbols, comprising:
a differentiating circuit for detecting voltage changes at rising and falling transitions of the pulse signal and outputting a differentiated signal responsive to the voltage changes; and
a hysteresis comparator for comparing the differentiated signal with a first reference voltage according to a predetermined upper threshold voltage higher than the first reference voltage and a predetermined lower threshold voltage lower than the first reference voltage, thereby generating a demodulated signal that maintains a first logic level when the differentiated signal is above the upper threshold voltage, maintains a second logic level when the differentiated signal is below the lower threshold level, and maintains an existing one of the first and second logic levels without changing when the differentiate voltage is between the upper threshold voltage and the lower threshold voltage, wherein the hysteresis comparator comprises:
a positive feedback element providing positive feedback of the demodulated signal; and
a limiting element for limiting an amplitude of the positive feedback.

12. A demodulating circuit for demodulating a pulse signal including runs of identical '1' or '0' symbols, comprising:
a differentiating circuit for detecting voltage changes at rising and falling transitions of the pulse signal and outputting a differentiated signal responsive to the voltage changes; and
a hysteresis comparator for comparing the differentiated signal with a first reference voltage according to a predetermined upper threshold voltage higher than the first reference voltage and a predetermined lower threshold voltage lower than the first reference voltage, thereby generating a demodulated signal that maintains a first logic level when the differentiated signal is above the upper threshold voltage, maintains a second logic level when the differentiated signal is below the lower threshold level, and maintains an existing one of the first and second logic levels without changing when the differentiated voltage is between the upper threshold voltage and the lower threshold voltage, wherein the differentiating circuit includes a low-pass filter for removing high-frequency noise from the pulse signal.

13. A demodulating circuit for demodulating a pulse signal including runs of identical '1' or '0' symbols, comprising:

a differentiating circuit for detecting voltage chances at rising and falling transitions of the pulse signal and outputting a differentiated signal responsive to the voltage changes; and a hysteresis comparator for comparing the differentiated signal with a first reference voltage according to a predetermined upper threshold voltage higher than the first reference voltage and a predetermined lower threshold voltage lower than the first reference voltage, thereby generating a demodulated signal that maintains a first logic level when the differentiated signal is above the upper threshold voltage, maintains a second logic level when the differentiated signal is below the lower threshold level, and maintains an existing one of the first and second logic levels without changing when the differentiated voltage is between the upper threshold voltage and the lower threshold voltage, wherein the hysteresis comparator comprises:

a logic state holding unit operating with hysteresis to generate an intermediate signal having a first state and a second state; and a logic level converting unit for converting the first state of the intermediate signal to the first logic level and converting the second state of the intermediate signal to the second logic level, thereby generating the demodulated signal.

14. The demodulating circuit of claim 13, wherein the logic state holding unit comprises:

an input circuit for receiving the differentiated signal and switching the intermediate signal between the first state and the second state; and a positive feedback circuit for holding the intermediate signal in the state to which the intermediate signal is switched by the input circuit.

15. An optical receiving circuit using the demodulating circuit of claim 1, to receive a burst optical signal used in optical communication.

* * * * *